(12) United States Patent
Milshtein et al.

(10) Patent No.: US 12,261,281 B2
(45) Date of Patent: Mar. 25, 2025

(54) METAL AIR ELECTROCHEMICAL CELL ARCHITECTURE

(71) Applicant: FORM ENERGY INC., Somerville, MA (US)

(72) Inventors: Jarrod David Milshtein, Cambridge, MA (US); Mitchell Terrance Westwood, Boston, MA (US); William Henry Woodford, Cambridge, MA (US); Yet-Ming Chiang, Weston, MA (US); Mateo Cristian Jaramillo, San Francisco, CA (US); Ian Salmon Mckay, Seattle, WA (US); Rachel Elizabeth Mumma, Somerville, MA (US); Eric Weber, Pittsburgh, PA (US); Liang Su, Medfiled, MA (US); Amelie Nina Kharey, Cambridge, MA (US); Marco Ferrara, Boston, MA (US); Theodore Alan Wiley, Somerville, MA (US)

(73) Assignee: FORM ENERGY, INC., Somerville, MA (US)

(*) Notice: Subject to any disclaimer, the term of this patent is extended or adjusted under 35 U.S.C. 154(b) by 0 days.

(21) Appl. No.: 16/456,860

(22) Filed: Jun. 28, 2019

(65) Prior Publication Data
US 2020/0006828 A1 Jan. 2, 2020

Related U.S. Application Data

(60) Provisional application No. 62/692,400, filed on Jun. 29, 2018.

(51) Int. Cl.
H01M 12/02 (2006.01)
H01M 12/08 (2006.01)
H01M 50/609 (2021.01)

(52) U.S. Cl.
CPC ........... *H01M 12/02* (2013.01); *H01M 12/08* (2013.01); *H01M 50/609* (2021.01)

(58) Field of Classification Search
CPC .................. H01M 12/02; H01M 12/08
(Continued)

(56) References Cited

U.S. PATENT DOCUMENTS 2,083,364 A 6/1937 Cook, Jr. et al.
2,643,276 A 6/1953 Salauze
(Continued)

FOREIGN PATENT DOCUMENTS

CN 1233861 A 11/1999
CN 1535489 A 10/2004
(Continued)

OTHER PUBLICATIONS

Song et al., Solubility and Diffusivity of Oxygen in Ionic Liquids, Oct. 2019, Journal of Chemical and Engineering Data, 64, 4956-4967 (Year: 2019).*

(Continued)

Primary Examiner — Sean P Cullen
(74) Attorney, Agent, or Firm — The Marbury Law Group, PLLC

(57) ABSTRACT

Systems and methods of the various embodiments may provide metal air electrochemical cell architectures. Various embodiments may provide a battery, such as an unsealed battery or sealed battery, with an open cell arrangement configured such that a liquid electrolyte layer separates a metal electrode from an air electrode. In various embodiments, the electrolyte may be disposed within one or more vessel of the battery such that electrolyte serves as a barrier between a metal electrode and gaseous oxygen. Systems and methods of the various embodiments may provide for removing a metal electrode from electrolyte to prevent (Continued)

self-discharge of the metal electrode. Systems and methods of the various embodiments may provide a three electrode battery configured to operate each in a discharge mode, but with two distinct electrochemical reactions occurring at each electrode.

9 Claims, 23 Drawing Sheets

(58) Field of Classification Search
USPC .................................................. 429/402, 405
See application file for complete search history.

(56) References Cited

U.S. PATENT DOCUMENTS

| | | |
|---|---|---|
| 2,683,182 A | 7/1954 | Salauze |
| 3,219,486 A | 11/1965 | Salcedo et al. |
| 3,223,611 A | 12/1965 | Kergan et al. |
| 3,329,530 A | 7/1967 | Yutaka et al. |
| 3,338,746 A | 8/1967 | Gunther et al. |
| 3,363,570 A | 1/1968 | Scott |
| 3,415,689 A | 12/1968 | Carson, Jr. et al. |
| 3,483,036 A | 12/1969 | Gregor et al. |
| 3,484,291 A | 12/1969 | MacKenzie et al. |
| 3,489,610 A | 1/1970 | Berger et al. |
| 3,525,643 A | 8/1970 | Spahrbier et al. |
| 3,532,548 A | 10/1970 | Stachurski et al. |
| 3,615,843 A | 10/1971 | Moran |
| 3,615,844 A | 10/1971 | Spengler |
| 3,650,837 A | 3/1972 | Palmer |
| 3,686,225 A | 8/1972 | Pedersen et al. |
| 3,713,892 A | 1/1973 | Moran |
| 3,716,413 A | 2/1973 | Eisner |
| 3,717,505 A | 2/1973 | Unkle, Jr. et al. |
| 3,728,244 A | 4/1973 | Cooley et al. |
| 3,785,868 A | 1/1974 | Devitt |
| 3,801,376 A | 4/1974 | Lindstrom |
| 3,822,149 A | 7/1974 | Hale et al. |
| 3,840,455 A | 10/1974 | Cooley et al. |
| 3,847,603 A | 11/1974 | Fukuda et al. |
| 3,850,696 A | 11/1974 | Summers et al. |
| 3,886,426 A | 5/1975 | Daggett |
| 3,888,877 A | 6/1975 | Lehn |
| 3,902,916 A | 9/1975 | Warszawski |
| 3,919,062 A | 11/1975 | Lundquist, Jr. et al. |
| 3,945,849 A | 3/1976 | Hoffman |
| 3,947,292 A | 3/1976 | Jackovitz et al. |
| 3,965,116 A | 6/1976 | Cram |
| 3,966,766 A | 6/1976 | Lehn |
| 3,972,727 A | 8/1976 | Cohn |
| 4,001,212 A | 1/1977 | Richman |
| 4,001,279 A | 1/1977 | Cram |
| 4,007,059 A | 2/1977 | Witherspoon et al. |
| 4,054,725 A * | 10/1977 | Tuburaya ............ H01M 8/0662 429/410 |
| 4,076,600 A | 2/1978 | Huebner |
| 4,117,205 A | 9/1978 | Kitai |
| 4,119,772 A | 10/1978 | Peters et al. |
| 4,132,837 A | 1/1979 | Soffer |
| 4,139,679 A | 2/1979 | Appleby et al. |
| 4,168,349 A | 9/1979 | Buzzelli |
| 4,201,653 A | 5/1980 | O'Neill et al. |
| 4,246,324 A | 1/1981 | de Nora et al. |
| 4,250,236 A | 2/1981 | Haschka et al. |
| 4,265,789 A | 5/1981 | Christopherson et al. |
| 4,312,927 A | 1/1982 | Salmon |
| 4,317,863 A | 3/1982 | Struthers |
| 4,331,460 A | 5/1982 | Dillmann et al. |
| 4,336,043 A | 6/1982 | Aonuma et al. |
| 4,340,449 A | 7/1982 | Srinivasan et al. |
| 4,369,235 A | 1/1983 | Bursell |
| 4,375,427 A | 3/1983 | Miller et al. |
| 4,384,928 A | 5/1983 | Hall |
| 4,385,101 A | 5/1983 | Catanzarite |
| 4,385,967 A | 5/1983 | Brady et al. |
| 4,386,141 A | 5/1983 | Weidner et al. |
| 4,447,504 A | 5/1984 | Goebel |
| 4,448,858 A | 5/1984 | Graf et al. |
| 4,450,211 A | 5/1984 | Vignaud |
| 4,461,817 A | 7/1984 | Itoh et al. |
| 4,479,856 A | 10/1984 | Ando |
| 4,484,936 A | 11/1984 | Sakai |
| 4,485,154 A | 11/1984 | Remick et al. |
| 4,487,818 A | 12/1984 | Ovshinsky et al. |
| 4,521,497 A | 6/1985 | Tamminen |
| 4,535,039 A | 8/1985 | Naarmann et al. |
| 4,552,630 A | 11/1985 | Wheeler et al. |
| 4,581,064 A | 4/1986 | Morrison et al. |
| 4,585,710 A | 4/1986 | McEvoy |
| 4,605,626 A | 8/1986 | Beck |
| 4,670,363 A | 6/1987 | Whitney et al. |
| 4,684,585 A | 8/1987 | Tamminen |
| 4,693,946 A | 9/1987 | Niksa et al. |
| 4,732,823 A | 3/1988 | Ito et al. |
| 4,765,799 A | 8/1988 | Waldrop |
| 4,828,942 A | 5/1989 | Licht |
| 4,842,963 A | 6/1989 | Ross, Jr. |
| 4,869,979 A | 9/1989 | Ohtani et al. |
| 4,871,627 A | 10/1989 | Strong et al. |
| 4,894,355 A | 1/1990 | Takeuchi et al. |
| 4,952,289 A | 8/1990 | Ciccone et al. |
| 4,977,044 A | 12/1990 | Ludwig |
| 5,009,755 A | 4/1991 | Shor |
| 5,011,747 A | 4/1991 | Strong et al. |
| 5,041,194 A | 8/1991 | Mori et al. |
| 5,093,213 A | 3/1992 | O'Callaghan |
| 5,104,497 A | 4/1992 | Tetzlaff et al. |
| 5,130,211 A | 7/1992 | Wilkinson et al. |
| 5,131,387 A | 7/1992 | French et al. |
| 5,145,752 A | 9/1992 | Goldstein et al. |
| 5,185,218 A | 2/1993 | Brokman et al. |
| 5,188,914 A | 2/1993 | Blomgren et al. |
| 5,190,833 A | 3/1993 | Goldstein et al. |
| 5,200,057 A | 4/1993 | Canaris |
| 5,242,763 A | 9/1993 | Konishi et al. |
| 5,242,765 A | 9/1993 | Naimer et al. |
| 5,284,176 A | 2/1994 | Campau |
| 5,318,861 A | 6/1994 | Harats et al. |
| 5,376,471 A | 12/1994 | Hunter et al. |
| 5,397,532 A | 3/1995 | Blaimschein |
| 5,411,815 A | 5/1995 | Goldstein |
| 5,415,949 A | 5/1995 | Stone et al. |
| 5,419,987 A | 5/1995 | Goldstein et al. |
| 5,431,823 A | 7/1995 | Gofer |
| 5,432,022 A | 7/1995 | Cheiky |
| 5,434,020 A | 7/1995 | Cooper |
| 5,439,758 A | 8/1995 | Stone et al. |
| 5,441,820 A | 8/1995 | Siu et al. |
| 5,445,724 A | 8/1995 | Burkhart et al. |
| 5,451,475 A | 9/1995 | Ohta et al. |
| 5,453,334 A | 9/1995 | Melichar |
| 5,458,988 A | 10/1995 | Putt |
| 5,506,067 A | 4/1996 | Tinker |
| 5,512,391 A | 4/1996 | Fleischer |
| 5,549,991 A | 8/1996 | Licht et al. |
| 5,567,540 A | 10/1996 | Stone et al. |
| 5,569,551 A | 10/1996 | Pedicini et al. |
| 5,569,560 A | 10/1996 | Olsen et al. |
| 5,595,949 A | 1/1997 | Goldstein et al. |
| 5,645,952 A | 7/1997 | Lampinen et al. |
| 5,650,240 A | 7/1997 | Rogers |
| 5,652,068 A | 7/1997 | Shuster et al. |
| 5,665,481 A | 9/1997 | Schuster et al. |
| 5,700,596 A | 12/1997 | Ikoma et al. |
| 5,707,757 A | 1/1998 | Lee |
| 5,712,061 A * | 1/1998 | Spak ........................ H01M 4/06 429/208 |
| 5,716,726 A | 2/1998 | Cheiky |
| 5,731,105 A | 3/1998 | Fleischer et al. |
| 5,733,667 A | 3/1998 | Nakasuji et al. |
| 5,788,943 A | 8/1998 | Aladjov |
| 5,789,585 A | 8/1998 | Lee et al. |
| 5,840,443 A | 11/1998 | Gregg et al. |

(56) References Cited

U.S. PATENT DOCUMENTS

| | | |
|---|---|---|
| 5,850,136 A | 12/1998 | Kaneko |
| 5,935,724 A | 8/1999 | Spillman et al. |
| 5,935,728 A | 8/1999 | Spillman et al. |
| 5,938,899 A | 8/1999 | Forand |
| 5,972,531 A | 10/1999 | Kawakami |
| 5,990,352 A | 11/1999 | Nobori et al. |
| 5,998,967 A | 12/1999 | Umeki et al. |
| 6,014,013 A | 1/2000 | Suppanz et al. |
| 6,025,696 A | 2/2000 | Lenhart et al. |
| 6,034,506 A | 3/2000 | Hall |
| 6,046,514 A | 4/2000 | Rouillard et al. |
| 6,054,840 A | 4/2000 | Nakanishi et al. |
| 6,057,052 A | 5/2000 | Shrim et al. |
| 6,091,230 A | 7/2000 | Winzer |
| 6,120,941 A | 9/2000 | Lee et al. |
| 6,127,061 A | 10/2000 | Shun et al. |
| 6,153,328 A | 11/2000 | Colborn |
| 6,162,333 A | 12/2000 | Lemon et al. |
| 6,162,555 A | 12/2000 | Gutierrez et al. |
| 6,164,309 A | 12/2000 | Brecht |
| 6,165,638 A | 12/2000 | Spillman et al. |
| 6,194,098 B1 | 2/2001 | Ying et al. |
| 6,207,037 B1 | 3/2001 | Dartnell et al. |
| 6,210,832 B1 | 4/2001 | Visco et al. |
| 6,211,650 B1 | 4/2001 | Mumaw et al. |
| 6,228,535 B1 | 5/2001 | Fierro et al. |
| 6,249,940 B1 | 6/2001 | Asano et al. |
| 6,265,846 B1 | 7/2001 | Flechsig et al. |
| 6,268,085 B1 | 7/2001 | Manthiram et al. |
| 6,271,646 B1 | 8/2001 | Evers et al. |
| 6,277,508 B1 | 8/2001 | Reiser et al. |
| 6,300,015 B1 | 10/2001 | Nishiyama et al. |
| 6,312,846 B1 | 11/2001 | Marsh |
| 6,355,369 B1 | 3/2002 | Iarochenko et al. |
| 6,358,643 B1 | 3/2002 | Katz et al. |
| 6,368,741 B1 | 4/2002 | Hackel et al. |
| 6,371,995 B1 | 4/2002 | Yasunami |
| 6,379,828 B1 | 4/2002 | Worth |
| 6,383,673 B1 | 5/2002 | Faris et al. |
| 6,383,675 B1 | 5/2002 | Zhong |
| 6,410,174 B1 | 6/2002 | Faris |
| 6,416,649 B1 | 7/2002 | Ray et al. |
| 6,436,576 B1 * | 8/2002 | Hossain .............. H01M 4/587 429/231.2 |
| 6,458,480 B1 | 10/2002 | Morris et al. |
| 6,465,638 B2 | 10/2002 | Gorman et al. |
| 6,465,643 B1 | 10/2002 | Schiemenz et al. |
| 6,472,093 B2 | 10/2002 | Faris et al. |
| 6,475,658 B1 | 11/2002 | Pedicini et al. |
| 6,537,701 B1 | 3/2003 | Nimon et al. |
| 6,541,151 B2 | 4/2003 | Minamiura et al. |
| 6,541,941 B2 | 4/2003 | Adams et al. |
| 6,544,678 B2 | 4/2003 | Faris et al. |
| 6,558,830 B2 | 5/2003 | Faris et al. |
| 6,562,494 B1 | 5/2003 | Tsai et al. |
| 6,562,504 B2 | 5/2003 | Faris et al. |
| 6,566,000 B1 | 5/2003 | Iarochenko et al. |
| 6,569,555 B1 | 5/2003 | Faris et al. |
| 6,579,637 B1 | 6/2003 | Savage et al. |
| 6,586,909 B1 | 7/2003 | Trepka |
| 6,641,943 B1 | 11/2003 | Faris et al. |
| 6,645,904 B2 | 11/2003 | Schiemenz et al. |
| 6,646,418 B1 | 11/2003 | Xie et al. |
| 6,649,294 B2 | 11/2003 | Faris et al. |
| 6,653,252 B2 | 11/2003 | Kawahara |
| 6,666,909 B1 | 12/2003 | TeGrotenhuis et al. |
| 6,673,490 B2 | 1/2004 | Miki et al. |
| 6,677,077 B2 | 1/2004 | Spillman et al. |
| 6,706,433 B2 | 3/2004 | Pinto et al. |
| 6,713,206 B2 | 3/2004 | Markoski et al. |
| 6,756,149 B2 | 6/2004 | Knights et al. |
| 6,762,587 B1 | 7/2004 | Barbetta |
| 6,764,588 B2 | 7/2004 | Smedley et al. |
| 6,776,929 B2 | 8/2004 | Hossan et al. |
| 6,786,226 B2 | 9/2004 | Crook et al. |
| 6,787,260 B2 | 9/2004 | Smedley |
| 6,790,265 B2 | 9/2004 | Joshi et al. |
| 6,802,946 B2 | 10/2004 | Basol et al. |
| 6,811,819 B2 | 11/2004 | Joshi et al. |
| 6,811,903 B2 | 11/2004 | Vartak et al. |
| 6,822,423 B2 | 11/2004 | Yau et al. |
| 6,838,203 B2 | 1/2005 | Zheng |
| 6,849,172 B2 | 2/2005 | Rigby et al. |
| 6,849,356 B2 | 2/2005 | Dow et al. |
| 6,855,455 B1 | 2/2005 | Berger et al. |
| 6,858,347 B2 | 2/2005 | Tanigawa et al. |
| 6,866,950 B2 | 3/2005 | Connor et al. |
| 6,899,974 B2 | 5/2005 | Kamisuki et al. |
| 6,902,602 B2 | 6/2005 | Keefer et al. |
| 6,911,274 B1 | 6/2005 | Colborn et al. |
| 6,942,105 B2 | 9/2005 | Smedley et al. |
| 6,949,310 B2 | 9/2005 | Phillips |
| 6,962,992 B2 | 11/2005 | Martin et al. |
| 6,967,064 B2 | 11/2005 | Haltiner, Jr. et al. |
| 6,986,964 B2 | 1/2006 | Faris |
| 7,020,355 B2 | 3/2006 | Lahann et al. |
| 7,040,431 B2 | 5/2006 | Tartamella et al. |
| 7,060,388 B2 | 6/2006 | Naruoka |
| 7,070,632 B1 | 7/2006 | Visco et al. |
| 7,126,310 B1 | 10/2006 | Barron |
| 7,150,933 B1 | 12/2006 | McLean |
| 7,201,857 B2 | 4/2007 | Ovshinsky et al. |
| 7,226,676 B2 | 6/2007 | Faris et al. |
| 7,238,440 B2 | 7/2007 | Damore et al. |
| 7,252,898 B2 | 8/2007 | Markoski et al. |
| 7,270,906 B2 | 9/2007 | Haltiner, Jr. et al. |
| 7,273,541 B2 | 9/2007 | Choban et al. |
| 7,276,309 B2 | 10/2007 | Smedley et al. |
| 7,279,245 B1 | 10/2007 | Clark |
| 7,285,362 B2 | 10/2007 | Harrup et al. |
| 7,291,186 B2 | 11/2007 | Zhang |
| 7,303,835 B2 | 12/2007 | Mathias et al. |
| 7,466,104 B2 | 12/2008 | Wang et al. |
| 7,468,221 B2 | 12/2008 | LaFollette et al. |
| 7,482,081 B2 | 1/2009 | Hong |
| 7,488,547 B1 | 2/2009 | Iacovelli |
| 7,535,199 B2 | 5/2009 | Kimura et al. |
| 7,556,056 B2 | 7/2009 | Hutchinson |
| 7,598,796 B2 | 10/2009 | Mizuno et al. |
| 7,670,575 B2 | 3/2010 | Jarvinen et al. |
| 7,670,705 B2 | 3/2010 | Ueda et al. |
| 7,670,724 B1 | 3/2010 | Chan et al. |
| 7,722,988 B2 | 5/2010 | Webber |
| 7,794,582 B1 | 9/2010 | Cook et al. |
| 7,964,300 B2 | 6/2011 | Nakazawa et al. |
| 7,997,425 B2 | 8/2011 | Golden et al. |
| 8,058,165 B2 | 11/2011 | Kawano et al. |
| 8,168,337 B2 | 5/2012 | Friesen et al. |
| 8,309,259 B2 | 11/2012 | Friesen et al. |
| 8,329,346 B2 | 12/2012 | Janse Van Rensburg et al. |
| 8,397,508 B2 | 3/2013 | Weimer et al. |
| 8,481,207 B2 | 7/2013 | Friesen et al. |
| 8,491,763 B2 | 7/2013 | Friesen |
| 8,492,052 B2 | 7/2013 | Friesen et al. |
| 8,632,921 B2 | 1/2014 | Friesen et al. |
| 8,659,268 B2 | 2/2014 | Krishnan et al. |
| 8,758,948 B2 | 6/2014 | Narayan et al. |
| 8,877,391 B2 | 11/2014 | Friesen et al. |
| 8,895,197 B2 | 11/2014 | Friesen et al. |
| 8,906,563 B2 | 12/2014 | Friesen et al. |
| 8,911,910 B2 | 12/2014 | Krishnan et al. |
| 9,065,120 B2 | 6/2015 | Carlson |
| 9,105,910 B2 | 8/2015 | Friesen et al. |
| 9,105,946 B2 | 8/2015 | Friesen et al. |
| 9,172,123 B2 | 10/2015 | Albertus et al. |
| 9,178,207 B2 | 11/2015 | Friesen et al. |
| 9,214,708 B2 | 12/2015 | Friesen et al. |
| 9,263,779 B2 | 2/2016 | Lee et al. |
| 9,269,995 B2 | 2/2016 | Friesen et al. |
| 9,269,996 B2 | 2/2016 | Friesen et al. |
| 9,269,998 B2 | 2/2016 | Hayes et al. |
| 9,368,486 B2 | 6/2016 | Licht |
| 9,368,788 B2 | 6/2016 | Ogg et al. |
| 9,419,273 B2 | 8/2016 | Kakeya et al. |

(56) References Cited

U.S. PATENT DOCUMENTS

| | | |
|---|---|---|
| 9,478,806 B2 | 10/2016 | Ogg et al. |
| 9,537,144 B2 | 1/2017 | Huang et al. |
| 9,559,385 B2 | 1/2017 | Ogg et al. |
| 9,577,298 B2 | 2/2017 | Narayan et al. |
| 9,583,779 B2 | 2/2017 | Chiang et al. |
| 9,660,265 B2 | 5/2017 | Visco et al. |
| 9,680,151 B2 | 6/2017 | Mullins |
| 9,680,154 B2 | 6/2017 | Chen et al. |
| 9,780,379 B2 | 10/2017 | Zhamu et al. |
| 9,843,064 B2 | 12/2017 | Brandon et al. |
| 9,893,397 B2 | 2/2018 | Yoshida et al. |
| 9,911,985 B2 | 3/2018 | Dong et al. |
| 9,947,481 B2 | 4/2018 | Solomon et al. |
| 10,008,754 B2 | 6/2018 | Englert |
| 10,014,530 B2 | 7/2018 | Lang et al. |
| 10,033,036 B2 | 7/2018 | Christensen et al. |
| 10,044,082 B2 | 8/2018 | Suyama et al. |
| 10,147,988 B2 | 12/2018 | Park et al. |
| 10,177,426 B2 | 1/2019 | Nitta |
| 10,530,001 B2 | 1/2020 | Finkelshtain et al. |
| 11,228,066 B2 | 1/2022 | Krishnan et al. |
| 11,611,115 B2 | 3/2023 | Pham et al. |
| 2001/0007725 A1 | 7/2001 | Faris et al. |
| 2002/0015871 A1 | 2/2002 | Tao et al. |
| 2002/0028372 A1 | 3/2002 | Ohlsen et al. |
| 2002/0045075 A1 | 4/2002 | Pinto et al. |
| 2002/0076602 A1 | 6/2002 | Finkelshtain et al. |
| 2002/0098398 A1 | 7/2002 | Chen |
| 2002/0142203 A1 | 10/2002 | Ma et al. |
| 2002/0155351 A1 | 10/2002 | Licht |
| 2003/0054217 A1 | 3/2003 | Faris |
| 2003/0077501 A1 | 4/2003 | Knights et al. |
| 2003/0099882 A1 | 5/2003 | Hampden-Smith et al. |
| 2003/0134163 A1 | 7/2003 | Markoski et al. |
| 2003/0143446 A1 | 7/2003 | Faris et al. |
| 2003/0165727 A1 | 9/2003 | Priestnall et al. |
| 2003/0190504 A1 | 10/2003 | Fisher et al. |
| 2003/0198862 A1 | 10/2003 | Struthers |
| 2004/0005488 A1 | 1/2004 | Faris et al. |
| 2004/0023112 A1 | 2/2004 | Lin |
| 2004/0029723 A1 | 2/2004 | Schiemenz et al. |
| 2004/0031251 A1 | 2/2004 | Priess |
| 2004/0053132 A1 | 3/2004 | Smedley et al. |
| 2004/0058203 A1 | 3/2004 | Priestnall et al. |
| 2004/0058217 A1 | 3/2004 | Ohlsen et al. |
| 2004/0058226 A1 | 3/2004 | Lamarre et al. |
| 2004/0086779 A1 | 5/2004 | Higley et al. |
| 2004/0104124 A1 | 6/2004 | Cobley et al. |
| 2004/0110049 A1 | 6/2004 | Shimotori et al. |
| 2004/0121208 A1 | 6/2004 | James et al. |
| 2004/0146764 A1 | 7/2004 | Tsai et al. |
| 2004/0157092 A1 | 8/2004 | Kimberg et al. |
| 2004/0157101 A1 | 8/2004 | Smedley |
| 2004/0175603 A1 | 9/2004 | Yang et al. |
| 2004/0180246 A1 | 9/2004 | Smedley |
| 2004/0185323 A1 | 9/2004 | Fowler et al. |
| 2004/0185328 A1 | 9/2004 | Lin et al. |
| 2004/0221426 A1 | 11/2004 | Igawa et al. |
| 2004/0225249 A1 | 11/2004 | Leonard et al. |
| 2004/0229107 A1 | 11/2004 | Smedley |
| 2004/0247969 A1 | 12/2004 | Faris et al. |
| 2005/0019634 A1 | 1/2005 | Legg |
| 2005/0019651 A1 | 1/2005 | Tsai et al. |
| 2005/0031911 A1 | 2/2005 | Venkatesan et al. |
| 2005/0042503 A1 | 2/2005 | Kim et al. |
| 2005/0084737 A1 | 4/2005 | Wine et al. |
| 2005/0105229 A1 | 5/2005 | Deng et al. |
| 2005/0123815 A1 | 6/2005 | Tsai et al. |
| 2005/0142398 A1 | 6/2005 | Browall et al. |
| 2005/0170245 A1 | 8/2005 | Vartak et al. |
| 2005/0196656 A1 | 9/2005 | Gomez |
| 2005/0208343 A1 | 9/2005 | Kim et al. |
| 2005/0233191 A1 | 10/2005 | Ushio |
| 2006/0003217 A1 | 1/2006 | Cohen et al. |
| 2006/0024551 A1 | 2/2006 | Smotkin |
| 2006/0038536 A1 | 2/2006 | LaFollette et al. |
| 2006/0039853 A1 | 2/2006 | Fan et al. |
| 2006/0040174 A1 | 2/2006 | Peabody |
| 2006/0076295 A1 | 4/2006 | Leonard et al. |
| 2006/0107639 A1 | 5/2006 | Hamlin et al. |
| 2006/0127731 A1 | 6/2006 | Faris |
| 2006/0175720 A1 | 8/2006 | Kerfoot |
| 2006/0194107 A1 | 8/2006 | Licht |
| 2006/0210867 A1 | 9/2006 | Kenis et al. |
| 2006/0228622 A1 | 10/2006 | Cohen et al. |
| 2006/0234855 A1 | 10/2006 | Gorte et al. |
| 2006/0269826 A1 | 11/2006 | Katz et al. |
| 2006/0281000 A1 | 12/2006 | Hayashigawa |
| 2006/0292407 A1 | 12/2006 | Gervasio et al. |
| 2007/0020496 A1 | 1/2007 | Pelton et al. |
| 2007/0048577 A1 | 3/2007 | Ringeisen et al. |
| 2007/0077491 A1 | 4/2007 | Burchardt |
| 2007/0092787 A1 | 4/2007 | Wang Chen |
| 2007/0099037 A1 | 5/2007 | Senner |
| 2007/0120091 A1 | 5/2007 | Ovshinsky et al. |
| 2007/0134527 A1 | 6/2007 | Desouza et al. |
| 2007/0141415 A1 | 6/2007 | Yang et al. |
| 2007/0141430 A1 | 6/2007 | Huang et al. |
| 2007/0141432 A1 | 6/2007 | Wang et al. |
| 2007/0141440 A1 | 6/2007 | Yang et al. |
| 2007/0141450 A1 | 6/2007 | Yang et al. |
| 2007/0154766 A1 | 7/2007 | Baik et al. |
| 2007/0166602 A1 | 7/2007 | Burchardt |
| 2007/0184314 A1 | 8/2007 | Kagami |
| 2007/0224500 A1 | 9/2007 | White et al. |
| 2007/0234900 A1 | 10/2007 | Soloveichik et al. |
| 2007/0237993 A1 | 10/2007 | Carlsson et al. |
| 2007/0248845 A1 | 10/2007 | Armstrong et al. |
| 2007/0248868 A1 | 10/2007 | Haltiner et al. |
| 2007/0259234 A1 | 11/2007 | Chua et al. |
| 2007/0264550 A1 | 11/2007 | Zhang et al. |
| 2007/0269695 A1 | 11/2007 | Yamazaki et al. |
| 2007/0278107 A1 | 12/2007 | Barnett et al. |
| 2007/0283811 A1 | 12/2007 | Wu |
| 2007/0287034 A1 | 12/2007 | Minteer et al. |
| 2008/0008911 A1 | 1/2008 | Stroock et al. |
| 2008/0009780 A1 | 1/2008 | Leonard et al. |
| 2008/0026265 A1 | 1/2008 | Markoski et al. |
| 2008/0032170 A1 | 2/2008 | Wainright et al. |
| 2008/0044721 A1 | 2/2008 | Heller et al. |
| 2008/0118826 A1 | 5/2008 | Shimamura et al. |
| 2008/0131762 A1 | 6/2008 | Joo et al. |
| 2008/0145719 A1 | 6/2008 | Yang et al. |
| 2008/0145721 A1 | 6/2008 | Shapiro et al. |
| 2008/0145737 A1 | 6/2008 | Cai et al. |
| 2008/0154101 A1 | 6/2008 | Jain et al. |
| 2008/0231231 A1 | 9/2008 | Hartzog |
| 2008/0241617 A1 | 10/2008 | Sato |
| 2008/0252257 A1 | 10/2008 | Sufrin-Disler et al. |
| 2008/0268341 A1 | 10/2008 | Zhang |
| 2009/0018668 A1 | 1/2009 | Galbraith |
| 2009/0027006 A1 | 1/2009 | Vezzini et al. |
| 2009/0081488 A1 | 3/2009 | Sato et al. |
| 2009/0087700 A1 | 4/2009 | Carlisle et al. |
| 2009/0117429 A1 | 5/2009 | Zillmer et al. |
| 2009/0163394 A1 | 6/2009 | Muraishi et al. |
| 2009/0167242 A1 | 7/2009 | Naganuma et al. |
| 2009/0230921 A1 | 9/2009 | Hsu et al. |
| 2009/0233153 A1 | 9/2009 | Carlisle et al. |
| 2009/0239131 A1 | 9/2009 | Winter |
| 2009/0239132 A1 | 9/2009 | Johnson |
| 2009/0284229 A1 | 11/2009 | Friesen et al. |
| 2009/0286149 A1 | 11/2009 | Ci et al. |
| 2009/0305090 A1 | 12/2009 | Chuang |
| 2010/0003570 A1 | 1/2010 | Finsterwalder et al. |
| 2010/0055508 A1 | 3/2010 | Renn |
| 2010/0062303 A1 | 3/2010 | Bae et al. |
| 2010/0062313 A1 | 3/2010 | Browning et al. |
| 2010/0119895 A1 | 5/2010 | Friesen |
| 2010/0119956 A1 | 5/2010 | Tokuda et al. |
| 2010/0196768 A1* | 8/2010 | Roberts ............... H01M 50/70 429/406 |
| 2010/0261272 A1 | 10/2010 | Chalmers et al. |
| 2010/0266907 A1 | 10/2010 | Yazami |

(56) References Cited

U.S. PATENT DOCUMENTS

| | | |
|---|---|---|
| 2010/0285375 A1 | 11/2010 | Friesen et al. |
| 2010/0310905 A1 | 12/2010 | Oriet et al. |
| 2010/0310933 A1* | 12/2010 | Jiang ............... H01M 4/5815 |
| | | 429/188 |
| 2010/0310947 A1 | 12/2010 | Rich et al. |
| 2010/0316935 A1 | 12/2010 | Friesen et al. |
| 2011/0023428 A1 | 2/2011 | Ziebold et al. |
| 2011/0027648 A1 | 2/2011 | Rolison et al. |
| 2011/0039181 A1 | 2/2011 | Friesen et al. |
| 2011/0044528 A1 | 2/2011 | Tsuchiya et al. |
| 2011/0045325 A1 | 2/2011 | Anzai et al. |
| 2011/0059355 A1 | 3/2011 | Zhang et al. |
| 2011/0070481 A1 | 3/2011 | Liang et al. |
| 2011/0070506 A1 | 3/2011 | Friesen et al. |
| 2011/0086278 A1 | 4/2011 | Friesen et al. |
| 2011/0111314 A1 | 5/2011 | Cui et al. |
| 2011/0143219 A1 | 6/2011 | Weiss et al. |
| 2011/0189551 A1 | 8/2011 | Friesen et al. |
| 2011/0200893 A1 | 8/2011 | Friesen et al. |
| 2011/0236730 A1 | 9/2011 | Jones |
| 2011/0250512 A1 | 10/2011 | Friesen et al. |
| 2011/0281184 A1 | 11/2011 | Friesen et al. |
| 2011/0305959 A1 | 12/2011 | Friesen et al. |
| 2011/0316485 A1 | 12/2011 | Krishnan et al. |
| 2012/0009491 A1 | 1/2012 | Friesen et al. |
| 2012/0015264 A1 | 1/2012 | Friesen et al. |
| 2012/0021303 A1 | 1/2012 | Amendola et al. |
| 2012/0034536 A1 | 2/2012 | Isom et al. |
| 2012/0052404 A1 | 3/2012 | Friesen et al. |
| 2012/0068667 A1 | 3/2012 | Friesen et al. |
| 2012/0098499 A1 | 4/2012 | Friesen et al. |
| 2012/0139496 A1 | 6/2012 | Krishnan et al. |
| 2012/0187918 A1 | 7/2012 | Narayan et al. |
| 2012/0193224 A1 | 8/2012 | Suk |
| 2012/0193242 A1 | 8/2012 | Marchal |
| 2012/0202127 A1 | 8/2012 | Friesen et al. |
| 2012/0237838 A1 | 9/2012 | Uesaka |
| 2012/0295172 A1 | 11/2012 | Peled et al. |
| 2012/0321969 A1 | 12/2012 | Friesen et al. |
| 2012/0321970 A1 | 12/2012 | Friesen et al. |
| 2013/0022881 A1 | 1/2013 | Friesen et al. |
| 2013/0052013 A1 | 2/2013 | Eckart |
| 2013/0095393 A1 | 4/2013 | Friesen et al. |
| 2013/0106359 A1 | 5/2013 | Noda et al. |
| 2013/0115523 A1 | 5/2013 | Friesen et al. |
| 2013/0115525 A1 | 5/2013 | Friesen et al. |
| 2013/0115526 A1 | 5/2013 | Friesen et al. |
| 2013/0115531 A1 | 5/2013 | Amendola et al. |
| 2013/0115532 A1 | 5/2013 | Friesen et al. |
| 2013/0115533 A1 | 5/2013 | Friesen et al. |
| 2013/0149615 A1 | 6/2013 | Narayan et al. |
| 2013/0183591 A1 | 7/2013 | Dickson |
| 2013/0189592 A1 | 7/2013 | Roumi et al. |
| 2013/0285597 A1* | 10/2013 | Goldstein ............. H01M 10/46 |
| | | 320/107 |
| 2013/0295471 A1 | 11/2013 | Visco et al. |
| 2014/0091631 A1 | 4/2014 | Naden et al. |
| 2014/0162096 A1 | 6/2014 | Lex et al. |
| 2014/0162129 A1 | 6/2014 | Kim et al. |
| 2014/0217985 A1 | 8/2014 | Gifford et al. |
| 2014/0220256 A1 | 8/2014 | Ogg |
| 2014/0220432 A1 | 8/2014 | Ogg et al. |
| 2014/0220434 A1 | 8/2014 | Ogg |
| 2014/0220435 A1 | 8/2014 | Ogg et al. |
| 2014/0220440 A1 | 8/2014 | Ogg |
| 2014/0220460 A1 | 8/2014 | Ogg et al. |
| 2014/0227615 A1 | 8/2014 | Friesen et al. |
| 2014/0234730 A1 | 8/2014 | Albertus et al. |
| 2014/0262760 A1 | 9/2014 | Hayes et al. |
| 2014/0272477 A1 | 9/2014 | West et al. |
| 2014/0342214 A1 | 11/2014 | Wegner et al. |
| 2015/0010833 A1 | 1/2015 | Amendola et al. |
| 2015/0086884 A1 | 3/2015 | Narayan et al. |
| 2015/0140360 A1* | 5/2015 | Arthur ................ H01M 50/449 |
| | | 29/623.5 |
| 2015/0140455 A1* | 5/2015 | Imano ................ H01M 12/08 |
| | | 429/405 |
| 2015/0200431 A1 | 7/2015 | Martirosyan et al. |
| 2015/0295291 A1 | 10/2015 | Sata et al. |
| 2015/0372357 A1 | 12/2015 | Kruglak et al. |
| 2016/0020493 A1 | 1/2016 | Van Dijk et al. |
| 2016/0036094 A1 | 2/2016 | Ogg |
| 2016/0036095 A1 | 2/2016 | Ogg |
| 2016/0045841 A1 | 2/2016 | Kaplan et al. |
| 2016/0111730 A1 | 4/2016 | Kim et al. |
| 2016/0118636 A1 | 4/2016 | Jin et al. |
| 2016/0248136 A1 | 8/2016 | Bugga et al. |
| 2016/0293978 A1 | 10/2016 | Krishnan et al. |
| 2016/0308220 A1 | 10/2016 | Qi et al. |
| 2017/0141434 A1 | 5/2017 | Narayan et al. |
| 2017/0170451 A1 | 6/2017 | Englert |
| 2017/0173557 A1 | 6/2017 | Olson et al. |
| 2017/0207464 A1 | 7/2017 | Gyenge et al. |
| 2017/0271731 A1* | 9/2017 | Hayashi ............ H01M 50/409 |
| 2017/0301922 A1* | 10/2017 | Goodenough ........ H01M 4/40 |
| 2017/0346471 A1 | 11/2017 | Weisenstein et al. |
| 2017/0352936 A1 | 12/2017 | Jin |
| 2018/0010228 A1 | 1/2018 | Ogg et al. |
| 2018/0048041 A1* | 2/2018 | Chen ................... H01M 8/225 |
| 2018/0123116 A1 | 5/2018 | Lee et al. |
| 2018/0145383 A1 | 5/2018 | Krishnan et al. |
| 2018/0219220 A1 | 8/2018 | Hayashi et al. |
| 2018/0241107 A1 | 8/2018 | Su et al. |
| 2018/0287237 A1 | 10/2018 | Manthiram et al. |
| 2018/0366799 A1 | 12/2018 | Amendola et al. |
| 2019/0006122 A1* | 1/2019 | Peled ..................... H01G 11/84 |
| 2019/0006695 A1 | 1/2019 | Swiegers et al. |
| 2019/0051908 A1* | 2/2019 | Chen ................... H01M 12/08 |
| 2019/0074536 A1 | 3/2019 | Lee et al. |
| 2019/0229343 A1 | 7/2019 | Roumi et al. |
| 2020/0006745 A1 | 1/2020 | Westwood et al. |
| 2020/0006796 A1 | 1/2020 | Su et al. |
| 2020/0006896 A1 | 1/2020 | Mahadik et al. |
| 2020/0036002 A1 | 1/2020 | Chakraborty et al. |
| 2020/0136153 A1 | 4/2020 | Jaramillo et al. |
| 2020/0266423 A1 | 8/2020 | Kitagawa et al. |
| 2020/0280064 A1 | 9/2020 | Takahashi et al. |
| 2020/0411879 A1 | 12/2020 | Hartman et al. |
| 2020/0411932 A1 | 12/2020 | Weber et al. |
| 2021/0013536 A1 | 1/2021 | Golden et al. |
| 2021/0028452 A1 | 1/2021 | Su et al. |
| 2021/0028457 A1 | 1/2021 | Newhouse et al. |

FOREIGN PATENT DOCUMENTS

| | | | |
|---|---|---|---|
| CN | 1543685 A | 11/2004 | |
| CN | 2888658 Y | 4/2007 | |
| CN | 101142706 A | 3/2008 | |
| CN | 102232004 A | 11/2011 | |
| CN | 103003199 A | 3/2013 | |
| CN | 103098299 A | 5/2013 | |
| CN | 103400947 A | 11/2013 | |
| CN | 103443982 A | 12/2013 | |
| CN | 103515636 A | 1/2014 | |
| CN | 104269570 A | 1/2015 | |
| CN | 104767006 A * | 7/2015 | |
| CN | 206340592 U | 7/2017 | |
| CN | 107369813 A * | 11/2017 | .......... H01M 10/052 |
| CN | 109478653 A | 3/2019 | |
| DE | 1266021 B | 4/1968 | |
| EP | 0037634 A1 | 10/1981 | |
| EP | 0058090 A1 | 8/1982 | |
| EP | 0277937 A1 | 8/1988 | |
| EP | 0677883 A1 | 10/1995 | |
| EP | 0598144 B1 | 10/1996 | |
| EP | 0637291 B1 | 10/1997 | |
| EP | 0664932 B1 | 1/1998 | |
| EP | 0832502 A1 | 4/1998 | |
| EP | 0823135 B1 | 11/1998 | |
| EP | 0895528 A1 | 2/1999 | |
| EP | 0987349 A1 | 3/2000 | |
| EP | 0835334 B1 | 9/2002 | |
| EP | 1027747 B1 | 9/2002 | |
| EP | 1413001 B1 | 4/2005 | |

(56) References Cited

FOREIGN PATENT DOCUMENTS

| | | |
|---|---|---|
| EP | 1266413 B1 | 5/2005 |
| EP | 1723687 A1 | 11/2006 |
| EP | 1723687 B1 | 5/2010 |
| EP | 2274781 A1 | 1/2011 |
| EP | 1977475 B1 | 2/2012 |
| EP | 2486622 B1 | 7/2014 |
| EP | 2424016 B1 | 10/2014 |
| EP | 2823528 B1 | 3/2016 |
| EP | 2586092 B1 | 1/2017 |
| EP | 2619835 B1 | 6/2017 |
| EP | 2792004 B1 | 11/2017 |
| EP | 2721688 B1 | 2/2018 |
| EP | 2774205 B1 | 3/2018 |
| EP | 2954583 B1 | 4/2018 |
| EP | 2559097 B1 | 5/2018 |
| EP | 2596545 B1 | 6/2018 |
| EP | 2659536 B1 | 8/2018 |
| GB | 1238356 A | 7/1971 |
| GB | 1286173 A | 8/1972 |
| IN | 201917002254 A | 4/2019 |
| JP | S4827097 A | 4/1973 |
| JP | S4827097 B1 | 8/1973 |
| JP | S56500790 A | 6/1981 |
| JP | S56162870 A | 12/1981 |
| JP | S56162870 U | 12/1981 |
| JP | H01159973 A | 6/1989 |
| JP | H01163977 A | 6/1989 |
| JP | H0790662 A | 4/1995 |
| JP | H109501256 A | 2/1997 |
| JP | H10509554 A | 9/1998 |
| JP | 2000205200 A | 7/2000 |
| JP | 2002-194411 A | 7/2002 |
| JP | 3387724 B2 | 1/2003 |
| JP | 2008251491 A | 10/2008 |
| JP | 2008277315 A | 11/2008 |
| JP | 2009529213 A | 8/2009 |
| JP | 2009543674 A | 12/2009 |
| JP | 2010140736 A | 6/2010 |
| JP | 2010-192313 A | 9/2010 |
| JP | 2010-262876 A | 11/2010 |
| JP | 2011003313 A * | 1/2011 |
| JP | 2011173083 A | 9/2011 |
| JP | 2011228079 A | 11/2011 |
| JP | 2012518095 A | 8/2012 |
| JP | 2013503257 A | 1/2013 |
| JP | 2013505544 A | 2/2013 |
| JP | 2013507741 A | 3/2013 |
| JP | 2013134838 A | 7/2013 |
| JP | 2014127289 A | 7/2014 |
| JP | 2014150056 A | 8/2014 |
| JP | 2015076379 A | 4/2015 |
| JP | 2016091605 A | 5/2016 |
| JP | 5952540 B2 | 6/2016 |
| JP | 6032018 B2 | 11/2016 |
| JP | 2017076595 A * | 4/2017 ............. H01M 6/34 |
| JP | 2017-139231 A | 8/2017 |
| JP | 6234917 B2 | 11/2017 |
| JP | 2017216126 A | 12/2017 |
| JP | 2018006057 A | 1/2018 |
| JP | 2018067399 A | 4/2018 |
| JP | 6352884 B2 | 6/2018 |
| JP | 6363244 B2 | 7/2018 |
| JP | 2018529207 A | 10/2018 |
| JP | 6682102 B2 | 3/2020 |
| KR | 2012122053 A * | 11/2012 |
| KR | 10-20140068850 A | 6/2014 |
| KR | 10-20160115912 A | 10/2016 |
| KR | 10-2018-0063144 A | 6/2018 |
| KR | 20190066865 A | 6/2019 |
| WO | WO8402429 A1 | 6/1984 |
| WO | 8905528 A1 | 6/1989 |
| WO | 9321664 A1 | 10/1993 |
| WO | 0201666 A2 | 1/2002 |
| WO | 2008058165 A2 | 5/2008 |
| WO | 2009087917 A1 | 7/2009 |
| WO | WO2010065890 A1 | 6/2010 |
| WO | 2011035176 A1 | 3/2011 |
| WO | 2011044528 A1 | 4/2011 |
| WO | 2011103142 A1 | 8/2011 |
| WO | 2011163553 A1 | 12/2011 |
| WO | 2012012364 A1 | 1/2012 |
| WO | WO2012012558 A2 | 1/2012 |
| WO | WO2012138576 A1 | 10/2012 |
| WO | 2012156972 A1 | 11/2012 |
| WO | WO2012174433 A3 | 12/2012 |
| WO | WO2013005050 A1 | 1/2013 |
| WO | 2013053653 A2 | 4/2013 |
| WO | 2013090680 A2 | 6/2013 |
| WO | 2014124386 A1 | 8/2014 |
| WO | WO2014142666 A1 | 9/2014 |
| WO | WO2015042573 A1 | 3/2015 |
| WO | WO-2015076299 A1 * | 5/2015 ............. H01M 12/06 |
| WO | WO-2015119041 A1 * | 8/2015 ......... H01M 4/8892 |
| WO | WO2015145690 A1 | 10/2015 |
| WO | WO2015150784 A1 | 10/2015 |
| WO | WO-2016088673 A1 * | 6/2016 ............. H01M 50/10 |
| WO | WO-2016138594 A1 * | 9/2016 ............. H01M 8/225 |
| WO | 2016197109 A1 | 12/2016 |
| WO | WO2017-006666 A1 | 1/2017 |
| WO | WO-2017045072 A1 * | 3/2017 ............. H01M 8/225 |
| WO | WO-2017049414 A1 * | 3/2017 ............. H01M 12/08 |
| WO | WO2017075577 A1 | 5/2017 |
| WO | WO2017117373 A1 | 7/2017 |
| WO | WO2017-223219 A1 | 12/2017 |
| WO | WO2018009930 A2 | 1/2018 |
| WO | WO2018018036 A1 | 1/2018 |
| WO | WO2018052376 A1 | 3/2018 |
| WO | WO2018187561 A1 | 10/2018 |
| WO | WO2020006419 A1 | 1/2020 |
| WO | WO2020006436 A1 | 1/2020 |
| WO | WO2020006506 A2 | 1/2020 |
| WO | WO2020023912 A1 | 1/2020 |
| WO | WO-2020067226 A1 * | 4/2020 |
| WO | WO2020264344 A1 | 12/2020 |
| WO | WO2020264386 A1 | 12/2020 |
| WO | WO2020264415 A1 | 12/2020 |
| WO | WO2021021681 A1 | 2/2021 |
| WO | WO2021021685 A1 | 2/2021 |

OTHER PUBLICATIONS

Sayilgan, E. et al., "A review of technologies for the recovery of metals from spent alkaline and zinc-carbon batteries", Hydrometallurgy, 2009, vol. 97, Issues 3-4, pp. 158-166.

Tekin, B. et al., "A New Sodium-Based Aqueous Rechargeable Battery System: The Special Case of Na0.44MnO2/Dissolved Sodium Polysulfide," View online DOI: 10.1002/ente.201700245, Energy Technol. vol. 5, pp. 2182-2188, (2017).

Tian, B. et al., "The effect of Na2S additive in alkaline electrolyte on improved performances of Fe-based air batteries," Electrochimica Acta, vol. 259, pp. 196-203, (2018).

Trocino, S. et al., "High performance solid-state iron-air rechargeable ceramic battery operating at intermediate temperatures (500-650° C.)," Applied Energy, pp. 233-234 & pp. 386-394, (2019).

Vijayamohanan, K. et al., "Rechargeable Alkaline Iron Electrodes," Journal of Power Sources, vol. 34, pp. 269-285, (1991).

Wei, X. et al., "An Aqueous Redox Flow Battery Based on Neutral Alkali Metal Ferri/ferrocyanide and Polysulfide Electrolytes," Journal of The Electrochemical Society, vol. 163, No. 1, pp. A5150-A5153, (2016).

Wilke, S. K. et al., "Structural evolution of directionally freeze-cast iron foams during oxidation/reduction cycles," Acta Materialia, vol. 162, pp. 90-102, (2019).

Yang, B. et al., "Organo-Sulfur Molecules enable iron-based battery electrodes to meet the challenges of large-scale electrical energy storage," Energy Environ. Sci., vol. 7, pp. 2753-2763, (2014).

Yang, C. et al., "Unique aqueous Li-ion/sulfur chemistry with high energy density and reversibility," View online, www.pnas.org/cgi/doi/10.1073/pnas.1703937114, PNAS, vol. 114, No. 24, pp. 6197-6202, (2017).

(56) References Cited

OTHER PUBLICATIONS

You, S. et al., "A microbial fuel cell using permanganate as the cathodic electron acceptor," Journal of Power Sources, vol. 162, pp. 1409-1415, (2006).
Yu, X. et al., "A Voltage-Enhanced, Low-Cost Aqueous Iron-Air Battery Enabled with a Mediator-Ion Solid Electrolyte," View Online DOI: 10.1021/acsenergylett.7b00168, ACS Energy Lett., vol. 2, pp. 1050-1055, (2017).
Yun, S. et al., "Materials and Device Constructions for Aqueous Lithium-Sulfur Batteries," View online DOI: 10.1002/adfm. 201707593, Adv. Funct. Mater., vol. 28, pp. 1-17 (1707593), (2018).
Bisoi, S. et al., "Gas separation properties of Troeger's base-bridged polyamides", e-Polymers, 2017, vol. 17, No. 4, pp. 283-293, (2017).
Carta, M. et al., "The synthesis of microporous polymers using Troger's base formation", Polymer Chemistry, 2014, vol. 5, pp. 5267-5272, (2014).
Li, Z. et al., "Air-breathing aqueous sulfur flow battery for ultralow-cost long-duration electrical storage", JOULE, 2017, vol. 1, No. 2, pp. 306-327, (2017).
International Search Report and Written Opinion of the International Searching Authority for International Patent Application No. PCT/US2020/039889, mailed Oct. 15, 2020, 11 pages.
International Search Report and Written Opinion of the International Searching Authority for International Patent Application No. PCT/US2020/039942, mailed Oct. 22, 2020, 17 pages.
International Search Report and Written Opinion of the International Searching Authority for International Patent Application No. PCT/US2020/039976, mailed Oct. 23, 2020, 11 pages.
International Search Report and Written Opinion of the International Searching Authority for International Patent Application No. PCT/US2020/043630, mailed Nov. 11, 2020, 10 pages.
International Search Report and Written Opinion of the International Searching Authority for International Patent Application No. PCT/US2020/043639, mailed Nov. 13, 2020, 11 pages.
Chakraborty, R. et al., "Negative Electrodes For Electrochemical Cells," U.S. Appl. No. 16/523,722, filed Jul. 26, 2019.
Al, W. et al., "A Novel Graphene-Polysulfide Anode Material for High-Performance Lithium-Ion Batteries," Scientific Reports, vol. 3, No. 234, pp. 1-5, DOI: 10.1038/srep0234, (2013).
Al-Hoshan, M. S. et al., "Synthesis, Physicochemical and Electrochemical Properties of Nicekl Ferrite Spinels Obtained by Hydrothermal Method for the Oxygen Evolution Reaction (OER)," Int. J. Electrochem. Sci., vol. 7, pp. 4959-4973, (2012).
Arunchander, A. et al., "Synthesis of flower-like molybdenum sulfide/graphene hybrid as an efficient oxygen reduction electrocatalyst for anion exchange membrane fuel cells," Journal of Power Sources, vol. 353, pp. 104-114, (2017).
Bandal, H. et al., "Iron-based heterogeneous catalysts for oxygen evolution reaction; change in perspective from activity promoter to active catalyst," Journal of Power Sources, vol. 395, pp. 106-127, (2018).
Blurton, K. F. et al., "Metal/Air Batteries: Their Status and Potential—A Review," Journal of Power Sources, vol. 4, pp. 263-279, (1979).
Burke, M. S. et al., "Cobalt-Iron (Oxy)Hudroxide Oxygen Evolution Electrocatalysts: The Role of Structur5e and Composition on Activity, Stability, and Mechanism," J. Am. Chem. Soc., vol. 137, pp. 3638-3648, DOI: 10.1021/acs.5b00281, (2015).
Burke, M. S. et al., "Oxygen Evolution Reaction Electrocatalysis on Transition Metal Oxides and (Oxy)hydroxides: Activity Trends and Design Principles," Department of Chemistry and Biochemistry, University of Oregon, Eugene, Oregon 97403, United States, Chemistry of Materials, 10 pages, (2015).
Chen, Y. et al., "Harvesting polysul!des by sealing the sulfur electrode in a composite ion-selective net," Journal of Power Sources, vol. 368, pp. 38-45, (2017).
Chiang, Y.M. et al., High Capacity, Temperature-Stable Lithium Aluminum Manganese Oxide Cahtodes for Rechargeable Batteries, Electrochemical and Solid-State Letters, vol. 2, No. 3, pp. 107-110, (1990).
Colli, A. N. et al., "High energy density $MnO_4^-/MnO_4^{2-}$ redox couple for alkaline redox flow batteries," Chem. Commun., vol. 52, pp. 14039-14042, (2016).
Cui, B. et al., "Improved Cycle Iron Molten Air Battery Performance Using a Robust Fin Air Electrode," Journal of The Electrochemical Society, vol. 164, No. 2, pp. A88-A92, (2017).
Demir-Cakan, R. et al., "An aqueous electrolyte rechargeable Li-ion/polysul!de battery," Journal of Materials Chemistry A, View Article Online DOI: 10.1039/c4ta01308e, 5 pages, (2014).
Demir-Cakan, R. et al., "Use of ion-selective polymer membranes for an aqueous electrolyte rechargeable Li-ion-polysulphide battery," View Online DOI: 10.1039/c4ta05756b, J. Mater. Chem. A, vol. 3, pp. 2869-2875, (2015).
Egashira, M. et al., "Iron-Air (Secondary and Primpary),"Yamaguchi University, Yamaguchi, Japan & 2009 Elsevier B.V. All rights reserved, pp. 372-375, (2009).
Figueredo-Rodriguez, H. A. et al., "A Rechargeable, Aqueous Iron Air Battery with Nanostructured Electrodes Capable of High Energy Density Operation," Journal of The Electrochemical Society, vol. 164, No. 6, pp. A1148-A1157, (2017).
Gross, M. M. et al., "Aqueous Polysulfide-Air Battery with a Mediator-Ion Solid Electrolyte and a Copper Sul!de Catalyst for Polysulfide Redox," View Online DOI: 10.1021/acsaem.8b01679, ACS Applied Energy Materials, vol. 1, No. 12, pp. 7230-7236, (2018).
Hall, D. E., "Ni(OH)2_Impregnated Anodes for alkaline Water Electrolysis," J. Electrochem. So., vol. 130, No. 2, pp. 317-321, (1983).
Hall, D. E., "Porous Nickel-Coated Steel Anodes for Alkaline Water Electrolysis: Corrosion Resistance." J. Electrochem. Soc., vol. 129, No. 2, pp. 310-315, (1982).
Hang, B. T. et al., "Effect of metal-sulfide additives on electrochemical properties of nano-sized $Fe_2O_3$-loaded carbon for Fe/air battery anodes," Journal of Power Sources, vol. 168, pp. 522-532, (2007).
Hang, B. T. et al., "Effect of additives on the electrochemical properties of $Fe_2O_3$/C nanocomposite for Fe/air battery anode," Journal of Electroanalytical Chemistry, vol. 762, pp. 59-65, (2016).
Notification Concerning Transmittal of a International Preliminary Report on Patentability and Written Opinion of the International Search Authority for International Patent Application No. PCT/US2018/026243, mailed Oct. 17, 2019 9 pages.
International Search Report and Written Opinion of the International Searching Authority for International Patent Application No. PCT/US2018/026243, mailed Jul. 27, 2018, 12 pages.
International Search Report and Written Opinion of the International Searching Authority for International Patent Application No. PCT/US2019/039844, mailed Oct. 23, 2019, 15 pages.
International Search Report and Written Opinion of the International Searching Authority for International Patent Application No. PCT/US2019/039867, mailed Nov. 15, 2019, 19 pages.
International Search Report and Written Opinion of the International Searching Authority for International Patent Application No. PCT/US2019/039973, mailed Jan. 13, 2020, 26 pages.
International Search Report and Written Opinion of the International Searching Authority for International Patent Application No. PCT/US2019/043745, mailed Nov. 13, 2019, 17 pages.
Ji, X. et al., "Stabilizing lithium-sulphur cathodes using polysulphide reservoirs," View Online DOI: 10.1038/ncomms1293, Nature Communications, vol. 2, No. 325, 8 pages, (2011).
Jin, X. et al., "A high-fidelity multiphysics model for the new solid oxide iron-air redox battery part I: Bridging mass transport and charge transfer with redox cycle kinetics," Journal of Power Sources, vol. 280, pp. 195-204, (2015).
Kadyk, T. et al., "How to Enhance Gas Removal from Porous Electrodes?" View Online DOI: 10.1038/SREP38780, Scientific Reports, vol. 6, No. 38780, pp. 1-14, (2016).
Klaus, S. et al., "E!ects of Fe Electrolyte Impurities on Ni(OH)2/NiOOH Structure and Oxygen Evolution Activity," View Online DOI:10.1021/acs.jpcc.5b00105, Journal of Physical Chemistry C, vol. 119, No. 13, pp. 7243-7254, (2015).
Licht, S., "A Novel Aqueous Aluminum permanganate fuel cell," Electrochemistry Communications, vol. 1, pp. 33-36, (1999).

(56) References Cited

OTHER PUBLICATIONS

Li, Z. et al., "Air-Breathing Aqueous Sulfur Flow Battery for Ultralow-Cost Long-Duration Electrical Storage," Joule vol. 1, pp. 306-327, Oct. 11, 2017, 2017 Published by Elsevier Inc., (2017).
Li, Z. et al., "A high-energy and low-cost polysul!de/iodide redox flow battery," Nano Energy, vol. 30, pp. 283-292, (2016).
Mainar, A. R. et al., "Alkaline aqueous electrolytes for secondary zinc-air batteries: an overview," Int. J. Energy Res. 2016; vol. 40, pp. 1032-1049, (2016).
Malkhandi, S. et al., "Organo-Sulfur Additives for Suppressing Hydrogen Evolution in Iron-air Battery," Abstract #688, 220th ECS Meeting, 2011 The Electrochemical Society.
Matsuda, A. et al., "Preparation of hydroxide ion conductive KOH-ZrO2 electrolyte for all-solid state iron/air secondary battery," Solid State Ionics, vol. 262, pp. 188-191, (2014).
Maurya, S. et al., "A review on recent developments of anion exchange membranes for fuel cells and redox flow batteries," View online DOI: 10.1039/c5ra04741b, RSC Adv., vol. 5, pp. 37206-37230, (2015).
McKerracher, R. D. et al., "A Review of the Iron-Air Secondary Battery for Energy Storage," View online DOI: 10.1002/cplu. 201402238, ChemPlusChem 2015, vol. 80, pp. 323-335, (2015).
Merle, G. et al., "Anion exchange membranes for alkaline fuel cells: A review," Journal of Membrane Science, vol. 377, pp. 1-35, (2011).
Mitra, D. et al., "An Efficient and Robust Surface-Modified Iron Electrode for Oxygen Evolution in AlkalineWater Electrolysis," Journal of The Electrochemical Society, vol. 165, No. 5, pp. F392-F400, (2018).
Mitra, D. et al., "A Stable and Electrocatalytic Iron Electrode for Oxygen Evolution in Alkaline Water Electrolysis," View Online https://doi.org/10.1007/s11244-018-0971-9, Springer Science+Business Media, LLC, part of Springer Nature 2018.
Narayan, S. R. et al., "Bi-Functional Oxygen Electrodes—Challenges and Prospects," The Electrochemical Society Interface, Summer 2015, pp. 65-69, (2015).
Neburchilov, V. et al., "Metal-Air And Metal-Sulfur Batteries: Fundamentals and Applications," CRC Press Taylor & Francis Group, 6000 Broken Sound Parkway NW, Suite 300, Boca Raton, FL 33487-2742, © 2017 by Taylor & Francis Group, LLC, CRC Press is an imprint of Taylor & Francis Group, an Informa business.
Ojefors, L. et al., "An-iron-Air Vehicle Battery," Journal of Power Sources, vol. 2, pp. 287-296, (1977).
Pan, J. et al., "Constructing Ionic Highway in Alkaline Polymer Electrolytes," Energy Environ. Sci. 2014, vol. 7, pp. 354-360, (2014).
Roe, S. et al., "A High Energy Density Vanadium Redox Flow Battery with 3 M Vanadium Electrolyte," Journal of The Electrochemical Society, vol. 163, No. 1, pp. A5023-A5028, (2016).
Sen, R. K. et al., "Metal-Air Battery Assessment," Prepared for Office of Energy Storage and Distribution Conservation and Renewable Energy, The U.S. Department of Energy under Contract DE-AC06-76RLO 1830, Pacific Northwest Laboratory, Operated for the U.S. Department of Energy, 96 pages, (1988).
Sevinc, S. et al., "In-situ tracking of NaFePO4 formation in aqueous electrolytes and its electrochemical performances in Na-ion/polysul!de batteries," Journal of Power Sources, vol. 412, pp. 55-62, (2019).
Smith, R. D. L. et al., "Water Oxidation Catalysis: Electrocatalytic Response to Metal Stoichiometry in Amorphous Metal Oxide Films Containing Iron, Cobalt, and Nickel," J. Am. Chem. Soc., vol. 135, No. 31, pp. 11580-115, (2013).
Weinrich, H. et al., "Understanding the Nanoscale Redox-Behavior of Iron-Anodes for Rechargeable Iron-Air Batteries," View Online https://doi.org/10.1016/j.nanoen.2017.10.023, Nano Energy, Institute of Energy and Climate Research-Fundamental Electrochemistry (IEK-9) Center for Nanophase Materials Sciences, Oak Ridge National Laboratory, Oak Ridge, Tennessee 378, US, 46 pages, (2017).
Agarwal R.C., et al., "Study of Electrical and Electrochemical Behaviour on Hot-press Synthesized Nano-Composite Polymer Electrolyte (NCPE) Membranes: [(70PEO: 30 KNO3) + x SiO2]," International Journal of Electrochemical Science, 2011, vol. 6, pp. 867-881.
"Busbar," Lexico.com, US Dictionary, Oxford University Press, Retrieved on Oct. 13, 2021, 1 page, Retrieved from URL: https://www.lexico.com/en/definition/busbar.
Cherepy N.J., et al., "A Zinc/Air Fuel Cell for Electric Vehicles," IEEE publication, 1999, pp. 11-14.
Chinese Office Action dated Feb. 3, 2017 for Application No. 2012800344431, 7 pages.
Chinese Office Action dated Jul. 18, 2016 for Appln. No. 2012102393449.
Chinese Office Action dated May 4, 2016 for Application No. 2012800344431, 17 pages.
Cohen J.L., et al., "Fabrication and Preliminary Testing of a Planar Membraneless Microchannel Fuel Cell," Journal of Power Sources, 2005, vol. 139, pp. 96-105.
Communication under Rule 71(3) EPC, EP Application No. 14749407. 4, dated Sep. 29, 2017, 6 Pages.
Decision to Grant EP Application No. 14749407.4 dated Mar. 8, 2018, 2 Pages.
Dias F.B., et al., "Trends in Polymer Electrolytes for Secondary Lithium Batteries", Journal of Power Sources, 2000, vol. 88, pp. 169-191.
Examination Report for Australian Patent Application No. 2014214641 dated Jun. 26, 2017, 6 pages.
Extended European Search Report for European Application No. 12845720.7, mailed Jul. 16, 2015, 7 Pages.
Extended European Search Report for European Application No. 14749407.4, mailed Aug. 31, 2016, 6 Pages.
Extended European Search Report for European Application No. 19826880.7, mailed Feb. 4, 2022, 8 Pages.
Extended European Search Report for European Application No. 19827057.1, mailed Feb. 11, 2022, 8 Pages.
Extended European Search Report of EP Application No. 09751078. 8, dated Jul. 27, 2012, 6 Pages.
Ferrigno R., et al., "Membraneless Vanadium Redox Fuel Cell Using Laminar Flow," Journal of American Chemical Society, 2002, vol. 124, pp. 12930-12931.
"High," Lexico.com, US Dictionary, Oxford University Press, Retrieved on Oct. 13, 2021, 7 pages, Retrieved from URL: https://www.lexico.com/en/definition/high.
International Preliminary Report on Patentability (Chapter 1 of the Patent Cooperation Treaty) for International Application No. PCT/US2009/040658 dated Dec. 2, 2010, 5 Pages.
International Preliminary Report on Patentability for International Application No. PCT/US12/47395 mailed Sep. 19, 2014, 27 pages.
International Preliminary Report on Patentability for International Application No. PCT/US12/62503 mailed Nov. 27, 2013, 25 pages.
International Preliminary Report on Patentability for International Application No. PCT/US2011/049558 mailed Jan. 11, 2013, 15 pages.
International Preliminary Report on Patentability for International Application No. PCT/US2012/062503, dated Oct. 19, 2013, 25 Pages.
International Preliminary Report on Patentability for International Application No. PCT/US2014/015613, mailed Aug. 20, 2015, 19 Pages.
International Preliminary Report on Patentability for International Application No. PCT/US2016/023564, dated May 30, 2017, 16 Pages.
International Preliminary Report on Patentability for International Application No. PCT/US2016/036026 mailed Oct. 13, 2017, 26 Pages.
International Preliminary Report on Patentability for International Application No. PCT/US2017/043489, dated Aug. 6, 2018, 20 Pages.
International Preliminary Report on Patentability for International Application No. PCT/US2017/043500, dated Jul. 23, 2018, 18 Pages.
International Preliminary Report on Patentability for International Application No. PCT/US2019/039844, mailed Jan. 7, 2021, 11 Pages.

(56) References Cited

OTHER PUBLICATIONS

International Preliminary Report on Patentability for International Application No. PCT/US2019/039973, mailed Jan. 7, 2021, 20 Pages.
International Preliminary Report on Patentability for International Application No. PCT/US2020/031760, dated Nov. 25, 2021, 07 Pages.
International Preliminary Report on Patentability for International Application No. PCT/US2020/039889, mailed Jan. 6, 2022, 8 Pages.
International Preliminary Report on Patentability for International Application No. PCT/US2020/061081, mailed Jun. 2, 2022, 07 Pages.
International Search Report and Written Opinion for International Application No. PCT/US2011/049558 mailed Nov. 16, 2011, 11 pages.
International Search Report and Written Opinion for International Application No. PCT/US2012/047395 mailed Sep. 28, 2012, 10 pages.
International Search Report and Written Opinion for International Application No. PCT/US2012/062503, mailed Jan. 24, 2013, 09 Pages.
International Search Report and Written Opinion for International Application No. PCT/US2014/015613, mailed Jul. 11, 2014, 23 Pages.
International Search Report and Written Opinion for International Application No. PCT/US2016/023564, mailed Jun. 16, 2016, 12 Pages.
International Search Report and Written Opinion for International Application No. PCT/US2017/043489, mailed Nov. 29, 2017, 12 Pages.
International Search Report and Written Opinion for International Application No. PCT/US2017/043500, mailed Nov. 29, 2017, 12 Pages.
International Search Report and Written Opinion for International Application No. PCT/US2020/061081, mailed Apr. 19, 2021, 10 Pages.
International Search Report and Written Opinion for International Application No. PCT/US2021/031184, mailed Aug. 27, 2021, 07 Pages.
International Search Report and Written Opinion of the International Searching Authority dated Aug. 25, 2020, issued in corresponding International Application No. PCT/US2020/031760, 13 Pages.
International Search Report for International Application No. PCT/US2009/039460, mailed May 26, 2009, 3 pages.
International Search Report for International Application No. PCT/US2009/040658, mailed Aug. 24, 2009, 3 pages.
International Search Report for International Application No. PCT/US2016/036026, mailed Sep. 29, 2016, 05 Pages.
International Search Report for International Application No. PCT/US2019/031118 dated Aug. 29, 2019, 3 pages.
Japanese Office Action dated Feb. 9, 2016 for Application No. 2014-540009, 14 pages.
Japanese Office Action dated Jan. 10, 2017 for Application No. 2014-540009, 17 pages.
Jayashree, et al., "Air-Breathing Laminar Flow-Based Microfluidic Fuel Cell," Journal of American Chemical Society, 2005, vol. 127, pp. 16758-16759.
Jorne J., et al., "Suppression of Dendrites and Roughness during Electrodeposition by Impinging Flow," Journal of the Electrochemical Society, Jun. 1987, vol. 134, No. 6, pp. 1399-1402.
Li Q., et al., "All Solid Lithium Polymer Batteries With a Novel Composite Polymer Electrolyte," Solid State Ionics, 2003, vol. 159, pp. 97-109.
"Low," Lexico.com, US Dictionary, Oxford University Press, Retrieved on Oct. 13, 2021, 5 Pages, Retrieved from URL: https://www.lexico.com/en/definition/low.

Non-Final Office Action dated Oct. 8, 2019 issued in corresponding Japanese Patent Application No. 2018-550404 with English translation, 4 pages.
Non-final Office Action U.S. Appl. No. 14/505,234 dated Aug. 25, 2017, 15 Pages.
Notice of Allowance for U.S. Appl. No. 14/505,234 dated Jun. 29, 2018, 10 Pages.
Notice of Allowance Japanese Patent Application No. 2015-557176 dated Mar. 13, 2018 with English translation, 5 pages.
Office Action dated Jun. 3, 2021, issued in corresponding Chinese Patent Application No. 201780045371.3 with English translation, 8 Pages.
Office Action dated Mar. 28, 2017 in Chinese Application 201480017311.7, 21 pages.
Office Action dated May 7, 2021, issued in corresponding Chinese Patent Application No. 201780034966.9, with English translation, 18 pages.
Office Action for Australian Patent Application No. 2012332825 dated Nov. 25, 2015, 3 pages.
Office Action for Canadian Patent Application 2853245 dated Jun. 15, 2017, 3 pages.
Office Action for Canadian Patent Application 2853245 dated Sep. 23, 2016, 3 pages.
Office Action for Indian Patent Application No. 201817034674 dated May 27, 2020, 7 pages.
Office Action issued in corresponding Japanese Patent Application No. 2017-093977 dated May 8, 2018 with English translation, 4 pages.
Park C.H., et al., "Electrochemical Stability and Conductivity Enhancement of Composite Polymer Electrolytes," Solid State Ionics, 2003, vol. 159, pp. 111-119.
Perkins N.R., et al., "Hydrogen Oxidation Electrodes and Electrochemical Cells Including the Same," U.S. Appl. No. 16/951,396, filed Nov. 18, 2020, 88 Pages.
Rejection Decision, Japanese Patent Application No. 2015-557176 dated Oct. 17, 2017 with English translation, 12 pages.
Ross P. N., et al., "Feasibility Study of a New Zinc-Air Battery Concept Using Flowing Alkaline Electrolyte," Intersociety Energy Conversion Engineering Conference, Aug. 25, 1986, vol. 2, pp. 1066-1072.
Salloum et al., "Sequential Flow Membraneless Microfluidic Fuel Cell with Porous Electrodes," Journal of Power Sources, 2008, vol. 180, pp. 243-252.
Smedley, et al., "A Regenerative Zinc-air Fuel Cell," Journal of Power Sources, 2007, vol. 165, pp. 897-904.
Thirsk H.R., "Electrochemistry," Thirsk, Ed., The Chemical Society Great Britain Oxford Alden Press, 1974, vol. 4, pp. 16.
Timofeeva E.V., "Rechargeable Nanofluid Electrodes for High Energy Density Flow Battery," NSTI-Nanotech, Jan. 1, 2013, vol. 2, pp. 679-682, XP055863711.
Written Opinion for International Application No. PCT/US2016/036026, mailed Sep. 29, 2016, 14 Pages.
Written Opinion of the International Preliminary Examining Authority dated Feb. 24, 2017 for Application. No. PCT/US2016/023564.
Written Opinion of the International Preliminary Examining Authority PCT/US2016/036026 dated May 9, 2017, 13 Pages.
Written Opinion of the International Searching Authority PCT/US2019/031118 dated Aug. 29, 2019, 13 Pages.
Zheng J., et al., "Rotating Ring-Disk Electrode Method," Rotating Electrode Methods and Oxygen Reduction Electrocatalysts, NL , Elsevier, Apr. 25, 2014, pp. 199-229, DOI: 10.1016/B978-0-444-63278-4.00006-9, ISBN 9780444632784, XP009522170.
Office Action in CN201980056772.8, mailed Dec. 1, 2023, 17 pages, with English language translation.
"Nickel," Efunda: The Ultimate Online Reference for Engineers, eFunda, Inc., Web, Sep. 5, 2014.
"PTFE," Polymers: A Properties Database (Online), Taylor and Francis Group, LLC, Web, Sep. 5, 2014.
Chinese Office Action dated Dec. 28, 2015 for Application No. 2012102393449, 27 pages, with English language translation.
Chinese Office Action dated Dec. 28, 2015 for Application No. 2015122301567800, 3 pages.

(56) References Cited

OTHER PUBLICATIONS

Chinese Office Action dated Feb. 19, 2013 (with partial English Language translation) of Chinese Patent Appln. No. 201220585211.2 filed Nov. 16, 2012, 5 Pages.
Chinese Search Report dated Dec. 6, 2012 of Chinese Appl No. 201220336003.9 filed Jul. 10, 2012, 2 pages, with English language translation.
International Preliminary Report on Patentability for International Application No. PCT/US2021/031184, mailed Nov. 17, 2022, 6 Pages.
Office Action dated Jan. 13, 2012 issued in corresponding Chinese Patent Application No. 201120307185.2 w/English translation, 9 Pages, with English language translation.
Office Action dated Jun. 17, 2021, issued in corresponding Brazilian Application No. BR112019000713-0, 7 pages, with English language translation.
Office Action for Chinese Application No. 201780034966.9, mailed Jan. 13, 2023, 17 pages, with English language translation.
Office Action for Chinese Application No. 201780034966.9, mailed Jul. 3, 2023, 29 pages, with English language translation.
Office Action for Chinese Application No. 201780034966.9, mailed Mar. 31, 2022, 19 pages, with English language translation.
Office Action issued in corresponding Mexico Application No. MX/a/2014/005136 dated Apr. 17, 2018, 6 pages.
Second Office Action Chinese Patent Application No. 201480017311.7 dated Feb. 2, 2018, 3 pages, with English translation.
Office Action in U.S. Appl. No. 16/913,877, mailed Mar. 12, 2024, 12 pages.

\* cited by examiner

METAL AIR ELECTROCHEMICAL CELL ARCHITECTURE

RELATED APPLICATIONS

This application claims the benefit of priority to U.S. Provisional Patent Application 62/692,400 entitled "Unsealed Metal Air Electrochemical Cell Architecture" filed Jun. 29, 2018, the entire contents of which are hereby incorporated by reference for all purposes. This application is related to U.S. Non-Provisional patent application Ser. No. 16/456,571 entitled "Aqueous Polysulfide-Based Electrochemical Cell" filed on Jun. 28, 2019 and this application is related to U.S. Non-Provisional patent application Ser. No. 16/457,253 entitled "Rolling Diaphragm Seal" filed on Jun. 28, 2019. The entire contents of both related applications are hereby incorporated by reference for all purposes.

BACKGROUND

Batteries sealed off from the environment, i.e., sealed batteries, come with significant challenges. For example, the architecture elements of sealed batteries, such as current collectors, require feedthrough passages in the battery walls that require their own seals and represent likely failure and leakage points. Unsealed batteries, i.e., batteries open to the environment, may overcome some of the challenges of sealed batteries.

Energy storage technologies, such as battery-based energy storage technologies, are playing an increasingly important role in electric power grids. At a most basic level, these energy storage assets provide smoothing to better match generation and demand on a grid. The services performed by energy storage devices are beneficial to electric power grids across multiple time scales, from milliseconds to years. Today, energy storage technologies exist that can support timescales from milliseconds to hours, but there is a need for long and ultra-long duration (collectively, at least ≥8 h) energy storage systems. Improved architecture elements of batteries, such as sealed and/or unsealed batteries, are needed long duration energy storage (LODES) systems.

This Background section is intended to introduce various aspects of the art, which may be associated with embodiments of the present inventions. Thus, the foregoing discussion in this section provides a framework for better understanding the present inventions, and is not to be viewed as an admission of prior art.

SUMMARY

Systems and methods of the various embodiments may provide metal air electrochemical cell architectures, such as sealed metal air electrochemical cell architectures, unsealed metal air electrochemical cell architectures, etc. Various embodiments may provide a battery, such as a sealed or unsealed battery, with an open cell arrangement configured such that a liquid electrolyte layer separates a metal electrode from an air electrode. In various embodiments, the electrolyte may be disposed within one or more vessel of the battery such that electrolyte serves as a barrier between a metal electrode and gaseous oxygen.

Various embodiments may include a battery having a first vessel, such as a vessel open to an air environment or a vessel that may be sealed, a first air electrode, a first metal electrode, and a first volume of liquid electrolyte within the first vessel. The first volume of liquid electrolyte may separate the first air electrode from the first metal electrode. Additionally, the first volume of liquid electrolyte may form a barrier between the first metal electrode and oxygen from the gas environment (e.g., the air environment) accessible via the unsealed first vessel or retained within the sealed first vessel itself.

Systems and methods of the various embodiments may provide for removing a metal electrode from the electrolyte to prevent self-discharge of the metal electrode. In various embodiments, a pump may pump liquid electrolyte into and out of a vessel of a battery such that the metal electrode is submerged in the liquid electrolyte when the liquid electrolyte is pumped into the vessel and the metal electrode is removed from the liquid electrolyte when the liquid electrolyte is pumped out of the vessel. In various embodiments, a gas filled bladder may be inflated and deflated to displace the liquid electrolyte such that the metal electrode is submerged in the liquid electrolyte when the gas bladder is inflated and the metal electrode is removed from the liquid electrolyte when the gas bladder is deflated. In various embodiments, one or more lifting systems may raise and lower the metal electrode out of and into the liquid electrolyte.

Systems and methods of the various embodiments may provide a three electrode battery configured to operate each in a discharge mode, but with two distinct electrochemical reactions occurring at each electrode. The second electrode may be used to fully oxidize a partially reacted species or may be used to oxidize a species generated by a spontaneous chemical reaction in the cell that is not otherwise controlled by the first electrode. In various embodiments, the electrolyte of the battery may flood a surface of one electrode when the battery is operating in a discharge mode and the electrolyte may not flood the surface of that electrode when the battery is operating in a recharge mode.

Various embodiments may provide a battery, comprising: a first vessel; a first air electrode; a first metal electrode; and a first volume of liquid electrolyte within the first vessel, wherein the first volume of liquid electrolyte separates the first air electrode from the first metal electrode and the first volume of liquid electrolyte forms a barrier between the first metal electrode and oxygen from an air environment. In various embodiments, the air environment is trapped within the first vessel. In various embodiments, the first vessel is open to the air environment. In various embodiments, the battery may further comprise a second vessel; and a second metal electrode, wherein the first volume of liquid electrolyte separates the first air electrode from the second metal electrode and the first volume of liquid electrolyte forms a barrier between the second metal electrode and oxygen from the air environment. In various embodiments, the battery may further comprise one or more additional vessels; one or more additional air electrodes; one or more additional metal electrodes; and one or more additional volumes of liquid electrolyte, each additional volume of liquid electrolyte within its own respective one of the additional vessels, wherein each additional volume of liquid electrolyte separates a respective one of the additional air electrodes from a respective one of the additional metal electrodes. In various embodiments, the air electrodes are connected together in series and the metal electrodes are connected together in series. In various embodiments, the liquid electrolyte has a low solubility of oxygen. In various embodiments, the battery may further comprise a filter configured to filter out one or both of carbon dioxide from the liquid electrolyte and carbonate from the liquid electrolyte. In various embodiments, the first air electrode is configured to operate in both an oxygen evolution reaction mode and an oxygen reduction reaction mode. In various embodiments, the first air electrode comprises: a first electrode configured to operate in an oxygen evolution reaction mode; and a second electrode configured to operate in an oxygen reduction reaction mode. In various embodiments, the battery may further comprise a mechanical barrier configured to block oxygen bubbles from the first metal electrode when the battery is operating in a charging mode. In various embodiments, the mechanical barrier comprises Polybenzimidazole (PBI), polyethylene (PE), polypropylene (PP), polyvinylidene fluoride (PVDF), polytetrafluoroethylene (PTFE), cotton, rayon, or cellulose acetate. In various embodiments, the mechanical barrier is woven, non-woven, or felted.

Various embodiments may provide a battery, comprising: a vessel; an air electrode; a metal electrode; a rigid porous current collector supporting the metal electrode within the vessel; a liquid electrolyte within a portion of the vessel; and a pump fluidically coupled to the vessel, the pump configured to pump the liquid electrolyte into and out of the vessel such that the metal electrode is submerged in the liquid electrolyte when the liquid electrolyte is pumped into the vessel to a first level and the metal electrode is removed from the liquid electrolyte when the liquid electrolyte is pumped out of the vessel to a second level. In various embodiments, the metal electrode is comprised of iron or an iron-alloy.

Various embodiments may provide a battery comprising: a vessel; an air electrode; a metal electrode; a rigid porous current collector supporting the metal electrode within the vessel; a liquid electrolyte within a portion of the vessel; and a gas filled bladder, the gas filled bladder configured to displace the liquid electrolyte such that the metal electrode is submerged in the liquid electrolyte when the gas bladder is inflated to a first size and the metal electrode is removed from the liquid electrolyte when the gas bladder is deflated to a second size. In various embodiments, the gas bladder is an air bladder. In various embodiments, the metal electrode is comprised of iron or an iron-alloy Various embodiments may provide a battery, comprising: a vessel; an air electrode; a metal electrode; a rigid porous current collector supporting the metal electrode and the air electrode within the vessel; a liquid electrolyte within a portion of the vessel; and one or more lifting system coupled to the rigid porous current collector, the lifting system configured to raise and lower the metal electrode out of and into the liquid electrolyte.

In various embodiments, the lifting system comprises: one or more motors; and one or more drive elements coupled to the one or more motors. In various embodiments, the one or more drive elements are chains, belts, screws, or gears. In various embodiments, the metal electrode is comprised of iron or an iron-alloy.

Various embodiments may provide a battery, comprising: an anode; a first cathode; a second cathode; and an electrolyte, wherein the electrolyte floods a surface of the anode, a surface of the first cathode, and a surface of the second cathode when the battery is operating in a discharge mode and the electrolyte does not contact the second cathode when the battery is operating in a recharge mode. In various embodiments, the first cathode is configured to evolve oxygen in the recharge mode and to reduce oxygen in the discharge mode. In various embodiments, the anode is comprised of iron or an iron-alloy. In various embodiments, the first cathode comprises a hydrophilic portion and a hydrophobic portion. In various embodiments, the surface of the second cathode is hydrophilic. In various embodiments, the second cathode comprises a substrate coated with nickel. In various embodiments, the substrate comprises carbon, titanium, or copper. In various embodiments, the anode comprises iron ore in a form comprising taconite, magnetite, or hematite, reduced iron ore comprising iron metal (Fe0), wustite (FeO), or a mixture thereof, or reduced taconite, direct reduced ("DR") taconite, not-yet-reduced "DR Grade" taconite, direct reduced iron ("DRI"), or any combination thereof. In various embodiments, the iron ore or reduced iron ore comprises pellets.

Various embodiments may provide a method of operating a battery comprising an anode, a first cathode and a second cathode, the method comprising: flooding a surface of the anode, a surface of the first cathode, and a surface of the second cathode with an electrolyte when the battery is operating in a discharge mode; and lowering an electrolyte level such that the electrolyte does not contact the second cathode when the battery is operating in a recharge mode. In various embodiments, the first cathode evolves oxygen in the recharge mode and reduces oxygen in the discharge mode, and the second electrolyte oxidizes hydrogen in the recharge mode and reduces hydrogen in the discharge mode.

Various embodiments may include a method for operating a battery, comprising: operating the battery in a first operating state in which a metal electrode is submerged in a liquid electrolyte; and operating the battery in a second operating state in which the metal electrode is removed from the liquid electrolyte. In various embodiments, the metal electrode is removed from the liquid electrolyte by reducing a level of the liquid electrolyte in the battery. In various embodiments, the level is reduced by pumping electrolyte out of the battery. In various embodiments, the level is reduced by deflating a gas filled bladder within the battery. In various embodiments, the metal electrode is removed from the liquid electrolyte by lifting the metal electrode out of the liquid electrolyte.

Various embodiments may provide a bulk energy storage system, comprising: one or more batteries, wherein at least one of the one or more batteries comprises: a first vessel; a first air electrode; a first metal electrode; and a first volume of liquid electrolyte within the first vessel, wherein the first volume of liquid electrolyte separates the first air electrode from the first metal electrode and the first volume of liquid electrolyte forms a barrier between the first metal electrode and oxygen from an air environment. In various embodiments, the first air electrode is configured to operate in both an oxygen evolution reaction mode and an oxygen reduction reaction mode. In various embodiments, the first air electrode comprises: a first electrode configured to operate in an oxygen evolution reaction mode; and a second electrode configured to operate in an oxygen reduction reaction mode. In various embodiments, the at least one of the one or more batteries further comprises: a mechanical barrier configured to block oxygen bubbles from the first metal electrode when the battery is operating in a charging mode. In various embodiments, the bulk energy storage system is a long duration energy storage (LODES) system.

Various embodiments may provide a bulk energy storage system, comprising: one or more batteries, wherein at least one of the one or more batteries comprises: an anode; a first cathode; a second cathode; and an electrolyte, wherein the electrolyte floods a surface of the anode, a surface of the first cathode, and a surface of the second cathode when the battery is operating in a discharge mode and the electrolyte does not contact the second cathode when the battery is operating in a recharge mode. In various embodiments, the first cathode is configured to evolve oxygen in the recharge mode and to reduce oxygen in the discharge mode. In various embodiments, the anode is comprised of iron or an iron-alloy. In various embodiments, the bulk energy storage system is a long duration energy storage (LODES) system.

Various embodiments may provide a bulk energy storage system, comprising: one or more batteries, wherein at least one of the one or more batteries comprises: a vessel; an air electrode; a metal electrode; a rigid porous current collector supporting the metal electrode within the vessel; a liquid electrolyte within a portion of the vessel; and a gas filled bladder, the gas filled bladder configured to displace the liquid electrolyte such that the metal electrode is submerged in the liquid electrolyte when the gas bladder is inflated to a first size and the metal electrode is removed from the liquid electrolyte when the gas bladder is deflated to a second size. In various embodiments, the gas bladder is an air bladder. In various embodiments, the metal electrode is comprised of iron or an iron-alloy. In various embodiments, the bulk energy storage system is a long duration energy storage (LODES) system.

Various embodiments may provide an electric battery comprising: an air electrode exposed to a gaseous oxygen containing environment, wherein the concentration of oxygen is at least about 15%; a metal electrode; and, an electrolyte, the electrolyte comprising a dissolved oxygen concentration of less than about 0.5 mol/L and having a carbonate level of less than about 8 mol/L. In various embodiments, the electrolyte is in ionic contact with the metal electrode. In various embodiments, the electrolyte is in ionic contact with the air electrode. In various embodiments, the electrolyte prevents parasitic discharging of the metal electrode. In various embodiments, the electrolyte provides an oxygen barrier for the metal electrode. In various embodiments, the gaseous environment is air. In various embodiments, the electrolyte covers the metal electrode. In various embodiments, the battery comprises a means to block oxygen bubbles.

Various embodiments may provide an electric battery having a first and a second configuration; the battery comprising: an air electrode; a metal electrode; and an electrolyte; wherein the first configuration comprises: the air electrode exposed to an oxygen containing environment; the electrolyte in ionic communication with both the air electrode and the metal electrode; the electrolyte comprising a dissolved oxygen concentration of less than about 0.5 mol/L and having a carbonate level of less than about 1 mol/L; the electrolyte covering the metal electrode and isolating the metal electrode from the oxygen containing environment; wherein the second configuration comprises: the air electrode exposed to an oxygen containing environment; the electrolyte not covering the metal electrode. In various embodiments, the metal electrode is exposed to the oxygen containing environment. In various embodiments, the carbonate concentration is less than about 5 mol/L. In various embodiments, the carbonate concentration is less than about 1 mol/L. In various embodiments, the carbonate concentration is less than about 0.1 mol/L. In various embodiments, the dissolved oxygen concentration is less than about 0.1 mol/L. In various embodiments, the dissolved oxygen concentration is less than about 0.01 mol/L. In various embodiments, the carbonate concentration is less than about 5 mol/L and the dissolved oxygen concentration is less than about 0.1 mol/L. In various embodiments, the carbonate concentration is less than about 1 mol/L and the dissolved oxygen concentration is less than about 0.1 mol/L. In various embodiments, the metal electrode comprises a component selected from the group consisting of iron, a bulk solid; a collection of particles; a suspension; particles that are not buoyant in the electrolyte; a metal mesh electrode; an iron mesh electrode; a metal felt electrode, an iron felt electrode; sintered metals; sintered iron; porous sintered metals; a porous bed of pellets, a gelled metal electrode; and a composite metal electrode formed from two or more different materials. In various embodiments, the active battery component comprises an electrolyte and a metal electrode, wherein the metal electrode comprises a component selected from the group consisting of a bed of direct reduced iron (DRI) pellets, and a bed of sponge iron pellets; and a bed of pellets comprising iron. In various embodiments, the active battery component comprises an electrolyte and a metal electrode, wherein the metal electrode comprises a component selected from the group consisting of a bed of direct reduced iron (DRI) pellets, and a bed of sponge iron pellets; and a bed of pellets comprising iron; and, wherein the carbonate concentration is less than about 5 mol/L and the dissolved oxygen concentration is less than about 0.1 mol/L. In various embodiments, the active battery component comprises an electrolyte and a metal electrode, wherein the metal electrode comprises a component selected from the group consisting of a metal, a metal alloy, lithium (Li), sodium (Na), potassium (K), magnesium (Mg), calcium (Ca), silicon (Si), aluminum (Al), zinc (Zn), and iron (Fe). In various other embodiments the active components may include non-metallic solid active materials such as sulfur (S), sodium sulfide ($Na_2S$), lithium sulfide ($Li_2S$), potassium sulfide ($K_2S$), iron sulfide (FeS or $FeS_2$), manganese dioxide ($MnO_2$), etc.

Various embodiments may provide an electrical system configured to manage the intermittencies in non-hydrocarbon based electricity generation to provide predetermined distribution of electricity, the electrical system comprising: a means to generate electricity from non-hydrocarbon energy sources; a bulk energy storage system comprising plurality of batteries, wherein the batteries comprise: an air electrode exposed to a gaseous oxygen containing environment, wherein the concentration of oxygen is at least about 15%; a metal electrode; and, an electrolyte, the electrolyte comprising a dissolved oxygen concentration of less than about 0.5 mol/L and having a carbonate level of less than about 8 mol/L; electrical power transmission facilities; the means to generate electricity from non-hydrocarbon energy sources, the batteries and the electrical power transmission facilities, in electrical communication, whereby electricity can be transmitted therebetween; and, the electrical system configured for electrical connection to a power grid, an industrial customer or both. In various embodiments, the means to generate electricity from non-hydrocarbon energy sources is selected from the group consisting of a wind farm, a thermal power plant, and a solar power plant. In various embodiments, the system includes a hydrocarbon based electrical power plant, an atomic energy based electric power plant, or both.

Various embodiments may include a method of operating an electrical system configured to manage intermittencies in non-hydrocarbon based electricity generation to provide predetermined distribution of electricity; the method comprising transferring electricity into a bulk energy storage system, storing the electricity in the bulk energy storage system, transferring the electricity out of the bulk energy storage system; wherein the electrical system comprises: a means to generate electricity from non-hydrocarbon energy sources; electrical power transmission facilities; the bulk energy storage system comprising a plurality of batteries, wherein the batteries comprise: an air electrode exposed to a gaseous oxygen containing environment, wherein the concentration of oxygen is at least about 15%; a metal electrode; and, an electrolyte, the electrolyte comprising a dissolved oxygen concentration of less than about 0.5 mol/L and having a carbonate level of less than about 8 mol/L; the means to generate electricity from non-hydrocarbon energy sources, the LODES and the electrical power transmission facilities, in electrical communication, whereby electricity can be transmitted therebetween; and, the electrical system configured for electrical connection to a power grid, an industrial customer or both.

Various embodiments may provide a system including a bulk energy storage system that is a LODES having a duration of about 24 hours to about 500 hours, and a power rating of from about 10 MW to about 50 MW. Various embodiments may provide a system including a bulk energy storage system that is a LODES having a duration of about 8 hours to about 2000 hours, and a power rating of from about 0.5 MW to about 500 MW. Various embodiments may provide a system including a bulk energy storage system that is a LODES having a duration of about 8 hours to about 100 hours, and a power rating of from about 0.5 MW to about 500 MW. Various embodiments may provide a system including a bulk energy storage system that is a LODES having a duration of about 24 hours to about 500 hours, and a power rating of from about 10 MW to about 50 MW. Various embodiments may provide a system including a bulk energy storage system that is a LODES having a duration of about 8 hours to about 2000 hours, and a power rating of from about 0.01 MW to about 50,000 MW. Various embodiments may provide a system including a bulk energy storage system that is a LODES having a duration of about 8 hours to about 2000 hours, and a power rating of from about 0.5 MW to about 500 MW. Various embodiments may provide a system including a bulk energy storage system that is a LODES having a duration of about 50 hours to about 500 hours, and a power rating of from about 0.01 MW to about 50,000 MW. Various embodiments may provide a system including a bulk energy storage system that is a LODES having a duration of about 24 hours to about 500 hours, and a power rating of from about 0.5 MW to about 500 MW. Various embodiments may provide a system including a bulk energy storage system that is a LODES having a duration of about 50 hours to about 1000 hours, and a power rating of from about 0.5 MW to about 1000 MW.

BRIEF DESCRIPTION OF THE FIGURES

The accompanying drawings, which are incorporated herein and constitute part of this specification, illustrate example embodiments of the claims, and together with the general description given above and the detailed description given below, serve to explain the features of the claims.

DETAILED DESCRIPTION

Figure 1:
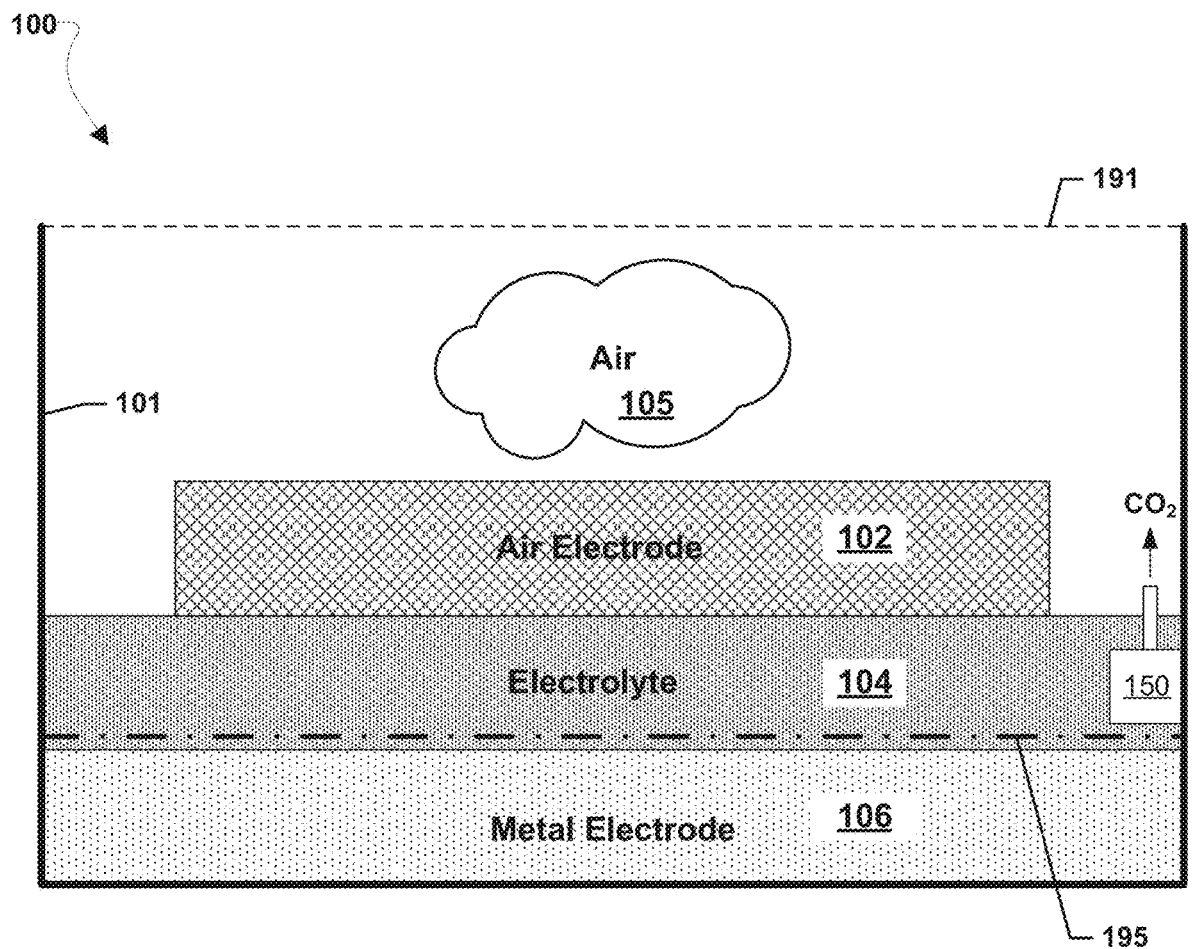
FIG. 1 is a block diagram of an embodiment battery.

The various embodiments will be described in detail with reference to the accompanying drawings. Wherever possible, the same reference numbers will be used throughout the drawings to refer to the same or like parts. References made to particular examples and implementations are for illustrative purposes and are not intended to limit the scope of the claims. The following description of the embodiments of the invention is not intended to limit the invention to these embodiments but rather to enable a person skilled in the art to make and use this invention.

As used herein, unless stated otherwise, room temperature is 25° C. And, standard temperature and pressure is 25° C. and 1 atmosphere. Unless expressly stated otherwise all tests, test results, physical properties, and values that are temperature dependent, pressure dependent, or both, are provided at standard ambient temperature and pressure.

Generally, the term "about" as used herein unless specified otherwise is meant to encompass a variance or range of ±10%, the experimental or instrument error associated with obtaining the stated value, and preferably the larger of these.

As used herein unless specified otherwise, the recitation of ranges of values herein is merely intended to serve as a shorthand method of referring individually to each separate value falling within the range. Unless otherwise indicated herein, each individual value within a range is incorporated into the specification as if it were individually recited herein.

The following examples are provided to illustrate various embodiments of the present systems and methods of the present inventions. These examples are for illustrative purposes, may be prophetic, and should not be viewed as limiting, and do not otherwise limit the scope of the present inventions.

It is noted that there is no requirement to provide or address the theory underlying the novel and groundbreaking processes, materials, performance or other beneficial features and properties that are the subject of, or associated with, embodiments of the present inventions. Nevertheless, various theories are provided in this specification to further advance the art in this area. The theories put forth in this specification, and unless expressly stated otherwise, in no way limit, restrict or narrow the scope of protection to be afforded the claimed inventions. These theories many not be required or practiced to utilize the present inventions. It is further understood that the present inventions may lead to new, and heretofore unknown theories to explain the function-features of embodiments of the methods, articles, materials, devices and system of the present inventions; and such later developed theories shall not limit the scope of protection afforded the present inventions.

The various embodiments of systems, equipment, techniques, methods, activities and operations set forth in this specification may be used for various other activities and in other fields in addition to those set forth herein. Additionally, these embodiments, for example, may be used with: other equipment or activities that may be developed in the future; and, with existing equipment or activities which may be modified, in-part, based on the teachings of this specification. Further, the various embodiments and examples set forth in this specification may be used with each other, in whole or in part, and in different and various combinations. Thus, for example, the configurations provided in the various embodiments of this specification may be used with each other; and the scope of protection afforded the present inventions should not be limited to a particular embodiment, configuration or arrangement that is set forth in a particular embodiment, example, or in an embodiment in a particular figure.

Embodiments of the present invention include apparatus, systems, and methods for long-duration, and ultra-long-duration, low-cost, energy storage. Herein, "long duration" and/or "ultra-long duration" may refer to periods of energy storage of 8 hours or longer, such as periods of energy storage of 8 hours, periods of energy storage ranging from 8 hours to 20 hours, periods of energy storage of 20 hours, periods of energy storage ranging from 20 hours to 24 hours, periods of energy storage of 24 hours, periods of energy storage ranging from 24 hours to a week, periods of energy storage ranging from a week to a year (e.g., such as from several days to several weeks to several months), etc. In other words, "long duration" and/or "ultra-long duration" energy storage cells may refer to electrochemical cells that may be configured to store energy over time spans of days, weeks, or seasons. For example, the electrochemical cells may be configured to store energy generated by solar cells during the summer months, when sunshine is plentiful and solar power generation exceeds power grid requirements, and discharge the stored energy during the winter months, when sunshine may be insufficient to satisfy power grid requirements.

Unsealed batteries, i.e., batteries open to the environment, may overcome some of the challenges of sealed batteries. However, unsealed batteries, such as unsealed metal air batteries, may present challenges in minimizing the contact between metal electrodes and oxygen and in electrically insulating positive and negative electrodes while keeping the electrically-insulated electrodes in ionic contact Various embodiments may provide a battery, such as an unsealed battery or a sealed battery, with an open cell arrangement configured such that a liquid electrolyte layer separates a metal electrode from an air electrode. In various embodiments, the electrolyte may be disposed within one or more vessel of the battery (e.g., the sealed battery, the unsealed battery, etc.) such that electrolyte serves as a barrier between a metal electrode and gaseous oxygen. In various embodiments, the battery may include a mechanical barrier, such as a membrane or porous separator, to serve as a barrier between a metal electrode and gaseous oxygen. In various embodiments, a metal electrode may be a solid or slurry metal electrode. In various embodiments, a metal electrode may be a metal mesh electrode, such as an iron mesh electrode. In various embodiments, a metal electrode may be a metal felt electrode, such as an iron felt electrode. In various embodiments, a metal electrode may be an electrode formed from sintered metals, such as sintered iron. In various embodiments, a metal electrode may be an electrode formed from porous sintered metals. In various embodiments, a metal electrode may be gelled metal electrode, such as a gelled iron electrode. In various embodiments, a metal electrode may be a composite metal electrode formed from two or more different materials, such as two or more different metals, a metal and one or more different metal and/or non-metal materials, etc. In various embodiments, a metal electrode may be a porous bed of pellets, such as a porous bed of metal pellets (e.g., a bed of direct reduced iron (DRI) pellets, a bed of sponge iron pellets, a bed of atomized iron powder, etc.). In various embodiments, the electrolyte layer may have an oxygen solubility that is sufficiently low to minimize contact between oxygen and the metal electrode. In various embodiments, effects of dissolved carbon dioxide in the electrolyte layer may be managed and/or mitigated. For example, scrubbing and/or filtration may be applied to the electrolyte layer to remove carbon dioxide from the electrolyte layer to maintain the carbon dioxide or carbonate ion ($CO_3^{2-}$) level in the electrolyte layer within a certain range of concentrations. For example, the carbonate concentration may be maintained below a specified concentration; for example, the carbonate concentration may be maintained below about 1 mol/L. In certain other embodiments, the carbonate concentration may be maintained within a certain range of concentrations such as between about 0.5 mol/L and about 2 mol/L. In certain other embodiments the carbonate concentration may be maintained to be below about 0.5 mol/L.

In some embodiments, a mechanical barrier, such as a membrane or porous separator, may be used to physically block oxygen bubbles from contacting the metal electrode, such as oxygen bubbles from contacting the metal electrode when the battery is operating in a charging mode. In various embodiments, this mechanical barrier, such as a membrane or porous separator, may be a film or sheet of a polymer, such as Polybenzimidazole (PBI), polyethylene (PE), polypropylene (PP), polyvinylidene fluoride (PVDF), polytetrafluoroethylene (PTFE), or other polymers, or may be a natural fiber, such as cotton, rayon, or cellulose acetate. In various embodiments, the mechanical barrier, such as a membrane or porous separator, may be woven, non-woven, or felted. In various embodiments, a mechanical barrier, such as a membrane or porous separator, may have a porosity such as 50% by volume or greater, or 30% by volume or greater.

FIG. 1 is a block diagram of an embodiment battery 100 having an air electrode 102, volume of liquid electrolyte 104, and metal electrode 106 disposed in a vessel 101. In some embodiments, the battery 100 may be an unsealed battery open to the environment, such that air 105 passes freely into and out of the battery 100. In some optional embodiments, the battery 100 may be a sealed battery having a lid 191 (or other type containment structure) sealing off the vessel 101 from the environment. In such a sealed configuration, volumes of air 105 may be pumped into the vessel 101 and/or trapped in the vessel 101 itself by the lid 191 (or other type containment structure). When the battery 100 is an unsealed battery, the vessel 101 may be open to the air 105, i.e., an air environment, and the air electrode 102 may receive oxygen from the air 105. When the battery 100 is a sealed battery, the air 105 may be trapped and/or pumped within the vessel and the air electrode 102 may receive oxygen from the air 105. The air electrode 102 may be a gas diffusion layer (GDL) including carbon configured to support oxygen evolution reactions (OERs) and/or oxygen reduction reactions (ORRs) in different modes of operation. The air electrode 102 may be a single air electrode, a "bifunctional electrode," which operates in both OER and ORR mode, or it may be a combination of two air electrodes, a "dual electrode," in which one electrode is configured to operate in OER mode and another electrode is configured to operate in ORR mode. In various embodiments, the battery 100 may be configured to operate in a one or modes, such as a discharge mode, a charging (or recharging mode), etc.

The metal electrode 106 may be formed from a metal or metal alloy, such as lithium (Li), sodium (Na), potassium (K), magnesium (Mg), calcium (Ca), silicon (Si), aluminum (Al), zinc (Zn), or iron (Fe); or alloys substantially comprised of one or more of the foregoing metallic elements, such as an aluminum alloy or iron alloy(e.g., FeAl, FeZn, FeMg, etc.). The metal electrode 106 may be a composite metal electrode formed from two or more different materials, such as two or more different metals, a metal and one or more different metal and/or no-metal materials, etc. The metal electrode 106 may be a solid, including a dense or porous solid, or a mesh, felt, or foam, or a particle or collection of particles, or may be a slurry, ink, suspension, gel, or paste deposited within the vessel 101. The metal electrode 106 may be formed from sintered metals, such as sintered iron, sintered porous iron, etc. The metal electrode 106 may be a porous bed of pellets, such as a porous bed of metal pellets (e.g., a bed of direct reduced iron (DRI) pellets, a bed of sponge iron pellets, a bed of atomized iron powder, etc.). In various embodiments, the pellets in the porous bed may be produced from, or may be, iron ore pellets, such as taconite or magnetite or hematite. In various embodiments, the pellets may be produced by reducing iron ore pellets to form a more metallic (more reduced, less highly oxidized) material, such as iron metal (Fe0), wustite (FeO), or a mixture thereof. In various non-limiting embodiments, the pellets may be reduced taconite, direct reduced ("DR") taconite, "DR Grade" taconite pellets (which are not yet reduced), direct reduced iron ("DRI") pellets, or any combination thereof. In various embodiments, the metal electrode 106 composition may be selected such that the metal electrode 106 and the volume of liquid electrolyte 104 may not mix together. For example, the metal electrode 106 may be a bulk solid. As another example, the metal electrode 106 may be a collection of particles, such as small or bulky particles, within a suspension that are not buoyant enough to escape the suspension into the electrolyte. As another example, the metal electrode 106 may be formed from particles that are not buoyant in the electrolyte.

The volume of liquid electrolyte 104 may be disposed between the air electrode 102 and the metal electrode 106 such that the air electrode 102 and the metal electrode 106 are electrically isolated while remaining in ionic contact via the volume of liquid electrolyte 104. In this manner the volume of liquid electrolyte 104 may act as an electrolyte layer separating the air electrode 102 and the metal electrode 106. The volume of liquid electrolyte 104 may cover the metal electrode 106 such that the metal electrode 106 is submerged in the volume of liquid electrolyte 104. In this manner the volume of liquid electrolyte 104 may form a barrier between the metal electrode 106 and oxygen in the air 105. The composition of the volume of liquid electrolyte 104 may be selected such that the liquid electrolyte has a low solubility of oxygen, thereby preventing oxygen from the air 105 from reaching the metal electrode 106. The solubility of oxygen in the volume of liquid electrolyte 104 may be tailored to meet different oxygen barrier goals. The metal electrodes 106 exposure to oxygen may be limited to prevent parasitic self-discharging of the metal electrode 106. The volume of liquid electrolyte 104 may serve as a barrier between the metal electrode 106 and gaseous oxygen from the air 105. In various embodiments, the liquid electrolyte 104 may include one or more various electrolyte additives. Electrolyte additives may have a range of solubilities, and some may have the most beneficial effect when the additives are intimately mixed with the metal electrode 106. In certain embodiments, the metal electrode 106 may be pelletized, or comprised of multiple pellet-shaped sub-units. One method of additive delivery may include forming the metal electrode 106 such that the pellets forming the metal electrode 106 include additives. For example, a portion of the pellets forming the metal electrode 106 may be entirely formed of additives. Such additives may include or be sodium sulfide (Na2S) and sodium polysulfides (Na2Sx, where x=1-8), potassium sulfide (K2S), potassium polysulfides (K2Sx, where x=1-8), lithium sulfide (Li2S) and lithium polysulfides (Li2Sx, where x=1-8), iron sulfides (FeSx, where x=1-2), bismuth sulfide (Bi2S3), lead sulfide (PbS), zinc sulfide (ZnS), antimony sulfide (Sb2S3), selenium sulfide (SeS2), tin sulfides (SnS, SnS2, Sn2S3), nickel sulfide (NiS), molybdenum sulfide (MoS2), and mercury sulfide (HgS). Other pellets forming the metal electrode 106 may be formed mostly of other active material(s). The different types of pellets (e.g., additive pellets and active material pellets) may be mixed to create a blended metal electrode 106. Similarly, when the metal electrode 106 may be a powder or bed of powder, one method of additive delivery may include forming the metal electrode 106 such that the powder or bed of powder forming the metal electrode 106 includes additives.

In some embodiments, a mechanical barrier 195, such as a membrane or porous separator, may be included in the battery 100 and may physically block oxygen bubbles from contacting the metal electrode 106. The mechanical barrier 195 may be a film or sheet of a polymer, such as PBI, PE, PP, PVDF, PTFE, or other polymers, or may be a natural fiber, such as cotton, rayon, or cellulose acetate. The mechanical barrier 195 may be woven, non-woven, or felted. The mechanical barrier 195 may have a porosity such as 50% by volume or greater, or 30% by volume or greater.

Carbon dioxide ($CO_2$) exposure to, and dissolving in, the volume of liquid electrolyte 104 may cause pH changes in the electrolyte, changes in the electrolyte's ionic conductivity, and the precipitation of carbonate solids in the electrolyte may clog pores in the air electrode 102 and/or metal electrode 106. To address carbon dioxide and/or carbonate ion ($CO_3^{2-}$) build-up in the volume of liquid electrolyte 104, scrubbing or filtration may be used to treat the volume of liquid electrolyte 104 and remove carbon dioxide and/or carbonate. As an example, a filter unit 150 may be used to scrub or filter carbon dioxide and/or carbonate from the volume of liquid electrolyte 104. As one example, the filter unit 150 may include a pump to circulate electrolyte through a filter to remove carbon dioxide and/or carbonate out of the volume of liquid electrolyte 104. The carbon dioxide may be vented to the air 105. Alternatively, the carbon dioxide and/or carbonate may be trapped in the filter unit 150 and the filter unit 150 may be replaced periodically. For example, the filter unit 150 may contain a chemical reagent or scrubber, that reacts strongly with carbon dioxide and/or carbonate to bind and trap the unwanted species. For example, a gas-phase filter may use sodium hydroxide (NaOH), lithium hydroxide (LiOH), potassium hydroxide (KOH), calcium hydroxide ($Ca(OH)_2$), magnesium hydroxide ($Mg(OH)_2$), barium hydroxide ($Ba(OH)_2$) or a mixture of these reagents to trap carbon dioxide chemically before it reaches the cell. Alternatively, the filter unit 150 may flow through electrolyte which has dissolved carbon dioxide and/or carbonate and expose this electrolyte to a reactive medium that binds and/or reacts with carbonate ions to remove them from the solution. For example, if the electrolyte is primarily potassium hydroxide, the filter may contain solid calcium hydroxide. The solubility of calcium carbonate is much lower than the solubility of potassium carbonate, so the dissolved carbonate will react with the calcium hydroxide to form calcium carbonate which will precipitate from the electrolyte and accumulate in the filter unit. The filter unit 150 may be periodically replaced or refreshed or refurbished to restore it. The filter unit 150 may run at various intervals, such as intervals matched to the carbon dioxide diffusion rate into the cell, to filter out carbon dioxide and/or carbonate from the volume of liquid electrolyte 104. This may maintain the volume of liquid electrolyte 104 with a sufficiently low carbon dioxide and/or carbonate levels to prevent or mitigate the pH changes in the electrolyte, changes in the electrolytes ionic conductivity, and/or the precipitation of carbonate solids in the electrolyte. As an example, the filter unit 150 may be a scrubbing reactor where air may be pumped through an electrolyte bath in the filter unit 150 including one or more concentrated alkali hydroxide salts (e.g., NaOH). The reactor that may be the filter unit 150 in such an example may be configured such that the total pressure drop through the reactor is low, but the gas residence time may be increased by creating long winding channels with a positive vertical slope in the reactor. The filter unit 150 may include channels, baffles, ridges, ribs, or other physical features to improve convective mixing in the reactor. The convective mixing may permit a small energy loss while maximizing carbon dioxide removal from the air.

Figure 2:
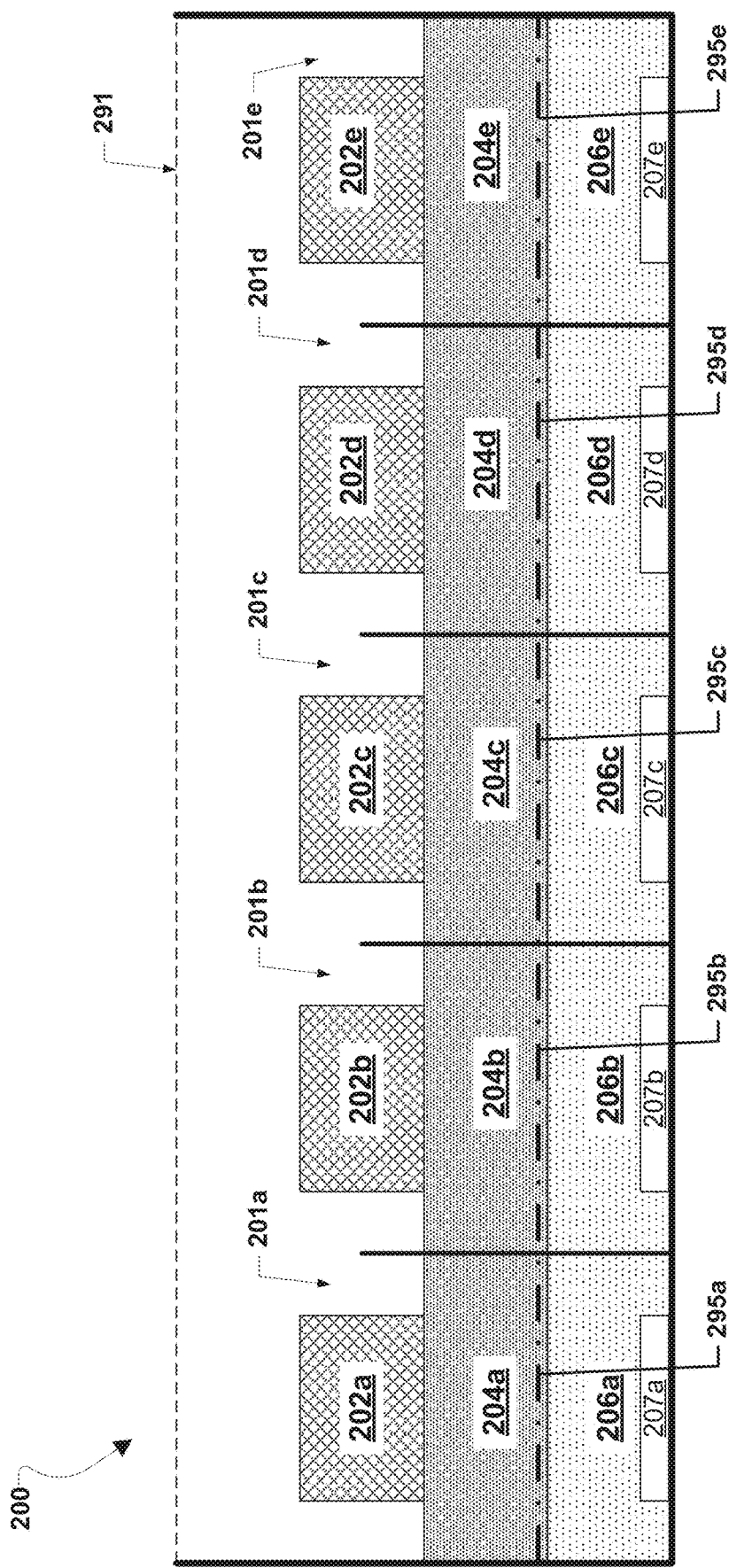
FIG. 2 is a block diagram of an embodiment multi-vessel battery.

FIG. 2 is a block diagram of an embodiment multi-vessel battery 200. In some embodiments, the multi-vessel battery 200 may be an unsealed battery open to the environment, such that air 105 passes freely into and out of the battery 200. In some optional embodiments, the multi-vessel battery 200 may be a sealed battery having a lid 291 (or other type containment structure) sealing off the multi-vessel battery 200 from the environment. In such a sealed configuration, volumes of air 105 may be pumped into the multi-vessel battery 200 and/or be trapped in the multi-vessel battery 200 itself by the lid 291 (or other type containment structure). The multi-vessel battery 200 may be similar to battery 100 described above, except, rather than one vessel 101, the battery 200 may include a series of separate vessels, such as five separate vessels 201a, 201b, 201c, 201d, 201e. While illustrated as having five separate vessels, a multi-vessel battery may have more than five vessels, less than five vessels, etc. Additionally, while illustrated in FIG. 2 as a single row of vessels, 201a, 201b, 201c, 201d, 201e, the vessels of a multi-vessel battery may be arranged in linear arrangements of one or more rows and one or more columns of vessels. Vessel size and arrangements may be tailored to reach current and voltage targets for the multi-vessel battery. Additionally, while illustrated in FIG. 2 as having one common lid 291 in a sealed configuration, alternatively each vessel 201a, 201b, 201c, 201d, 201e may have its own respective lid. In various embodiments, the battery 200 may be configured to operate in a one or modes, such as a discharge mode, a charging (or recharging mode), etc.

Each vessel 201a, 201b, 201c, 201d, 201e may have its own respective air electrode 202a, 202b, 202c, 202d, 202e, its own respective volume of liquid electrolyte 204a, 204b, 204c, 204d, 204e, and its own respective metal electrode 206a, 206b, 206c, 206d, 206e. The air electrodes 202a, 202b, 202c, 202d, 202e may be similar to the air electrode 102 described above, the volumes of liquid electrolyte 204a, 204b, 204c, 204d, 204e may be similar to the volume of liquid electrolyte 104 described above, and the metal electrodes 206a, 206b, 206c, 206d, 206e may be similar to the metal electrode 106 described above. Each volume of liquid electrolyte 204a, 204b, 204c, 204d, 204e may act as a barrier protecting its respective associated metal electrode 206a, 206b, 206c, 206d, 206e that is submerged in it from oxygen in the air environment. Optionally, each vessel 201a, 201b, 201c, 201d, 201e may have its own respective mechanical barrier 295a, 295b, 295c, 295d, 295e configured to physically block oxygen bubbles from contacting the respective metal electrode 206a, 206b, 206c, 206d, 206e. The mechanical barriers 295a, 295b, 295c, 295d, 295e may be similar to the mechanical barrier 195 described above. Each vessel 201a, 201b, 201c, 201d, 201e may have its own current collector 207a, 207b, 207c, 207d, 207e in contact with the metal electrodes 206a, 206b, 206c, 206d, 206e. The connections between each of the metal electrodes 206a, 206b, 206c, 206d, 206e and each of the air electrodes 202a, 202b, 202c, 202d, 202e may be in series and/or in parallel and may be arranged to reach current and/or voltage targets for the battery 200. For example, linking in series may step up voltage and linking in parallel may step up current.

Figure 3:
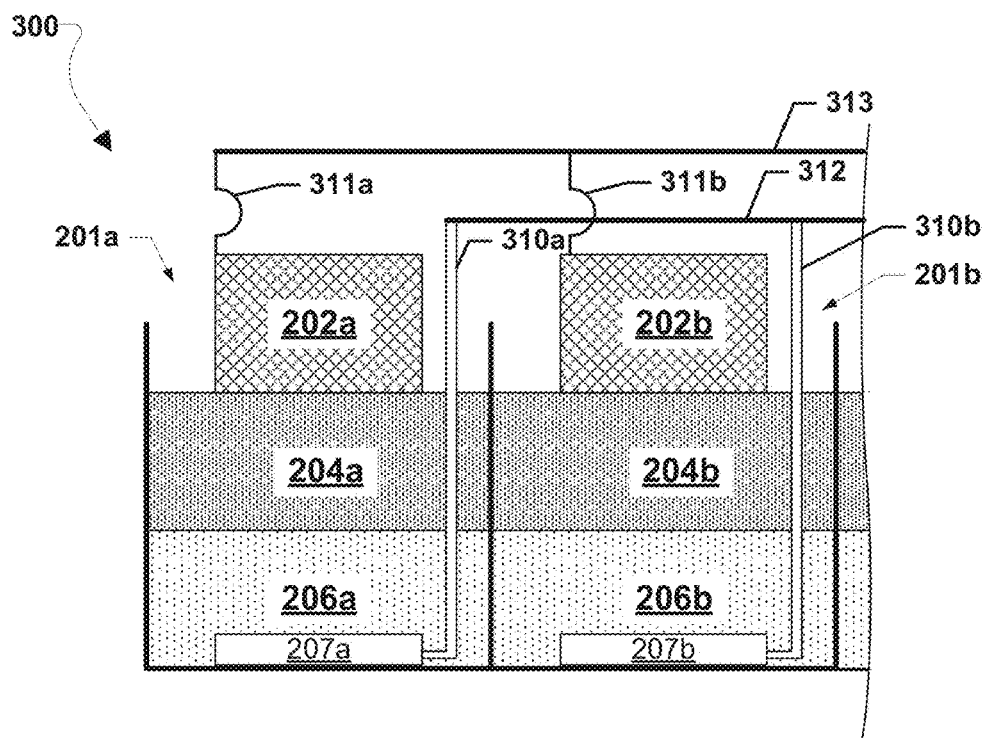
FIG. 3 is a block diagram of a portion of an embodiment multi-vessel battery.

FIG. 3 is a block diagram of a portion 300 of multi-vessel battery 200 showing vessels 201a and 201b with parallel connections. The current collectors 207a and 207b may be connected by insulated leads 310a and 310b, respectively, to a common lead 312 for all current collectors. In some embodiments, the current collectors 207a and 207b may be two part collectors with a first part attached to a front face of the metal electrodes 206a and 206b and a second part attached to a back face of the metal electrodes 260a and 206b. The front face of an electrode may be the surface disposed generally toward the electrolyte and the back face of an electrode may be the surface disposed generally away from the electrolyte. In some embodiments, the first part may be attached to the front face may be a porous structure (e.g., a mesh) and the second part attached to the back face may be a solid. Having the current collector on the front face of the electrode and back face of the electrode may aid in applying a clamp force and may enable more uniform reaction rates throughout the entire electrode. The front and back portions of the current collectors may be short circuited together to impact reaction rate distributions. While illustrated and discussed in relation to FIG. 3 as related to the metal electrodes of a battery, current collectors arranged on the front and back face of the electrode may also be used with air electrodes, such as air electrodes 202a, 202b, etc. In some embodiments, the current collectors 207a, 207b may clamp onto the metal electrodes 206a, 206b. The insulated leads 310a and 310b may be insulated from the electrolyte and metal electrodes. In some embodiments, the insulated leads 310a and 310b may be rigid posts extending through the electrolyte and metal electrodes to the current collectors 207a, 207b. The air electrodes 202a and 202b may be connected by leads 311a and 311b, respectively, to a common lead 313 for all air electrodes. The open design of the battery 200 may not require current feedthrough passages in the vessels and the insulated leads 310a and 310b may exit the electrolyte at any point. In a sealed design, feedthrough passages may be provided, such as in the lid 295.

Figure 4:
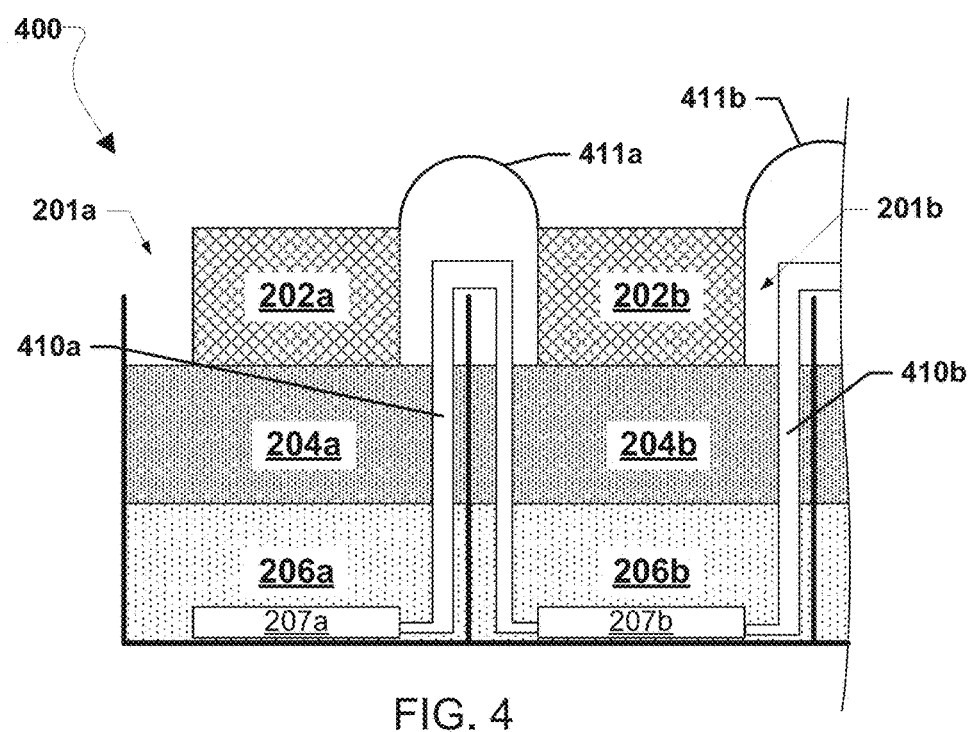
FIG. 4 is a block diagram of a portion of an embodiment multi-vessel battery.

FIG. 4 is a block diagram of a portion 400 of multi-vessel battery 200 showing vessels 201a and 201b with series connections. The current collectors 207a and 207b may be connected to each other by insulated lead 410a. In an open configuration, insulated lead 410a may exit the volume of liquid electrolyte 204a and pass over the edge of vessel 201a into vessel 201b and into the volume of liquid electrolyte 204b to connect to current collector 207b. In a similar manner insulated lead 410b may connect current collector 207b to current collector 207c. The insulated leads 410a and 410b may be insulated from the electrolyte and metal electrodes. The air electrodes 202a and 202b may be connected by lead 411a. In a similar manner lead 411b may connect air electrode 202b to air electrode 202c. In a configuration where one or more lid may be provided, feedthroughs may be provided to pass the leads, such as leads 410a, 410b, 411a, 411b, etc.

Figure 5:
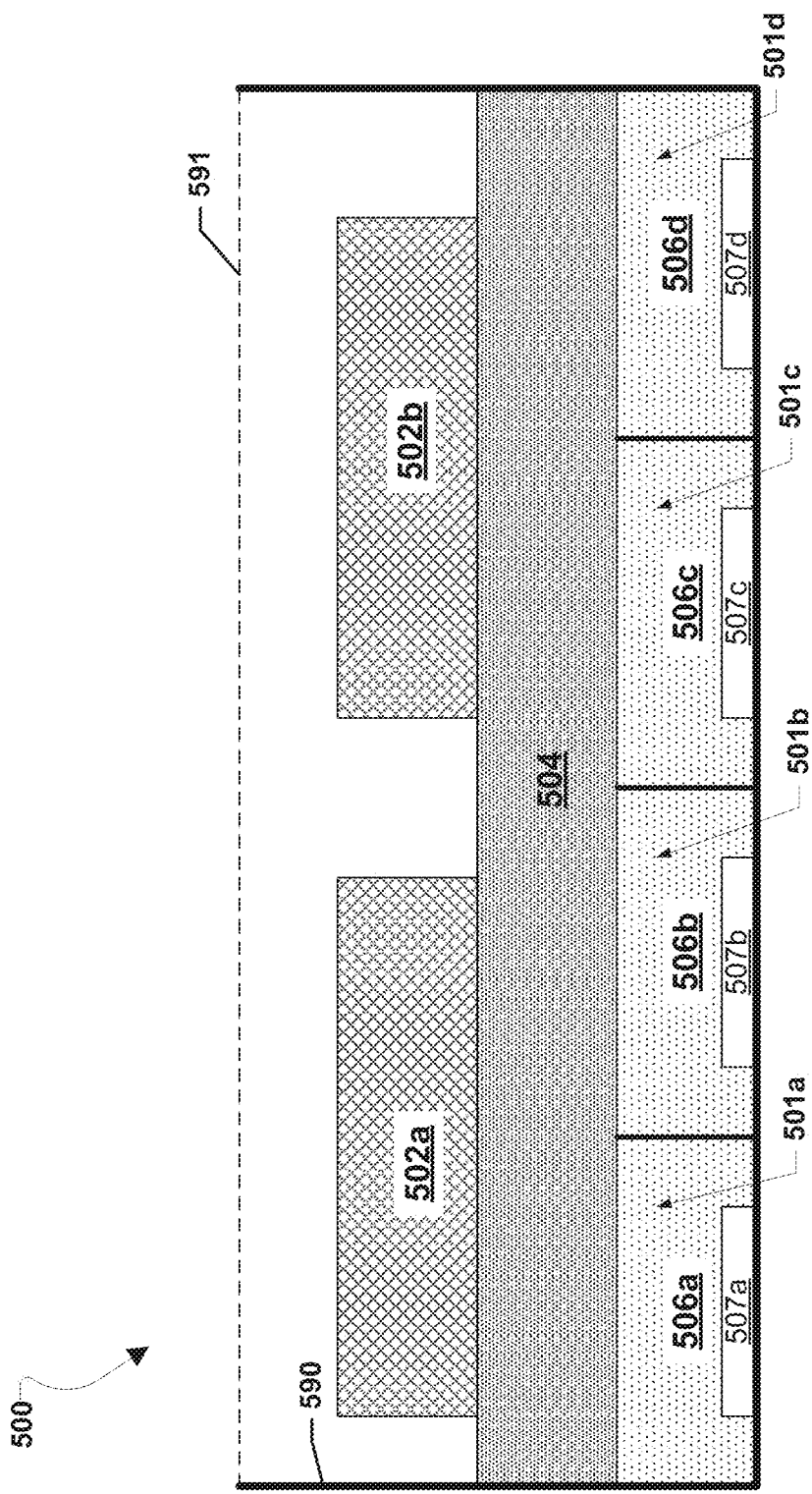
FIG. 5 is a block diagram of an embodiment multi-vessel battery.

FIG. 5 is a block diagram of another embodiment multi-vessel battery 500. In some embodiments, the multi-vessel battery 500 may be an unsealed battery open to the environment, such that air passes freely into and out of the battery 500. In some optional embodiments, the multi-vessel battery 500 may be a sealed battery having a lid 591 (or other type containment structure) sealing off the multi-vessel battery 500 from the environment. In such a sealed configuration, volumes of air may be pumped into the multi-vessel battery 500 and/or be trapped in the multi-vessel battery 500 itself by the lid 591 (or other type containment structure). The multi-vessel battery 500 is similar to battery 100 described above, except rather than one vessel 101, the battery 500 may include a series of separate vessels, such as four separate vessels 501a, 501b, 501c, 501d. The four separate vessels 501a, 501b, 501c, 501d may be formed within a larger common vessel 590. While illustrated as having four separate vessels, a multi-vessel battery may have more than four vessels, less than four vessels, etc. Additionally, while illustrated in FIG. 5 as a single row of vessels, 501a, 501b, 501c, 501d within a larger common vessel 590, the vessels of a multi-vessel battery may be arranged in linear arrangements of one or more rows and one or more columns of vessels. Vessel size and arrangements may be tailored to reach current and voltage targets for the multi-vessel battery. In various embodiments, the battery 500 may be configured to operate in a one or modes, such as a discharge mode, a charging (or recharging mode), etc.

Each vessel 501a, 501b, 501c, 501d may have its own respective metal electrode 506a, 506b, 506c, 506d. The metal electrodes 506a, 506b, 506c, 506d may be similar to the metal electrodes 106 described above. Each vessel 501a, 501b, 501c, 501d may have its own respective current collector 507a, 507b, 507c, 507d in contact with the metal electrodes 506a, 506b, 506c, 506d.

A single volume of liquid electrolyte 504 may submerge each metal electrode 506a, 506b, 506c, 506d and may pass between all the vessels 501a, 501b, 501c, 501d within the larger common vessel 590. In this manner, the metal electrodes 506a, 506b, 506c, 506d may all be associated with a common single electrolyte layer and may thereby effectively share the same electrolyte layer. The volume of liquid electrolyte 504 may be similar to the volume of liquid electrolyte 104 described above. The volume of liquid electrolyte 504 may act as a barrier protecting all the metal electrodes 506a, 506b, 506c, 506d submerged in it in their respective vessels 501a, 501b, 501c, 501d from oxygen in the air environment. Optionally, each vessel 501a, 501b, 501c, 501d and/or the overall vessel 590 may have one more respective mechanical barriers configured to physically block oxygen bubbles from contacting the metal electrodes 506a, 506b, 506c, 506d. The mechanical barriers may be similar to the mechanical barrier 195 described above.

The air electrodes 502a and 502b may be separated from the metal electrodes 506a, 506b, 506c, 506d by the volume of liquid electrolyte 502. The air electrodes 502a and 502b may be similar to the air electrode 102 described above. The air electrode 502a may be in ionic contact with metal electrodes 506a and 506b and the air electrode 502b may be in ionic contact with metal electrodes 506c and 506d. The presence of a common volume of liquid electrolyte 504 and the air electrodes 502a, 502b in the larger common vessel 590 rather than in each separate vessel 501a, 501b, 501c, 501d may enable separate sizing of the air electrodes 502a, 502b from the metal electrodes 506a, 506b, 506c, 506d, in the battery 500. While illustrated as having two air electrodes, the battery may include less than two or more than two air electrodes in various embodiments.

The connections between each of the metal electrodes 506a, 506b, 506c, 506d and each of the air electrodes 502a, 502b may be in series and/or in parallel and may be arranged to reach current and/or voltage targets for the battery 500. For example, linking in series may step up voltage and linking in parallel may step up current.

A charged metal electrode in an electrolyte may self-discharge. For example, a reduced iron (Fe) electrode in an alkaline solution will self-discharge according to the spontaneous reaction $Fe+2H_2O = Fe(OH)_2+H_2$. In an open metal-air battery (i.e., an unsealed battery), such as an iron-air (Fe-air) battery, it is possible to provide for removing a metal electrode from the electrolyte to prevent self-discharge of the metal electrode. In various embodiments, a pump may pump liquid electrolyte into and out of a vessel of a battery such that the metal electrode is submerged in the liquid electrolyte when the liquid electrolyte is pumped into the vessel and the metal electrode is removed from the liquid electrolyte when the liquid electrolyte is pumped out of the vessel. In various embodiments, a gas filled bladder may be inflated and deflated to displace the liquid electrolyte such that the metal electrode is submerged in the liquid electrolyte when the gas bladder is inflated and the metal electrode is removed from the liquid electrolyte when the gas bladder is deflated. In various embodiments, one or more lifting systems may raise and lower the metal electrode out of and into the liquid electrolyte. Removing the metal electrode from the electrolyte may prevent self-discharge of the metal electrode.

Figure 6A:
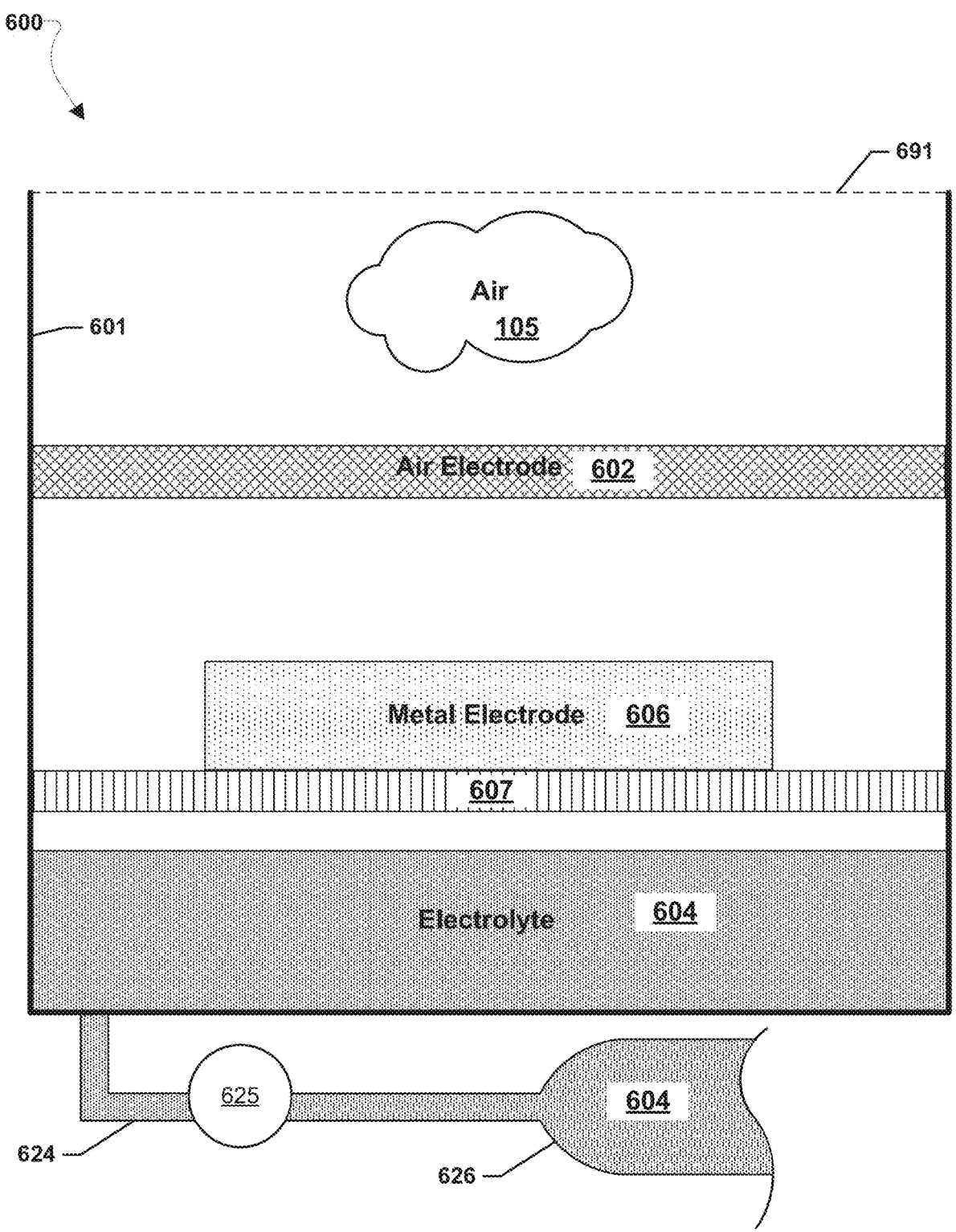
FIGS. 6A-8B are block diagrams of embodiment batteries showing operating states with metal electrodes submerged in or removed from liquid electrolytes.
Figure 6B:
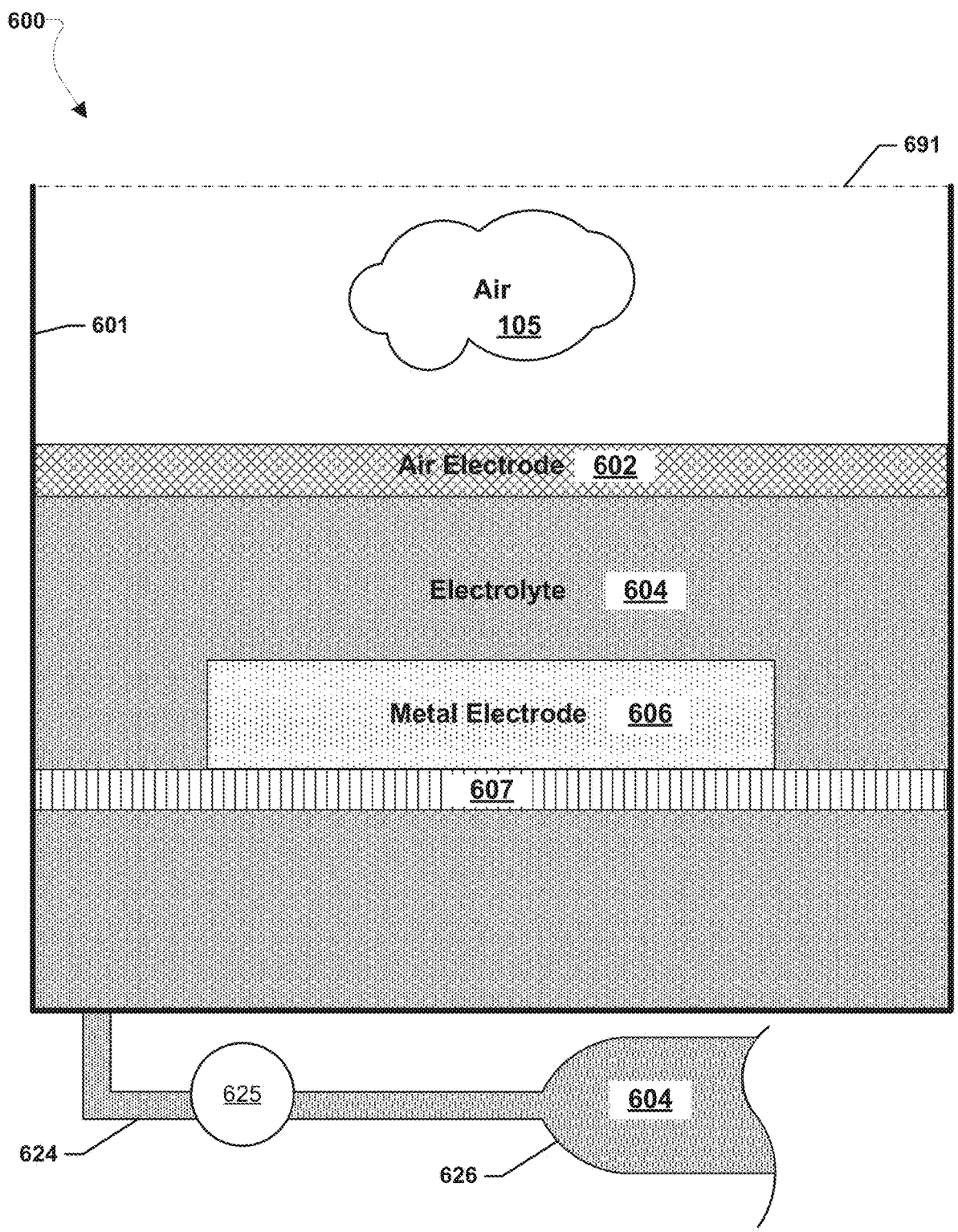

FIGS. 6A and 6B show a battery 600 according to an embodiment in an operating state with the metal electrode 606 removed from a volume of liquid electrolyte 604 (FIG. 6A) and in an operating state with the metal electrode 606 submerged in the volume of liquid electrolyte 604 (FIG. 6B). The battery 600 may be similar to battery 100 described above except that the metal electrode 606 may be supported on a rigid porous current collector 607 within the vessel 601. In some embodiments, the battery 600 may be an unsealed battery open to the environment, such that air 105 passes freely into and out of the battery 600. In some optional embodiments, the battery 600 may be a sealed battery having a lid 691 (or other type containment structure) sealing off the battery 600 from the environment. In such a sealed configuration, volumes of air 105 may be pumped into the battery 600 and/or be trapped in the battery 600 itself by the lid 691 (or other type containment structure). Air electrode 602 may be similar to air electrode 102 described above, metal electrode 606 may be similar to metal electrode 106 described above, and the volume of liquid electrolyte 604 may be similar to the volume of liquid electrolyte 104 described above. In various embodiments, the battery 600 may be configured to operate in a one or modes, such as a discharge mode, a charging (or recharging mode), etc.

An electrolyte passage 624 may fluidically couple an electrolyte reservoir 626 to the vessel 601. A pump 625 may be fluidically coupled to the electrolyte passage 624 and thereby fluidically coupled to the vessel 601. The pump 625 may operate to pump electrolyte from the electrolyte reservoir 626 into the vessel 601 to raise the level of the volume of liquid electrolyte 604 and may pump electrolyte out of the vessel 601 into the electrolyte reservoir 626 to lower the level of the volume of liquid electrolyte 604. FIG. 6A shows the battery 600 in an operating state in which the electrolyte is pumped out of the vessel 601 to reduce the volume of liquid electrolyte 604 to a level such that the metal electrode 606 is removed from the electrolyte. In this manner, self-discharge may be prevented by removing the electrolyte from the metal electrode 606. The mode of operation shown in FIG. 6A corresponds to an energy storing mode of operation. FIG. 6B shows the battery 600 in another operating state in which the electrolyte is pumped into the vessel 601 to increase the volume of liquid electrolyte 604 to a level such that the metal electrode 606 is submerged in the electrolyte. The mode of operation shown in FIG. 6B corresponds to an active charging or discharging mode of operation. Draining the electrolyte from the metal electrode 606 may prevent self-discharge of the metal electrode 606.

Figure 7A:
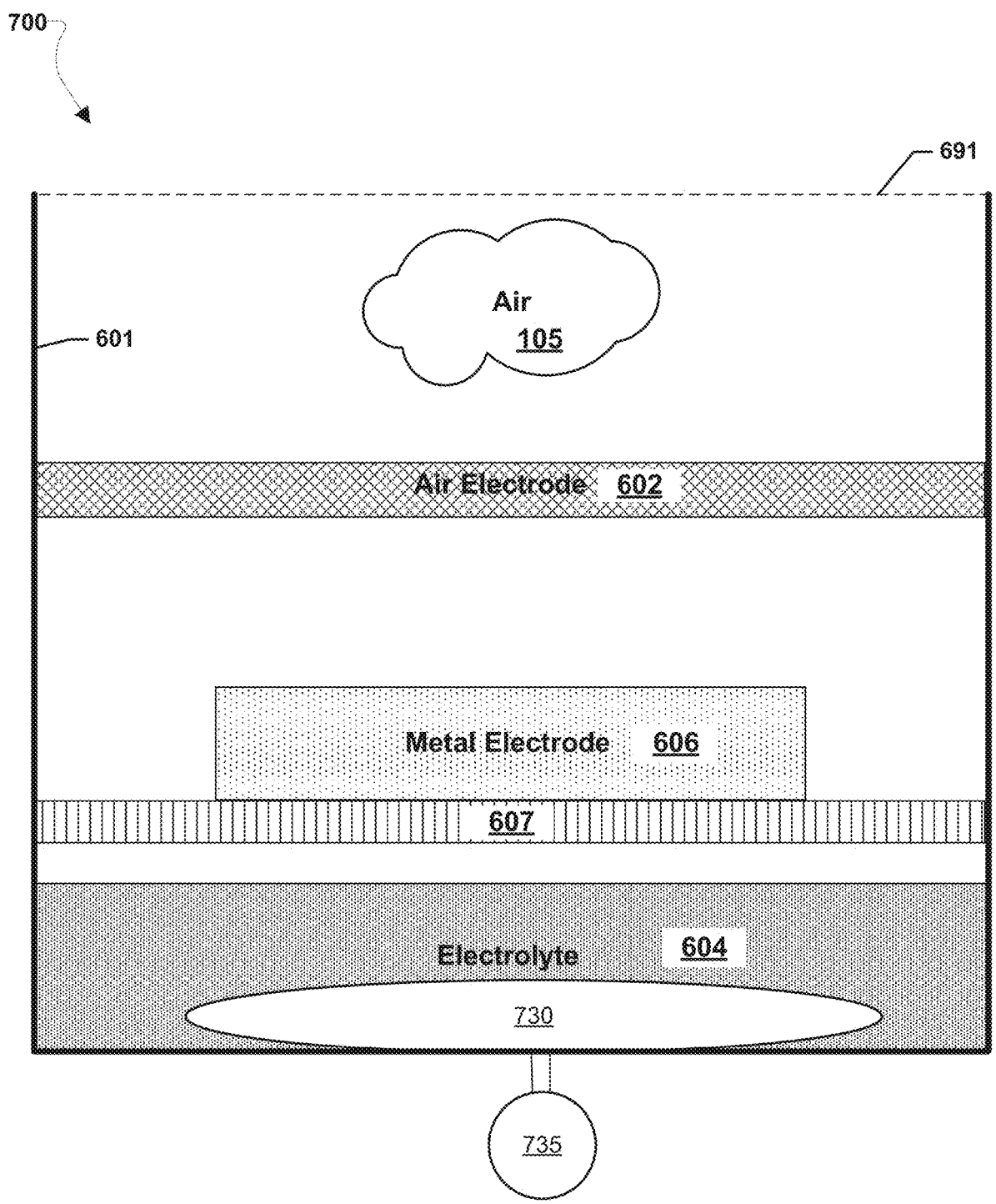
Figure 7B:
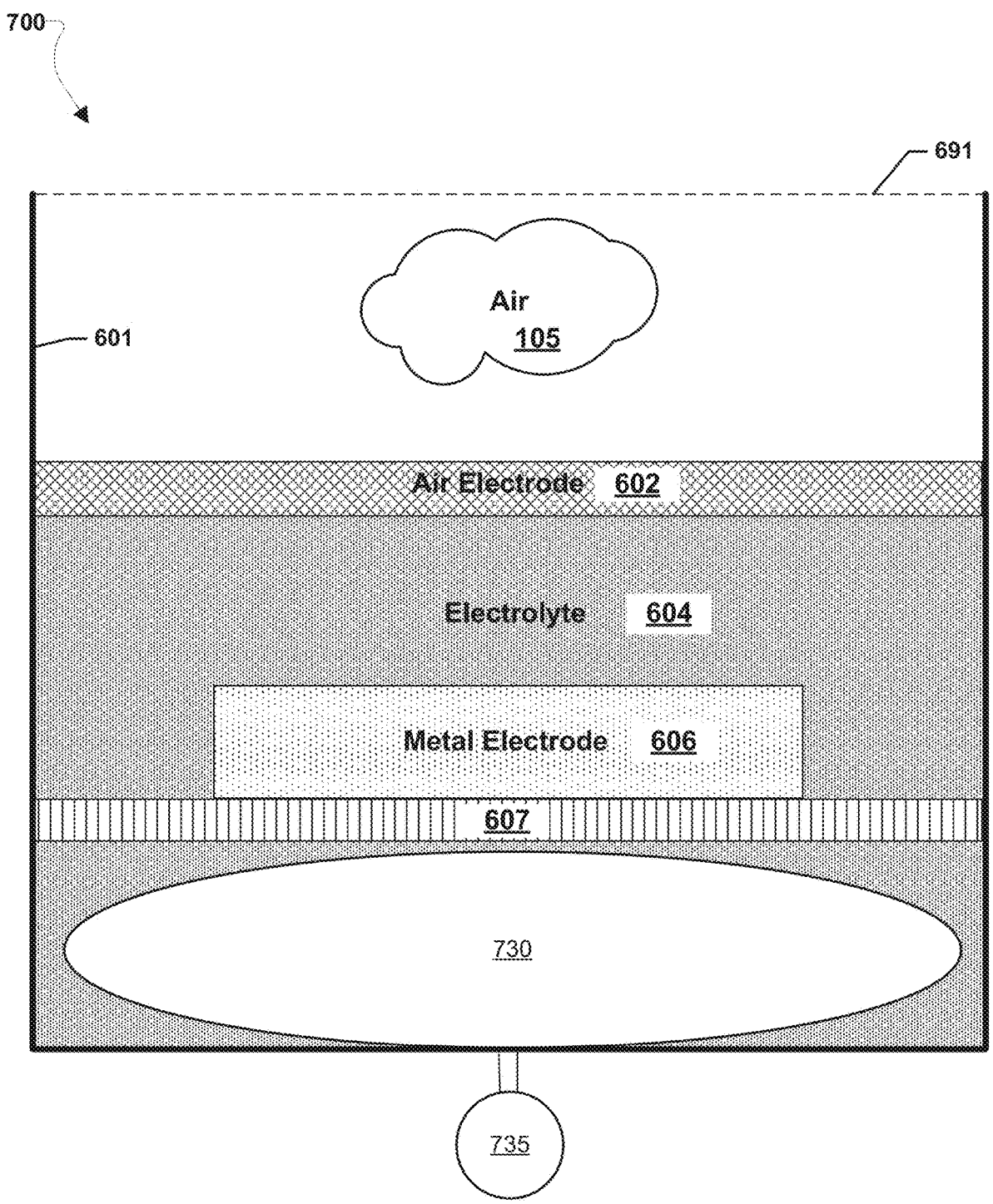

FIGS. 7A and 7B show a battery 700 according to an embodiment in an operating state with the metal electrode 606 removed from a volume of liquid electrolyte 604 (FIG. 7A) and in an operating state with the metal electrode 606 submerged in the volume of liquid electrolyte 604 (FIG. 7B). The battery 700 may be similar to battery 600 described above except that rather than a pump 625 pumping electrolyte into and out of the vessel 601, a gas filled bladder 730 may change the electrolyte level. The gas filled bladder 730 may be disposed within the volume of liquid electrolyte 604. The gas filled bladder 730 may be formed from elastic material and may expand and contract, as gas, such as air, is pumped into and out of the gas filled bladder 730 by a pump 735. The pump 735 may operate to pump gas, such as air, into the gas filled bladder 730 to expand the gas filled bladder 730 in the vessel 601. As the gas filled bladder 730 expands it may displace more electrolyte thereby raising the level of the volume of liquid electrolyte in the vessel 601 to submerge the metal electrode 606 in electrolyte as shown in FIG. 7B. The pump 735 may operate pump gas, such as air, out of the gas filled bladder 730 to contract the gas filled bladder 730 in the vessel 601. As the gas filled bladder 730 contracts it may displace less electrolyte thereby dropping the level of the volume of liquid electrolyte in the vessel 601 to expose the metal electrode 606 to air 105 and remove the metal electrode 606 from the electrolyte as shown in FIG. 7A. Removing the electrolyte from the metal electrode 606 may prevent self-discharge of the metal electrode 606.

Figure 8A:
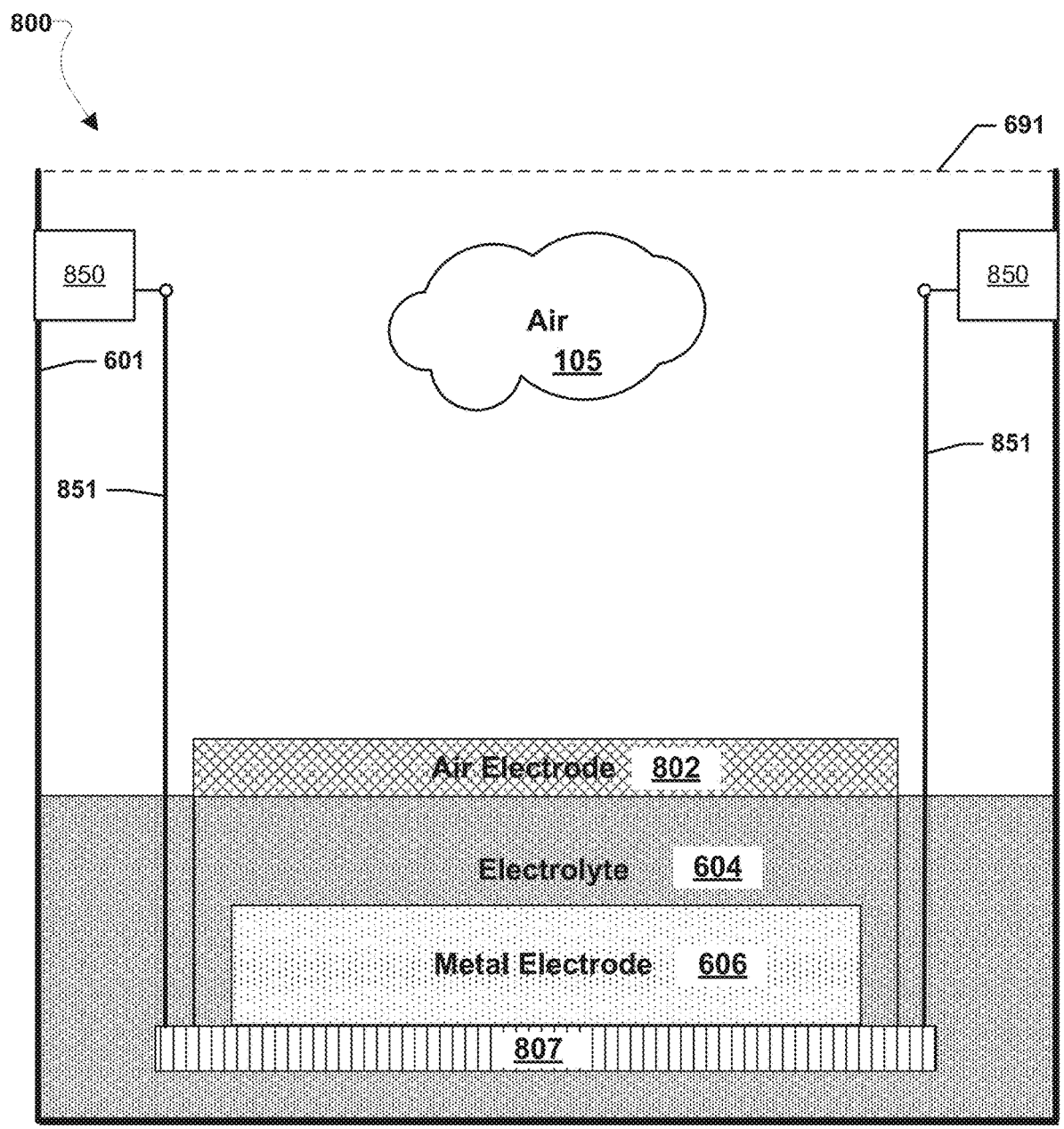
Figure 8B:
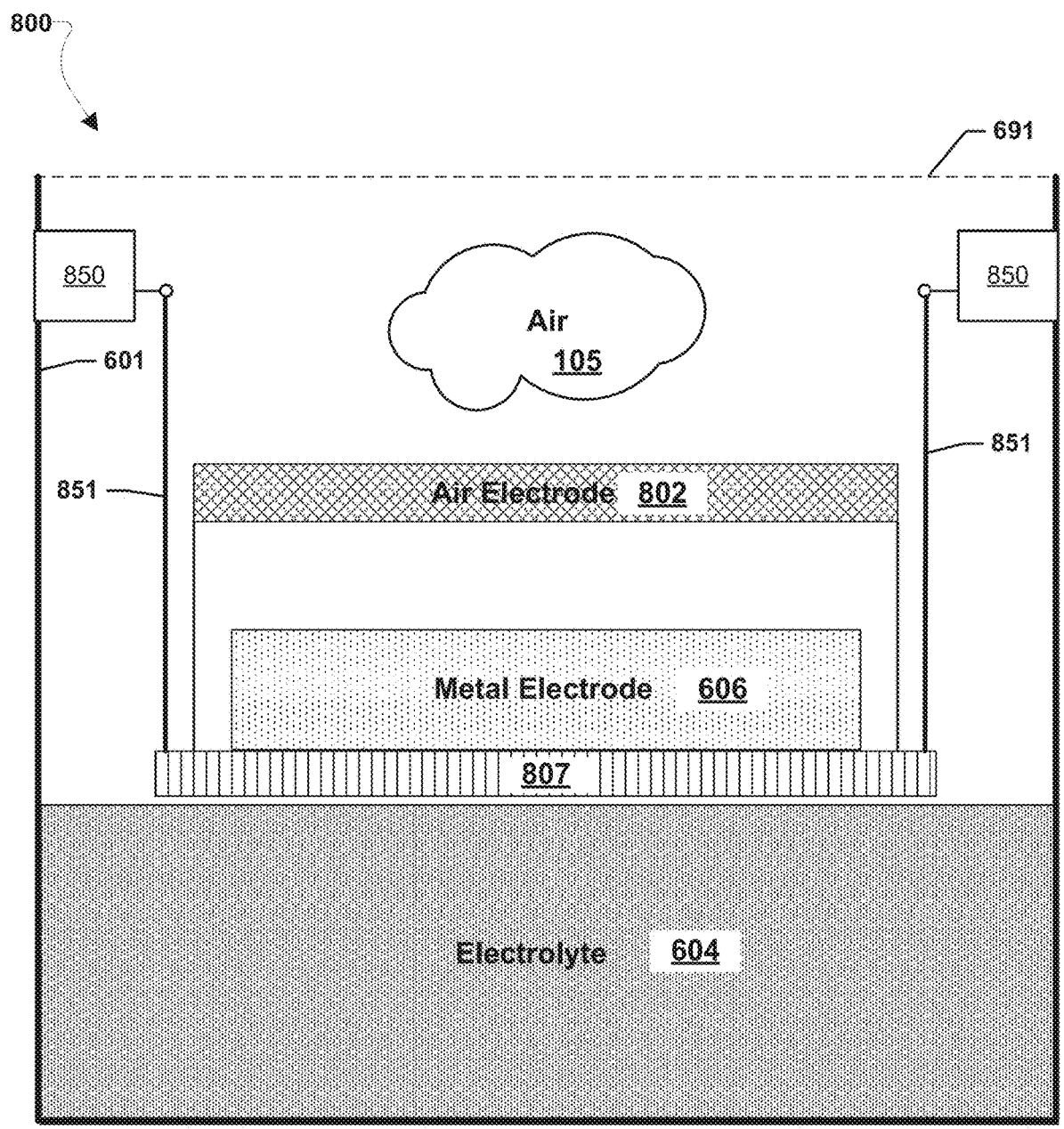

FIGS. 8A and 8B show a battery 800 according to an embodiment in an operating state with the metal electrode 606 removed from a volume of liquid electrolyte 604 (FIG. 8B) and in an operating state with the metal electrode 606 submerged in the volume of liquid electrolyte 604 (FIG. 8A). The battery 800 may be similar to battery 600 described above except that rather than a pump 625 pumping electrolyte into and out of the vessel 601, a lifting system may raise and lower the metal electrode 606 into and out of the volume of liquid electrolyte 604. The lifting system may include one or more motors 850 coupled to the vessel 601. One or more drive elements 851, such as belts, chains, screws, gears, etc., may be coupled to the one or more motors 850 and coupled to the rigid porous current collector 807, thereby coupling the lifting system to the rigid porous current collector 807. The metal electrode 606 may be supported by the rigid porous current collector 807. Additionally, the air electrode 802 may be supported by the rigid porous current collector 807. The lifting system may lower the rigid porous current collector 807 and metal electrode into the volume of liquid electrolyte 604 to submerge the metal electrode 606 in electrolyte as shown in FIG. 8A. The lifting system may raise the rigid porous current collector 807 and metal electrode out of the volume of liquid electrolyte 604 to expose the metal electrode 606 to air 105 and remove the metal electrode 606 from the electrolyte as shown in FIG. 8B. Removing the metal electrode 606 from the electrolyte may prevent self-discharge of the metal electrode 606.

Figure 9A:
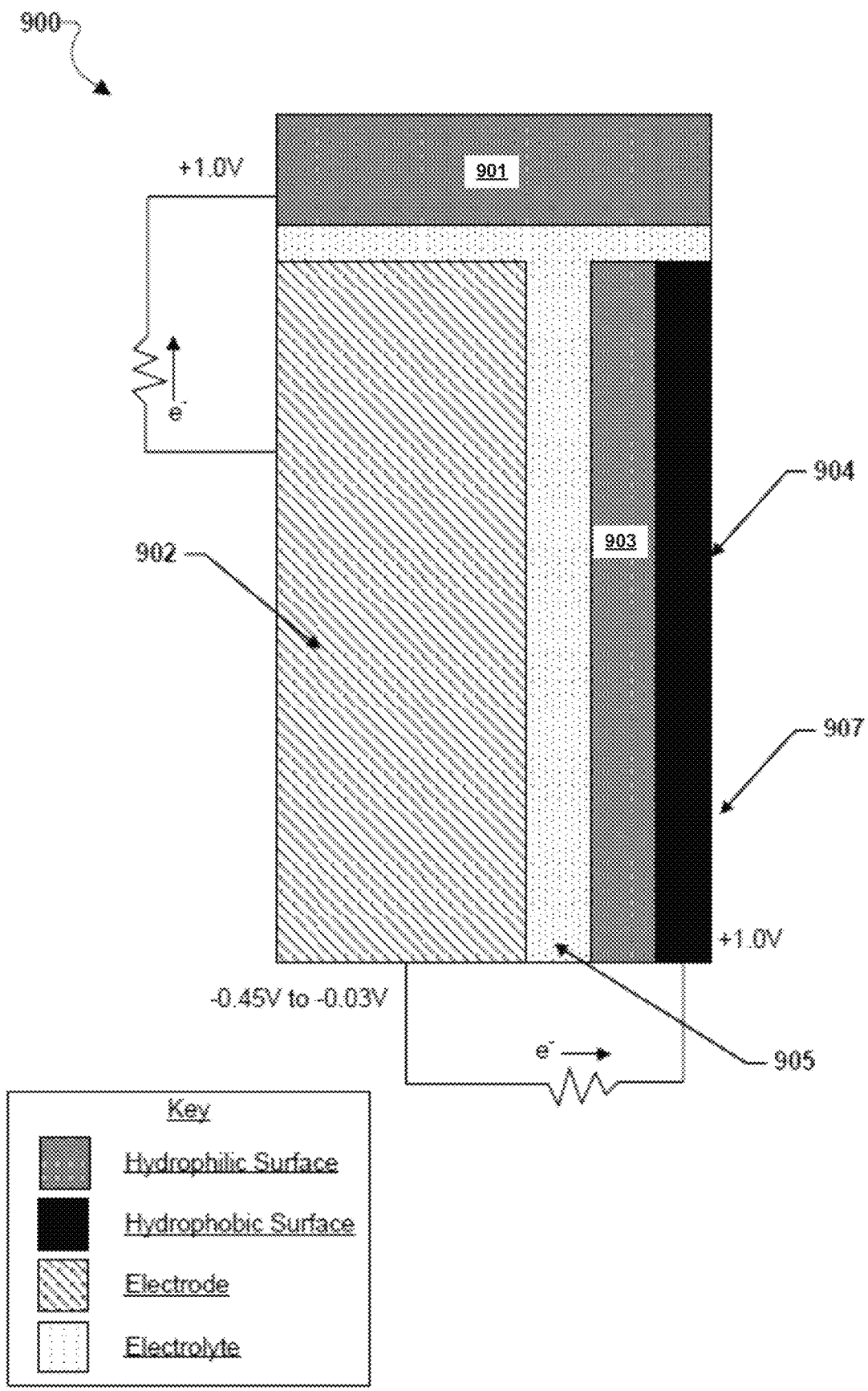
FIGS. 9A, 9B, and 9C are block diagrams of an embodiment three electrode mechanically adjustable battery in a discharge mode and a recharge mode, respectively.
Figure 9B:
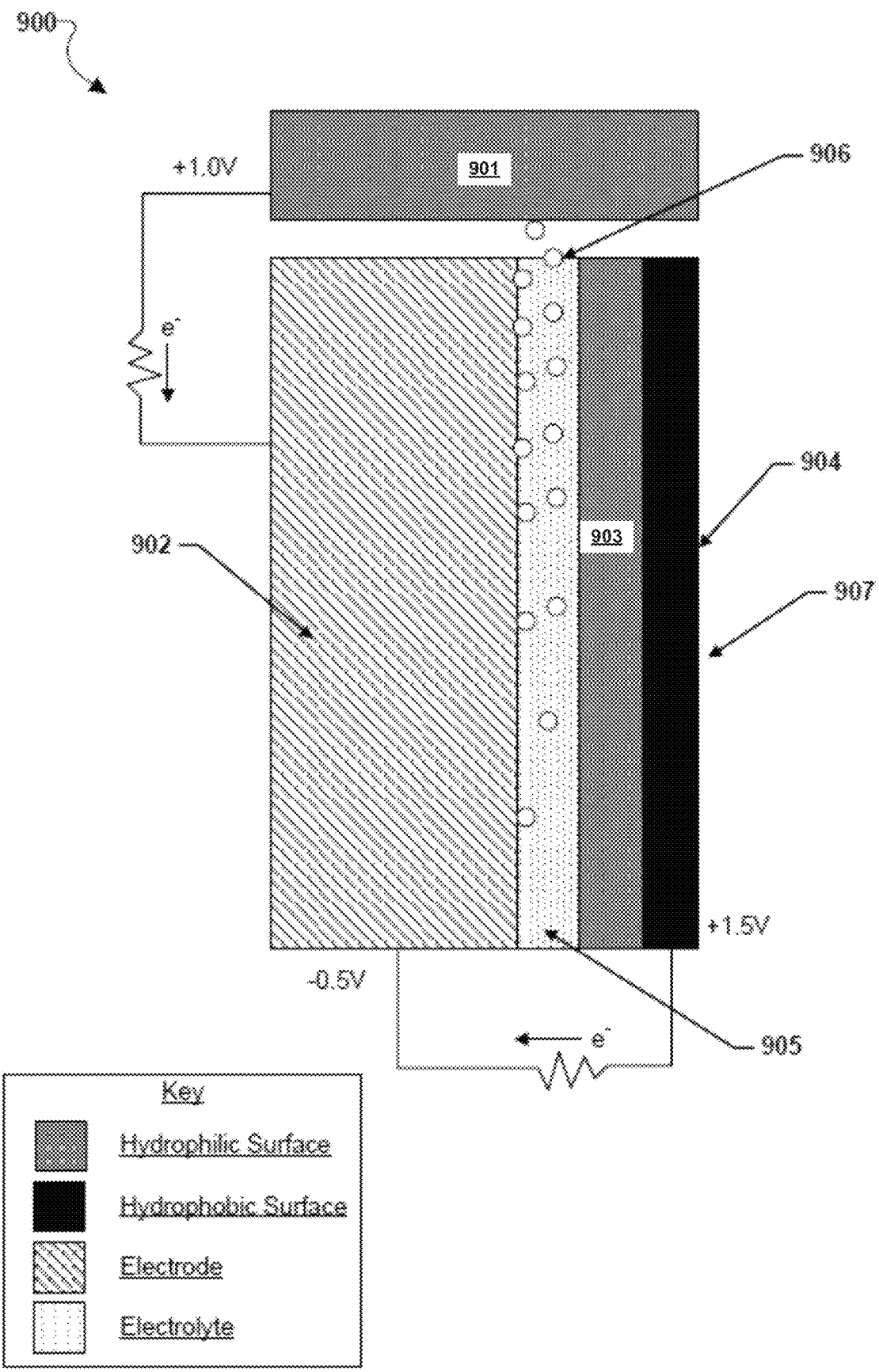

FIGS. 9A and 9B are block diagrams of an embodiment three electrode battery 900 operating in a discharge mode (FIG. 9A) and a recharge mode (FIG. 9B), respectively.

In various embodiments, battery 900 may include three electrodes, an anode 902, a first cathode 907, and a second cathode 901. The electrodes may have finite useful lifetimes, and may be mechanically replaceable. For example, anode 902 may be replaced annually, seasonally, monthly, weekly, or on some other specified period of replacement. The first cathode 907 may be divided into two portions, a first portion 903 having a hydrophilic surface and a second portion 904 having a hydrophobic surface. For example, the hydrophobic surface may have a polytetrafluoroethylene (PTFE) (e.g., Teflon®) hydrophobic surface. For example, the second portion 904 may be a microporous layer (MPL) of polytetrafluoroethylene (PTFE) and high surface area carbon while the first portion 903 may be carbon fiber partially coated with PTFE. As another example, the second portion 904 may be a MPL of PTFE and carbon black and the first portion 903 may be PTFE of approximately 33% by weight. As a further example, the second portion 904 may be an MPL of 23% by weight PTFE and 77% by weight carbon black and the first portion 903 may be a low loading MPL. The anode 902 may be an iron (Fe) electrode or an iron-alloy (Fe-alloy) electrode (e.g., FeAl, FeZn, FeMg, etc.). The second cathode 901 may have a hydrophilic surface. The second cathode 901 may have a metal substrate, such as carbon (C), titanium (Ti), steel, copper, etc., coated with nickel (Ni). Electrolyte 905 may be disposed between the three electrodes 901, 902, and 903. The electrolyte 905 may be infiltrated into one or more of the three electrodes 901, 902, and 903.

In a discharge mode of operation illustrated in FIG. 9A, electrolyte 905 may flood the surfaces of the anode 902, first cathode 907, and second cathode 901. In the discharge mode of operation, the battery 900 may generate power. The first and second cathodes may be at the same higher potential than the anode in this mode (e.g., the cathodes may be at a positive potential and the anode may be at a negative potential). For example, when the anode 902 is a Fe anode, the anode 902 may have a potential of −0.45 to −0.03V vs. regular hydrogen electrode (RHE) in the discharge mode and the first cathode 907 and second cathode 901 may have the same potentials of +1.0V vs. RHE. In the discharge mode, a two phase oxygen reduction reaction (ORR) may occur at the first cathode 907 and a flooded oxygen reduction reaction (ORR) may occur at the second cathode 901.

In a recharge mode of operation illustrated in FIG. 9B, the level of electrolyte 905 may be reduced to expose the second cathode 901 to air. The level of the electrolyte 905 in the battery 900 may be controlled by pumps, valves, and/or other systems to transition the level of the electrolyte 905 to flood or not flood the second cathode 901 in the discharge and recharge modes, respectively. In the recharge mode, a dry hydrogen oxidation reaction (HOR) may occur at the second cathode 901 and a two phase oxygen evolution reaction (OER) may occur at the first cathode 907. When the anode 902 is an Fe anode, hydrogen ($H_2$) bubbles 906 may be created by the anode 902 in the recharge mode in a parasitic process. The hydrogen ($H_2$) bubbles 906 may be oxidized (i.e., electrons recaptured) at the second cathode 901. The two cathodes 901 and 907 may have different positive potentials with regard to the anode 902 in the recharge mode, such as 0.1V and 1.5V (vs. RHE), respectively, while the anode may be at −0.5V vs. RHE. This may keep the second cathode 901 at a more favorable 0.1V potential vs. RHE as it oxidizes hydrogen ($H_2$) bubbles 906 produced by the anode 902. Additionally, the separation of the anode 902 from other components of the battery 900, such as cathode 907, may protect those separate components from bubble damage caused by the bubbles from the anode 902. For example, as the placement of such bubble sensitive parts away from (and/or below) the anode 902 may ensure that the sensitive parts are not in the bubble path because the bubbles will flow upward in the liquid electrolyte 905.

Figure 9C:
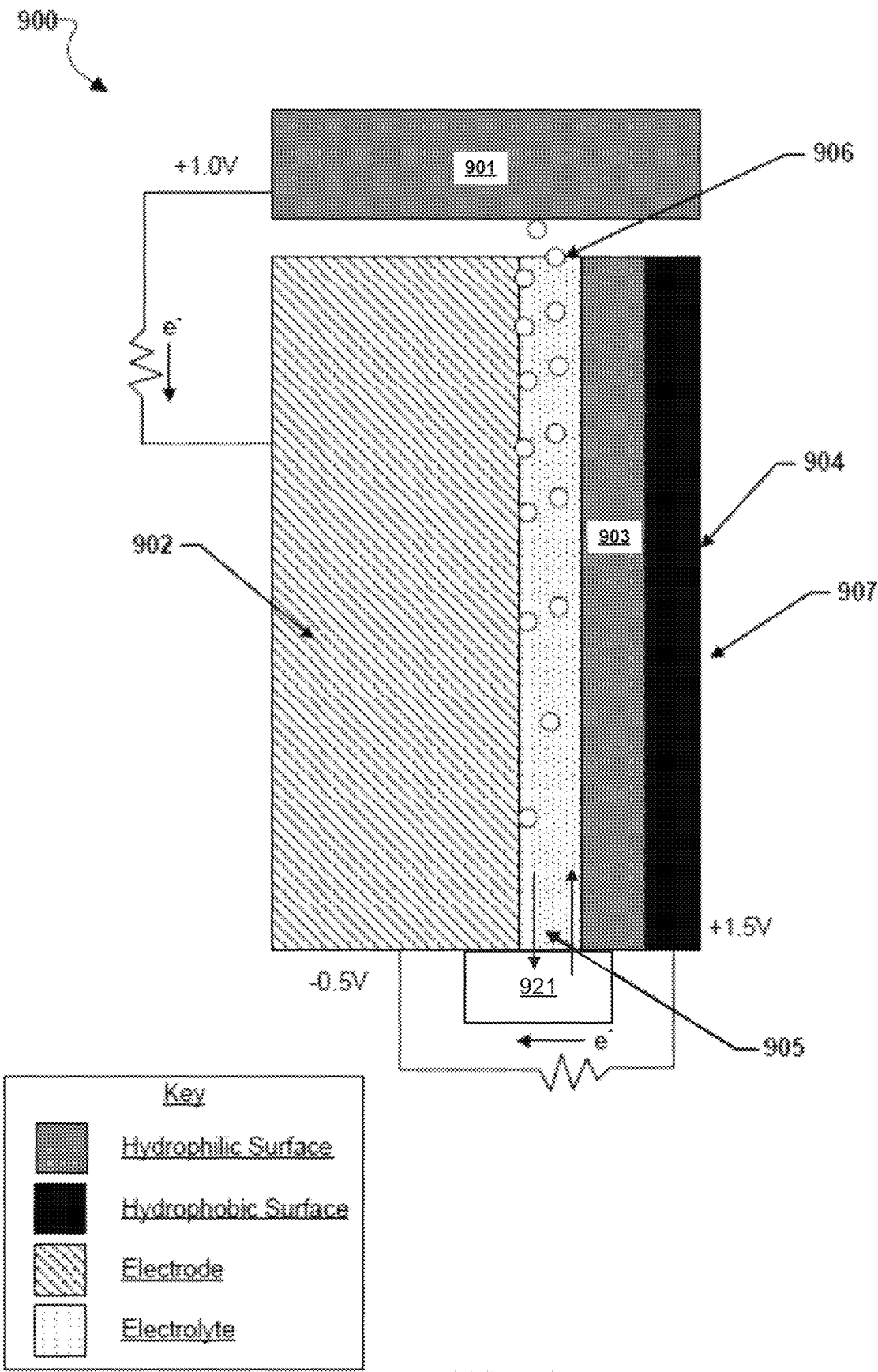

In some instances, hydrogen ($H_2$) bubbles generated at the anode 902 can become mechanically pinned or stuck at unwanted sites in the battery 900, and cause increases in cell impedance. This may be mitigated by agitating the bubbles by circulating the electrolyte 905, through natural or forced convection. In certain embodiments, the recirculation occurs naturally (natural convection) inside of the battery 900 due to the movement of oxygen bubbles that are generated at the positive electrode during the charging process in the cell. In certain other embodiments, the circulation occurs due to forced pumping of liquid electrolyte 905. For example, such an embodiment is illustrated in FIG. 9C in which an electrolyte circulation pump 921 is used to pump electrolyte 905 into and/or out of the battery 900. In certain embodiments, the flow of electrolyte 905 may be a fully closed loop and there may be no change to the composition of the electrolyte 905 through the flow loop. In certain other embodiments, the recirculation loop may further include mechanisms for adjusting the composition of the electrolyte 905. For example, in certain embodiments, additional water ($H_2O$) may be added to the electrolyte 905 during pumping to compensate for water lost to hydrogen generation. In certain other embodiments, the pH of the electrolyte 905 may be titrated by the addition of NaOH or other base or acid to the electrolyte 905 during pumping. In certain other embodiments, carbonate ions ($_3{}^{2-}\square\square_3{}^{2-}$) may be scrubbed from the electrolyte 905 during pumping by ion-exchange of $Ca(OH)_2$ to $CaCO_3$. In certain other embodiments, other electrolyte components, such as sodium sulfide ($Na_2S$) or lithium hydroxide (LiOH) may be added to the electrolyte 905 during pumping.

Two problems that may arise with a stagnant electrolyte 905 are the formation of bubbles and the creation of a pH gradient during both charge and discharge. Bubbles may not escape from the electrolyte 905 and may become stuck on the electrodes, leading to a performance decay. A pH gradient in the electrolyte 905 can also lead to performance decay or corrosion of the electrodes. One solution to both the issue of bubbles and a pH gradient may be to circulate electrolyte 905 at a low flow rate, such as less than 1 mL/min/cm$^2$, for example using the electrolyte circulation pump 921. This flow of electrolyte 905 may provide convenient or even automatic bubble management by making it easier for bubbles to escape. Additionally, flowing electrolyte 905 may provide pH control so that a gradient does not form.

Alkaline iron electrode batteries operate best with certain additives in the electrolyte and/or cell in general. For example, sulfur aids in de-passivation of iron electrodes, but sulfur species may be consumed or degraded during the operation and/or storage of the battery. Sulfur consumption contributes to a fade in capacity over many cycles. A delivery system therefore may be provided to replenish sulfur supplies in order to maintain battery performance.

Figure 10:
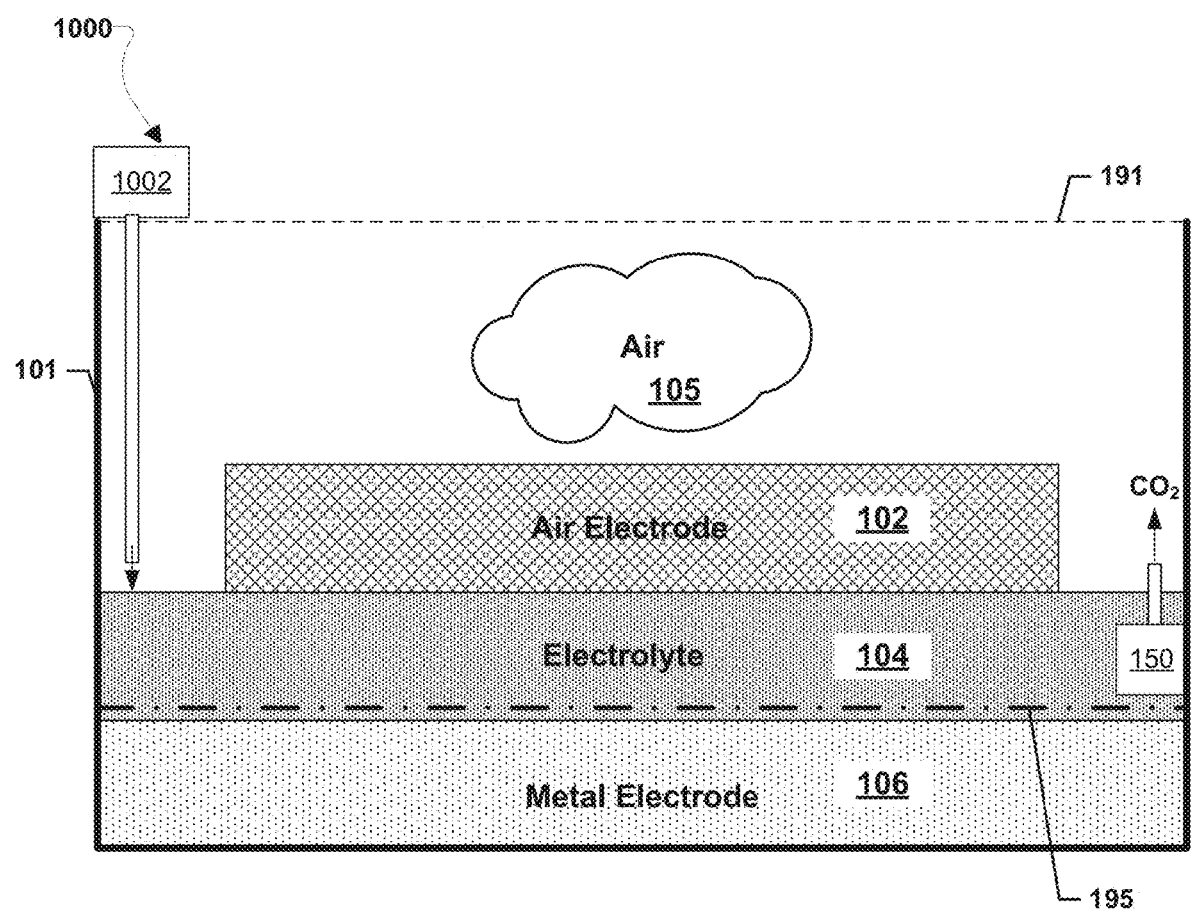
FIG. 10 is a block diagram of an embodiment battery.

FIG. 10 is a block diagram of an embodiment battery 1000 including a sulfur delivery system 1002. In some embodiments, the battery 1000 may be an unsealed battery open to the environment, such that air 105 passes freely into and out of the battery 1000. In some optional embodiments, the multi-vessel battery 1000 may be a sealed battery having a lid 191 (or other type containment structure) sealing off the battery 1000 from the environment. In such a sealed configuration, volumes of air 105 may be pumped into the battery 1000 and/or be trapped in the multi-vessel battery 1000 itself by the lid 191 (or other type containment structure). The battery 1000 may be similar to battery 100 described above, except, the battery 1000 may include the sulfur delivery system 1002. In one embodiment, the sulfur delivery system 1002 may be a pump that delivers sulfur-bearing liquid to the battery 1000. In another embodiment, the sulfur delivery system 1002 may be a dry hopper that delivers polysulfide salts to the battery 1000. Examples of polysulfide salts include sodium sulfide ($Na_2S$) and sodium polysulfides ($Na_2S_x$, where x=1-8), potassium sulfide ($K_2S$), potassium polysulfides ($K_2S_x$, where x=1-8), lithium sulfide ($Li_2S$) and lithium polysulfides ($Li_2S_x$, where x=1-8), iron sulfides ($FeS_x$, where x=1-2), bismuth sulfide ($Bi_2S_3$), lead sulfide (PbS), zinc sulfide (ZnS), antimony sulfide ($Sb_2S_3$), selenium sulfide ($SeS_2$), tin sulfides ($SnS$, $SnS_2$, $Sn_2S_3$), nickel sulfide (NiS), molybdenum sulfide ($MoS_2$), and mercury sulfide (HgS).

Various embodiments may provide devices and/or methods for use in bulk energy storage systems, such as long duration energy storage (LODES) systems, short duration energy storage (SDES) systems, etc. As an example, various embodiments may provide batteries (e.g., batteries 100, 200, 500, 600, 700, 800, 900, 1000, etc.) for bulk energy storage systems, such as batteries for LODES systems. Renewable power sources are becoming more prevalent and cost effective. However, many renewable power sources face an intermittency problem that is hindering renewable power source adoption. The impact of the intermittent tendencies of renewable power sources may be mitigated by pairing renewable power sources with bulk energy storage systems, such as LODES systems, SDES systems, etc. To support the adoption of combined power generation, transmission, and storage systems (e.g., a power plant having a renewable power generation source paired with a bulk energy storage system and transmission facilities at any of the power plant and/or the bulk energy storage system) devices and methods to support the design and operation of such combined power generation, transmission, and storage systems, such as the various embodiment devices and methods described herein, are needed.

A combined power generation, transmission, and storage system may be a power plant including one or more power generation sources (e.g., one or more renewable power generation sources, one or more non-renewable power generations sources, combinations of renewable and non-renewable power generation sources, etc.), one or more transmission facilities, and one or more bulk energy storage systems. Transmission facilities at any of the power plant and/or the bulk energy storage systems may be co-optimized with the power generation and storage system or may impose constraints on the power generation and storage system design and operation. The combined power generation, transmission, and storage systems may be configured to meet various output goals, under various design and operating constraints.

FIGS. 11-19 illustrate various example systems in which one or more aspects of the various embodiments may be used as part of bulk energy storage systems, such as LODES systems, SDES systems, etc. For example, various embodiment batteries described herein (e.g., batteries 100, 200, 500, 600, 700, 800, 900, 1000, etc.) may be used as batteries for bulk energy storage systems, such as LODES systems, SDES systems, etc. and/or various one or more battery components, singularly or in various combinations, such as electrodes, leads, pumps, mechanical barriers, current collectors, bladders, lifting systems, etc., as described herein may be used as components for bulk energy storage systems. As used herein, the term "LODES system" may mean a bulk energy storage system configured to may have a rated duration (energy/power ratio) of 24 hours (h) or greater, such as a duration of 24 h, a duration of 24 h to 50 h, a duration of greater than 50 h, a duration of 24 h to 150 h, a duration of greater than 150 h, a duration of 24 h to 200 h, a duration greater than 200 h, a duration of 24 h to 500 h, a duration greater than 500 h, etc.

Figure 11:
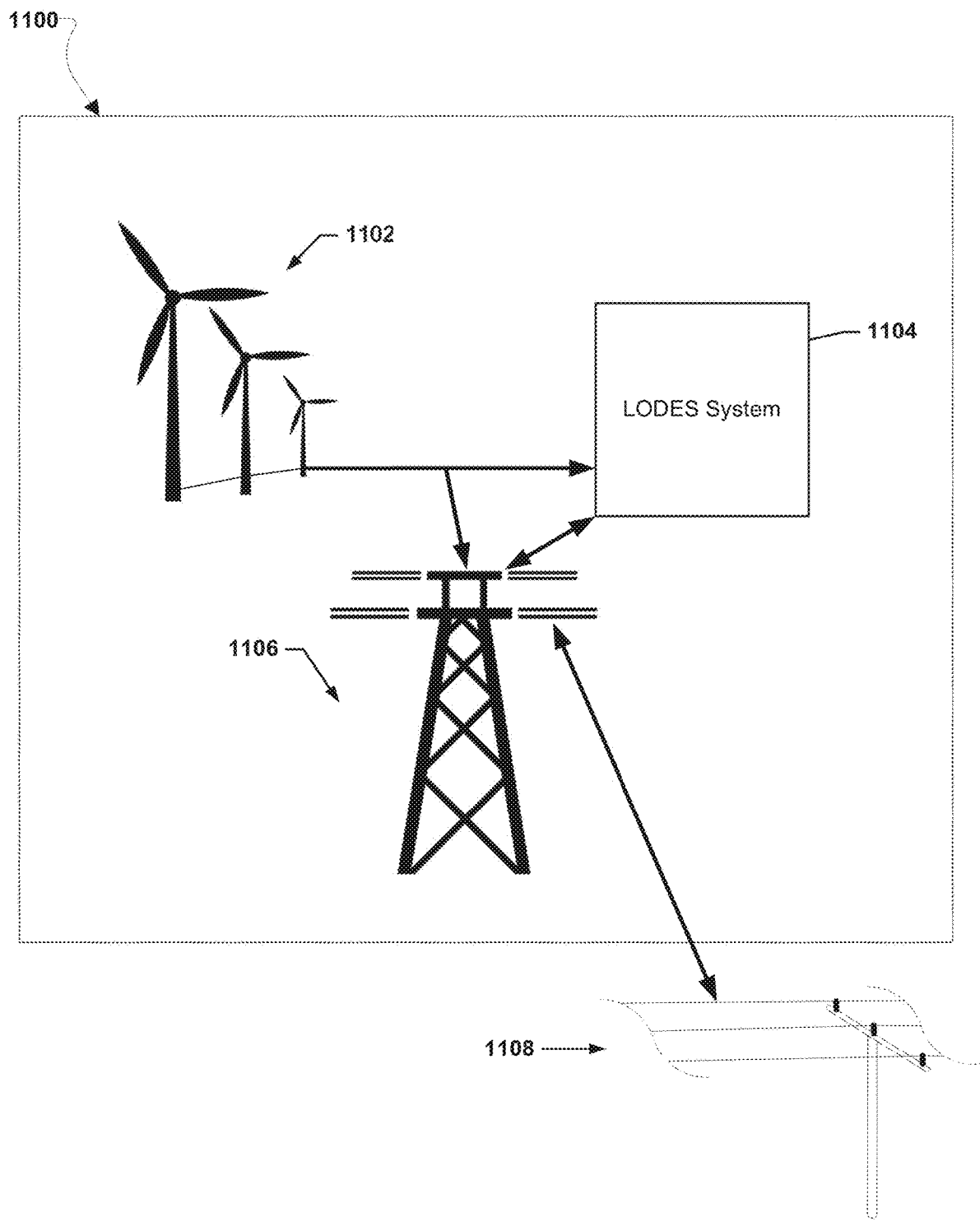
FIGS. 11-19 illustrate various example systems in which one or more aspects of the various embodiments may be used as part of bulk energy storage systems.

FIG. 11 illustrates an example system in which one or more aspects of the various embodiments may be used as part of bulk energy storage system. As a specific example, the bulk energy storage system incorporating one or more aspects of the various embodiments may be a LODES system 1104. As an example, the LODES system 1104 may include various embodiment batteries described herein (e.g., batteries 100, 200, 500, 600, 700, 800, 900, 1000, etc.) and/or various one or more battery components, singularly or in various combinations, such as electrodes, leads, pumps, mechanical barriers, current collectors, bladders, lifting systems, etc., as described herein. The LODES system 1104 may be electrically connected to a wind farm 1102 and one or more transmission facilities 1106. The wind farm 1102 may be electrically connected to the transmission facilities 1106. The transmission facilities 1106 may be electrically connected to the grid 1108. The wind farm 1102 may generate power and the wind farm 1102 may output generated power to the LODES system 1104 and/or the transmission facilities 1106. The LODES system 1104 may store power received from the wind farm 1102 and/or the transmission facilities 1106. The LODES system 1104 may output stored power to the transmission facilities 1106. The transmission facilities 1106 may output power received from one or both of the wind farm 1102 and LODES system 1104 to the grid 1108 and/or may receive power from the grid 1108 and output that power to the LODES system 1104. Together the wind farm 1102, the LODES system 1104, and the transmission facilities 1106 may constitute a power plant 1100 that may be a combined power generation, transmission, and storage system. The power generated by the wind farm 1102 may be directly fed to the grid 1108 through the transmission facilities 1106, or may be first stored in the LODES system 1104. In certain cases the power supplied to the grid 1108 may come entirely from the wind farm 1102, entirely from the LODES system 1104, or from a combination of the wind farm 1102 and the LODES system 1104. The dispatch of power from the combined wind farm 1102 and LODES system 1104 power plant 1100 may be controlled according to a determined long-range (multi-day or even multi-year) schedule, or may be controlled according to a day-ahead (24 hour advance notice) market, or may be controlled according to an hour-ahead market, or may be controlled in response to real time pricing signals.

As one example of operation of the power plant 1100, the LODES system 1104 may be used to reshape and "firm" the power produced by the wind farm 1102. In one such example, the wind farm 1102 may have a peak generation output (capacity) of 260 megawatts (MW) and a capacity factor (CF) of 41%. The LODES system 1104 may have a power rating (capacity) of 106 MW, a rated duration (energy/power ratio) of 150 hours (h), and an energy rating of 15,900 megawatt hours (MWh). In another such example, the wind farm 1102 may have a peak generation output (capacity) of 300 MW and a capacity factor (CF) of 41%. The LODES system 1104 may have a power rating of 106 MW, a rated duration (energy/power ratio) of 200 h and an energy rating of 21,200 MWh. In another such example, the wind farm 1102 may have a peak generation output (capacity) of 176 MW and a capacity factor (CF) of 53%. The LODES system 1104 may have a power rating (capacity) of 88 MW, a rated duration (energy/power ratio) of 150 h and an energy rating of 13,200 MWh. In another such example, the wind farm 1102 may have a peak generation output (capacity) of 277 MW and a capacity factor (CF) of 41%. The LODES system 1104 may have a power rating (capacity) of 97 MW, a rated duration (energy/power ratio) of 50 h and an energy rating of 4,850 MWh. In another such example, the wind farm 1102 may have a peak generation output (capacity) of 315 MW and a capacity factor (CF) of 41%. The LODES system 1104 may have a power rating (capacity) of 110 MW, a rated duration (energy/power ratio) of 25 h and an energy rating of 2,750 MWh.

Figure 12:
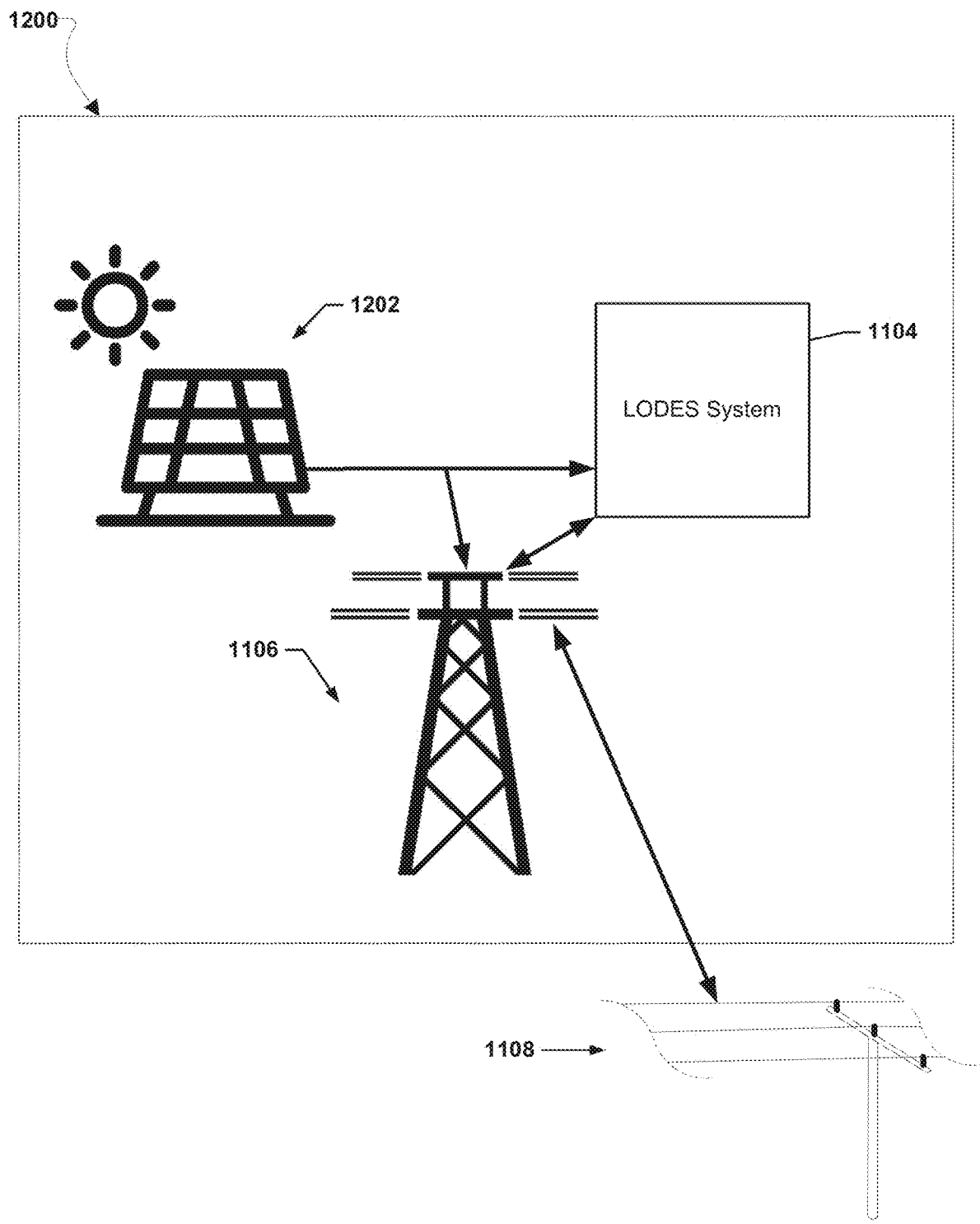

FIG. 12 illustrates an example system in which one or more aspects of the various embodiments may be used as part of bulk energy storage system. As a specific example, the bulk energy storage system incorporating one or more aspects of the various embodiments may be a LODES system 1104. As an example, the LODES system 1104 may include various embodiment batteries described herein (e.g., batteries 100, 200, 500, 600, 700, 800, 900, 1000, etc.) and/or various one or more battery components, singularly or in various combinations, such as electrodes, leads, pumps, mechanical barriers, current collectors, bladders, lifting systems, etc., as described herein. The system of FIG. 12 may be similar to the system of FIG. 11, except a photovoltaic (PV) farm 1202 may be substituted for the wind farm 1102. The LODES system 1104 may be electrically connected to the PV farm 1202 and one or more transmission facilities 1106. The PV farm 1202 may be electrically connected to the transmission facilities 1106. The transmission facilities 1106 may be electrically connected to the grid 1108. The PV farm 1202 may generate power and the PV farm 1202 may output generated power to the LODES system 1104 and/or the transmission facilities 1106. The LODES system 1104 may store power received from the PV farm 1202 and/or the transmission facilities 1106. The LODES system 1104 may output stored power to the transmission facilities 1106. The transmission facilities 1106 may output power received from one or both of the PV farm 1202 and LODES system 1104 to the grid 1108 and/or may receive power from the grid 1108 and output that power to the LODES system 1104. Together the PV farm 1202, the LODES system 1104, and the transmission facilities 1106 may constitute a power plant 1200 that may be a combined power generation, transmission, and storage system. The power generated by the PV farm 1202 may be directly fed to the grid 1108 through the transmission facilities 1106, or may be first stored in the LODES system 1104. In certain cases the power supplied to the grid 1108 may come entirely from the PV farm 1202, entirely from the LODES system 1104, or from a combination of the PV farm 1202 and the LODES system 1104. The dispatch of power from the combined PV farm 1202 and LODES system 1104 power plant 1200 may be controlled according to a determined long-range (multi-day or even multi-year) schedule, or may be controlled according to a day-ahead (24 hour advance notice) market, or may be controlled according to an hour-ahead market, or may be controlled in response to real time pricing signals.

As one example of operation of the power plant 1200, the LODES system 1104 may be used to reshape and "firm" the power produced by the PV farm 1202. In one such example, the PV farm 1202 may have a peak generation output (capacity) of 490 MW and a capacity factor (CF) of 24%. The LODES system 1104 may have a power rating (capacity) of 340 MW, a rated duration (energy/power ratio) of 150 h and an energy rating of 51,000 MWh. In another such example, the PV farm 1202 may have a peak generation output (capacity) of 680 MW and a capacity factor (CF) of 24%. The LODES system 1104 may have a power rating (capacity) of 410 MW, a rated duration (energy/power ratio) of 200 h, and an energy rating of 82,000 MWh. In another such example, the PV farm 1202 may have a peak generation output (capacity) of 330 MW and a capacity factor (CF) of 31%. The LODES system 1104 may have a power rating (capacity) of 215 MW, a rated duration (energy/power ratio) of 150 h, and an energy rating of 32,250 MWh. In another such example, the PV farm 1202 may have a peak generation output (capacity) of 510 MW and a capacity factor (CF) of 24%. The LODES system 1104 may have a power rating (capacity) of 380 MW, a rated duration (energy/power ratio) of 50 h, and an energy rating of 19,000 MWh. In another such example, the PV farm 1202 may have a peak generation output (capacity) of 630 MW and a capacity factor (CF) of 24%. The LODES system 1104 may have a power rating (capacity) of 380 MW, a rated duration (energy/power ratio) of 25 h, and an energy rating of 9,500 MWh.

Figure 13:
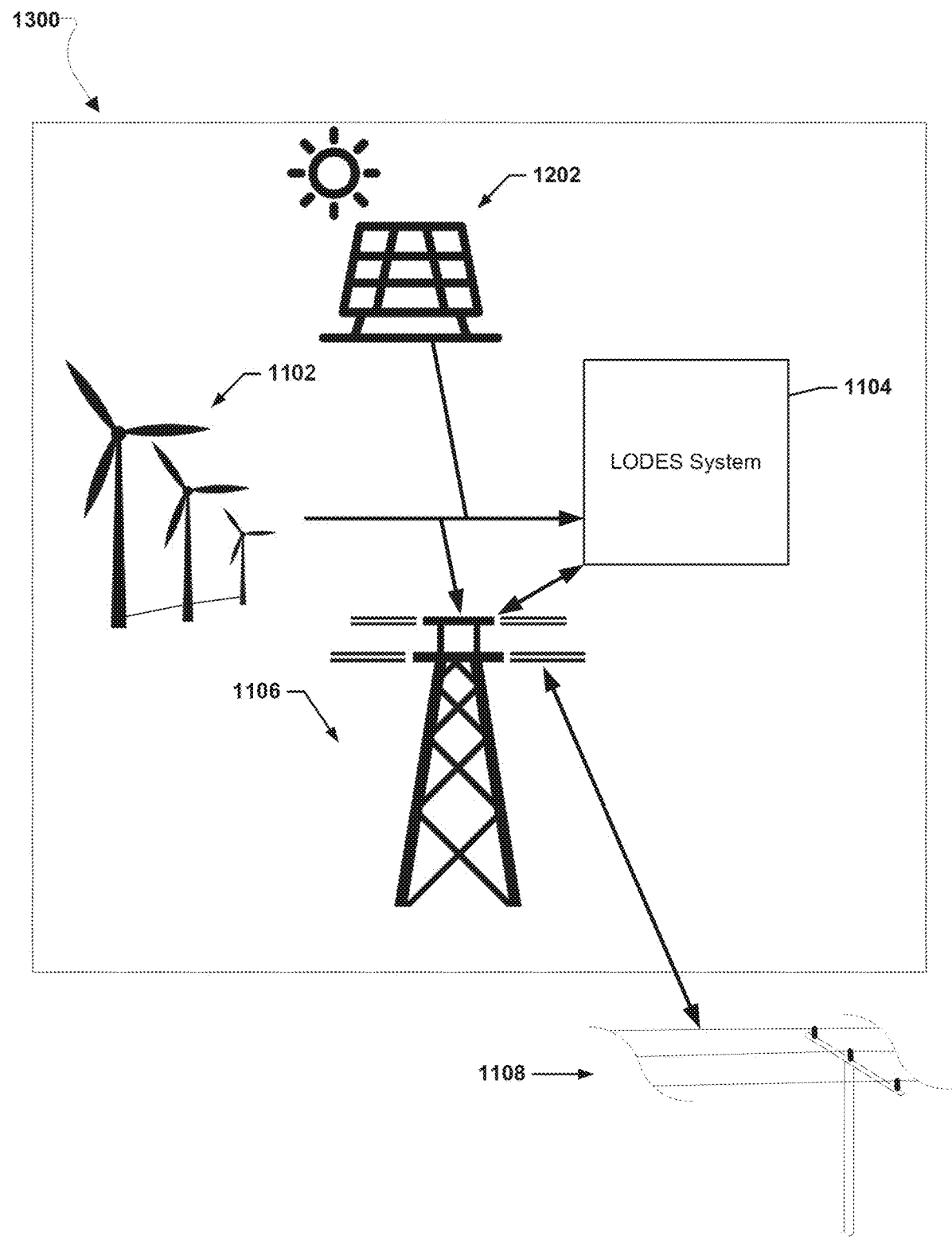

FIG. 13 illustrates an example system in which one or more aspects of the various embodiments may be used as part of bulk energy storage system. As a specific example, the bulk energy storage system incorporating one or more aspects of the various embodiments may be a LODES system 1104. As an example, the LODES system 1104 may include various embodiment batteries described herein (e.g., batteries 100, 200, 500, 600, 700, 800, 900, 1000, etc.) and/or various one or more battery components, singularly or in various combinations, such as electrodes, leads, pumps, mechanical barriers, current collectors, bladders, lifting systems, etc., as described herein. The system of FIG. 13 may be similar to the systems of FIGS. 11 and 12, except the wind farm 1102 and the photovoltaic (PV) farm 1202 may both be power generators working together in the power plant 1300. Together the PV farm 1202, wind farm 1102, the LODES system 1104, and the transmission facilities 1106 may constitute the power plant 1300 that may be a combined power generation, transmission, and storage system. The power generated by the PV farm 1202 and/or the wind farm 1102 may be directly fed to the grid 1108 through the transmission facilities 1106, or may be first stored in the LODES system 1104. In certain cases the power supplied to the grid 1108 may come entirely from the PV farm 1202, entirely from the wind farm 1102, entirely from the LODES system 1104, or from a combination of the PV farm 1202, the wind farm 1102, and the LODES system 1104. The dispatch of power from the combined wind farm 1102, PV farm 1202, and LODES system 1104 power plant 1300 may be controlled according to a determined long-range (multi-day or even multi-year) schedule, or may be controlled according to a day-ahead (24 hour advance notice) market, or may be controlled according to an hour-ahead market, or may be controlled in response to real time pricing signals.

As one example of operation of the power plant 1300, the LODES system 1104 may be used to reshape and "firm" the power produced by the wind farm 1102 and the PV farm 1202. In one such example, the wind farm 1102 may have a peak generation output (capacity) of 126 MW and a capacity factor (CF) of 41% and the PV farm 1202 may have a peak generation output (capacity) of 126 MW and a capacity factor (CF) of 24%. The LODES system 1104 may have a power rating (capacity) of 63 MW, a rated duration (energy/power ratio) of 150 h, and an energy rating of 9,450 MWh. In another such example, the wind farm 1102 may have a peak generation output (capacity) of 170 MW and a capacity factor (CF) of 41% and the PV farm 1202 may have a peak generation output (capacity) of 110 MW and a capacity factor (CF) of 24%. The LODES system 1104 may have a power rating (capacity) of 57 MW, a rated duration (energy/power ratio) of 200 h, and an energy rating of 11,400 MWh. In another such example, the wind farm 1102 may have a peak generation output (capacity) of 105 MW and a capacity factor (CF) of 51% and the PV farm 1202 may have a peak generation output (capacity) of 70 MW and a capacity factor (CF) of 31 The LODES system 1104 may have a power rating (capacity) of 61 MW, a rated duration (energy/power ratio) of 150 h, and an energy rating of 9,150 MWh. In another such example, the wind farm 1102 may have a peak generation output (capacity) of 135 MW and a capacity factor (CF) of 41% and the PV farm 1202 may have a peak generation output (capacity) of 90 MW and a capacity factor (CF) of 24%. The LODES system 1104 may have a power rating (capacity) of 68 MW, a rated duration (energy/power ratio) of 50 h, and an energy rating of 3,400 MWh. In another such example, the wind farm 1102 may have a peak generation output (capacity) of 144 MW and a capacity factor (CF) of 41% and the PV farm 1202 may have a peak generation output (capacity) of 96 MW and a capacity factor (CF) of 24%. The LODES system 1104 may have a power rating (capacity) of 72 MW, a rated duration (energy/power ratio) of 25 h, and an energy rating of 1,800 MWh.

Figure 14:
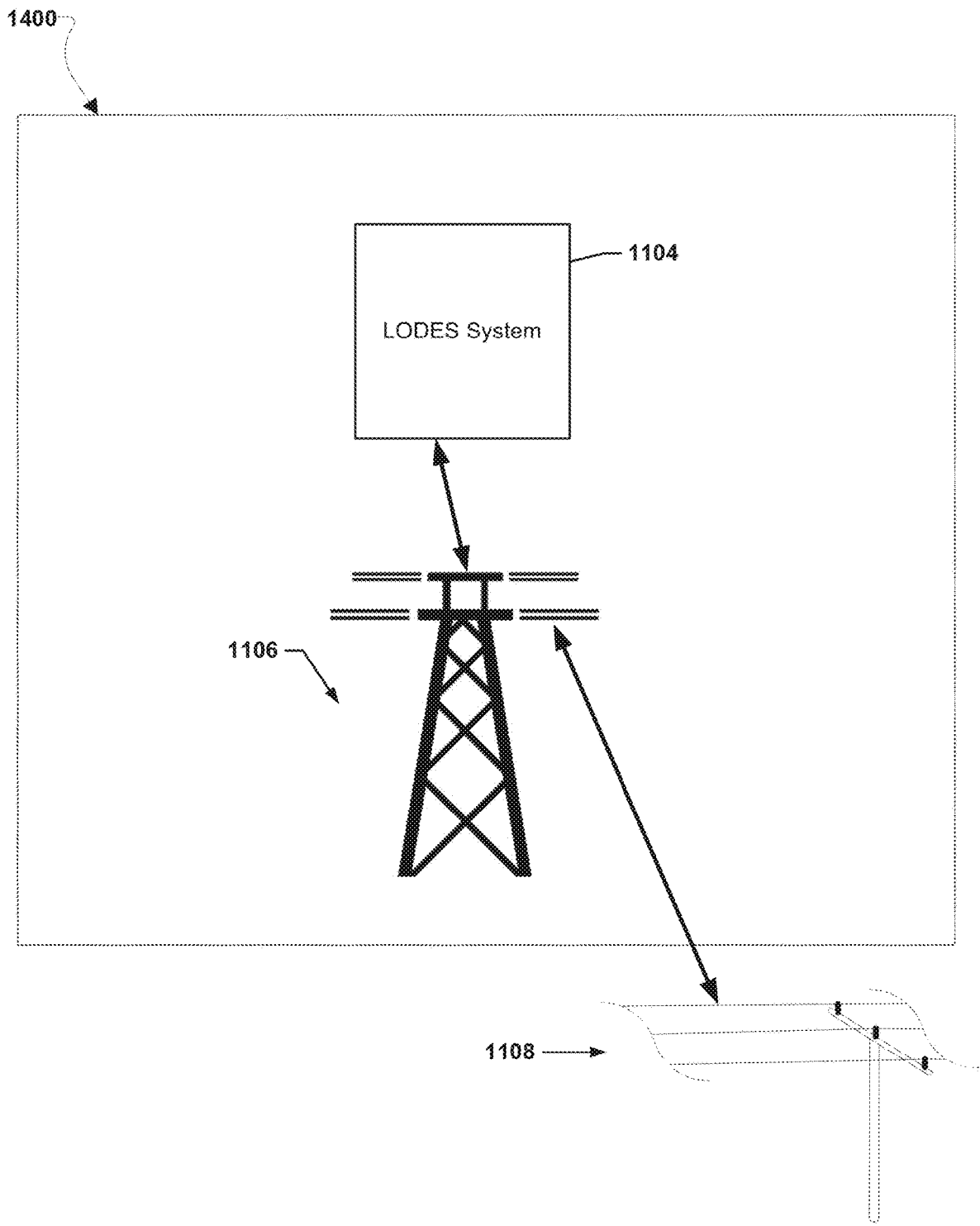

FIG. 14 illustrates an example system in which one or more aspects of the various embodiments may be used as part of bulk energy storage system. As a specific example, the bulk energy storage system incorporating one or more aspects of the various embodiments may be a LODES system 1104. As an example, the LODES system 1104 may include various embodiment batteries described herein (e.g., batteries 100, 200, 500, 600, 700, 800, 900, 1000, etc.) and/or various one or more battery components, singularly or in various combinations, such as electrodes, leads, pumps, mechanical barriers, current collectors, bladders, lifting systems, etc., as described herein. The LODES system 1104 may be electrically connected to one or more transmission facilities 1106. In this manner, the LODES system 1104 may operate in a "stand-alone" manner to arbiter energy around market prices and/or to avoid transmission constraints. The LODES system 1104 may be electrically connected to one or more transmission facilities 1106. The transmission facilities 1106 may be electrically connected to the grid 1108. The LODES system 1104 may store power received from the transmission facilities 1106. The LODES system 1104 may output stored power to the transmission facilities 1106. The transmission facilities 1106 may output power received from the LODES system 1104 to the grid 1108 and/or may receive power from the grid 1108 and output that power to the LODES system 1104.

Together the LODES system 1104 and the transmission facilities 1106 may constitute a power plant 1400. As an example, the power plant 1400 may be situated downstream of a transmission constraint, close to electrical consumption. In such an example downstream situated power plant 1400, the LODES system 1104 may have a duration of 24 h to 500 h and may undergo one or more full discharges a year to support peak electrical consumptions at times when the transmission capacity is not sufficient to serve customers. Additionally, in such an example downstream situated power plant 1400, the LODES system 1104 may undergo several shallow discharges (daily or at higher frequency) to arbiter the difference between nighttime and daytime electricity prices and reduce the overall cost of electrical service to customer. As a further example, the power plant 1400 may be situated upstream of a transmission constraint, close to electrical generation. In such an example upstream situated power plant 1400, the LODES system 1104 may have a duration of 24 h to 500 h and may undergo one or more full charges a year to absorb excess generation at times when the transmission capacity is not sufficient to distribute the electricity to customers. Additionally, in such an example upstream situated power plant 1400, the LODES system 1104 may undergo several shallow charges and discharges (daily or at higher frequency) to arbiter the difference between nighttime and daytime electricity prices and maximize the value of the output of the generation facilities.

Figure 15:
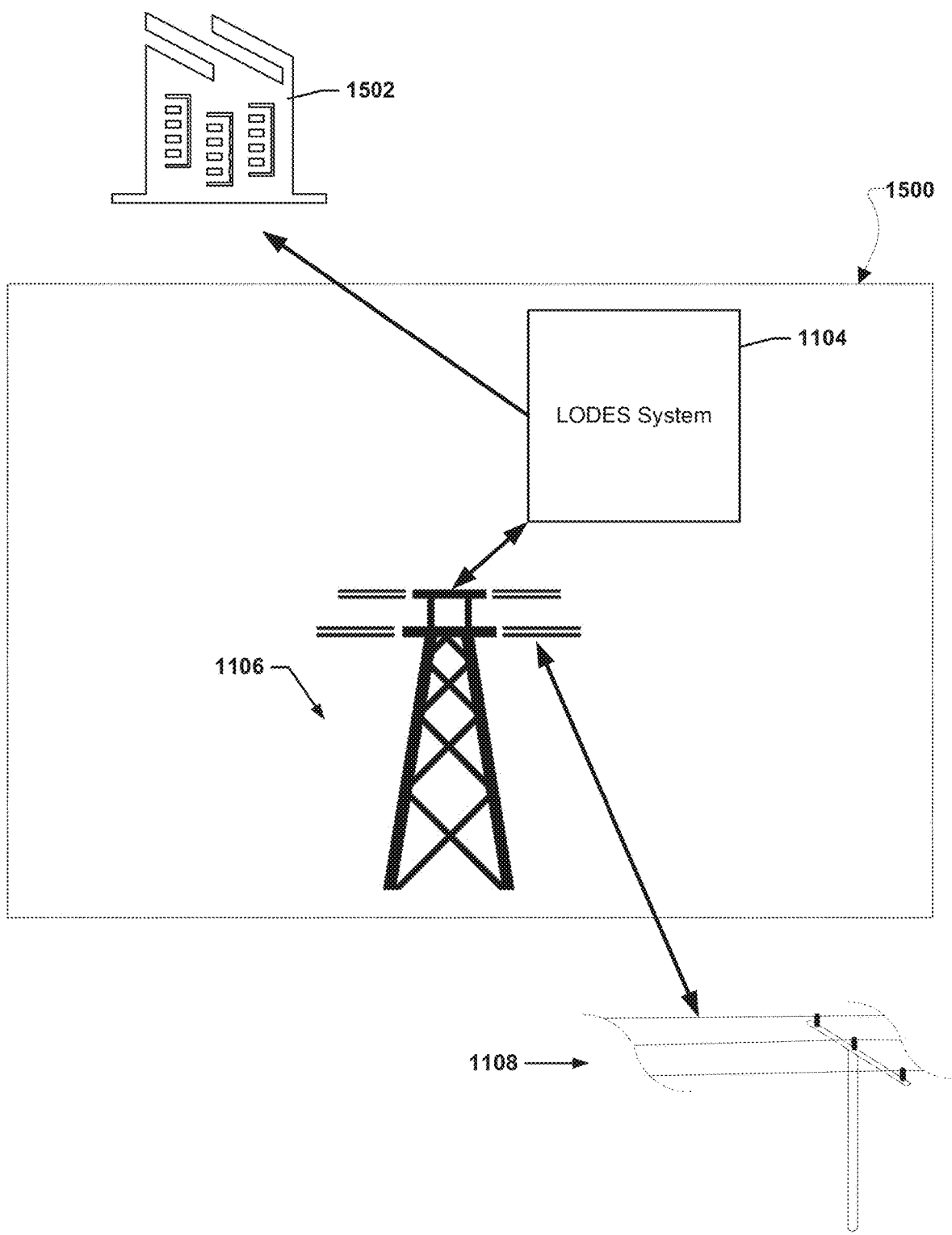

FIG. 15 illustrates an example system in which one or more aspects of the various embodiments may be used as part of bulk energy storage system. As a specific example, the bulk energy storage system incorporating one or more aspects of the various embodiments may be a LODES system 1104. As an example, the LODES system 1104 may include various embodiment batteries described herein (e.g., batteries 100, 200, 500, 600, 700, 800, 900, 1000, etc.) and/or various one or more battery components, singularly or in various combinations, such as electrodes, leads, pumps, mechanical barriers, current collectors, bladders, lifting systems, etc., as described herein. The LODES system 1104 may be electrically connected to a commercial and industrial (C&I) customer 1502, such as a data center, factory, etc. The LODES system 1104 may be electrically connected to one or more transmission facilities 1106. The transmission facilities 1106 may be electrically connected to the grid 1108. The transmission facilities 1106 may receive power from the grid 1108 and output that power to the LODES system 1104. The LODES system 1104 may store power received from the transmission facilities 1106. The LODES system 1104 may output stored power to the C&I customer 1502. In this manner, the LODES system 1104 may operate to reshape electricity purchased from the grid 1108 to match the consumption pattern of the C&I customer 1502.

Together, the LODES system 1104 and transmission facilities 1106 may constitute a power plant 1500. As an example, the power plant 1500 may be situated close to electrical consumption, i.e., close to the C&I customer 1502, such as between the grid 1108 and the C&I customer 1502. In such an example, the LODES system 1104 may have a duration of 24 h to 500 h and may buy electricity from the markets and thereby charge the LODES system 1104 at times when the electricity is cheaper. The LODES system 1104 may then discharge to provide the C&I customer 1502 with electricity at times when the market price is expensive, therefore offsetting the market purchases of the C&I customer 1502. As an alternative configuration, rather than being situated between the grid 1108 and the C&I customer 1502, the power plant 1500 may be situated between a renewable source, such as a PV farm, wind farm, etc., and the transmission facilities 1106 may connect to the renewable source. In such an alternative example, the LODES system 1104 may have a duration of 24 h to 500 h, and the LODES system 1104 may charge at times when renewable output may be available. The LODES system 1104 may then discharge to provide the C&I customer 1502 with renewable generated electricity so as to cover a portion, or the entirety, of the C&I customer 1502 electricity needs.

Figure 16:
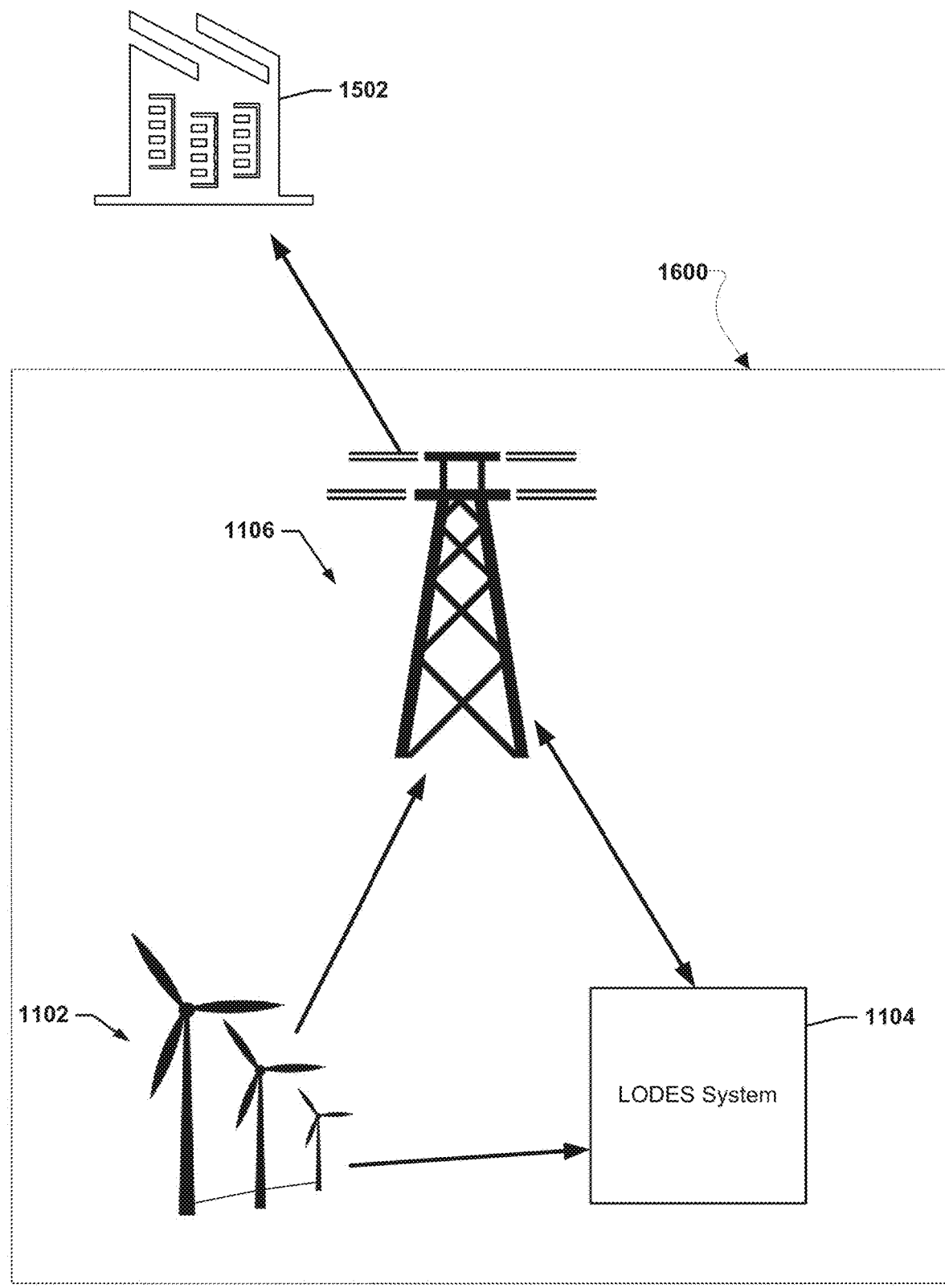

FIG. 16 illustrates an example system in which one or more aspects of the various embodiments may be used as part of bulk energy storage system. As a specific example, the bulk energy storage system incorporating one or more aspects of the various embodiments may be a LODES system 1104. As an example, the LODES system 1104 may include various embodiment batteries described herein (e.g., batteries 100, 200, 500, 600, 700, 800, 900, 1000, etc.) and/or various one or more battery components, singularly or in various combinations, such as electrodes, leads, pumps, mechanical barriers, current collectors, bladders, lifting systems, etc., as described herein. The LODES system 1104 may be electrically connected to a wind farm 1102 and one or more transmission facilities 1106. The wind farm 1102 may be electrically connected to the transmission facilities 1106. The transmission facilities 1106 may be electrically connected to a C&I customer 1502. The wind farm 1102 may generate power and the wind farm 1102 may output generated power to the LODES system 1104 and/or the transmission facilities 1106. The LODES system 1104 may store power received from the wind farm 1102. The LODES system 1104 may output stored power to the transmission facilities 1106. The transmission facilities 1106 may output power received from one or both of the wind farm 1102 and LODES system 1104 to the C&I customer 1502. Together the wind farm 1102, the LODES system 1104, and the transmission facilities 1106 may constitute a power plant 1600 that may be a combined power generation, transmission, and storage system. The power generated by the wind farm 1102 may be directly fed to the C&I customer 1502 through the transmission facilities 1106, or may be first stored in the LODES system 1104. In certain cases the power supplied to the C&I customer 1502 may come entirely from the wind farm 1102, entirely from the LODES system 1104, or from a combination of the wind farm 1102 and the LODES system 1104. The LODES system 1104 may be used to reshape the electricity generated by the wind farm 1102 to match the consumption pattern of the C&I customer 1502. In one such example, the LODES system 1104 may have a duration of 24 h to 500 h and may charge when renewable generation by the wind farm 1102 exceeds the C&I customer 1502 load. The LODES system 1104 may then discharge when renewable generation by the wind farm 1102 falls short of C&I customer 1502 load so as to provide the C&I customer 1502 with a firm renewable profile that offsets a fraction, or all of, the C&I customer 1502 electrical consumption.

Figure 17:
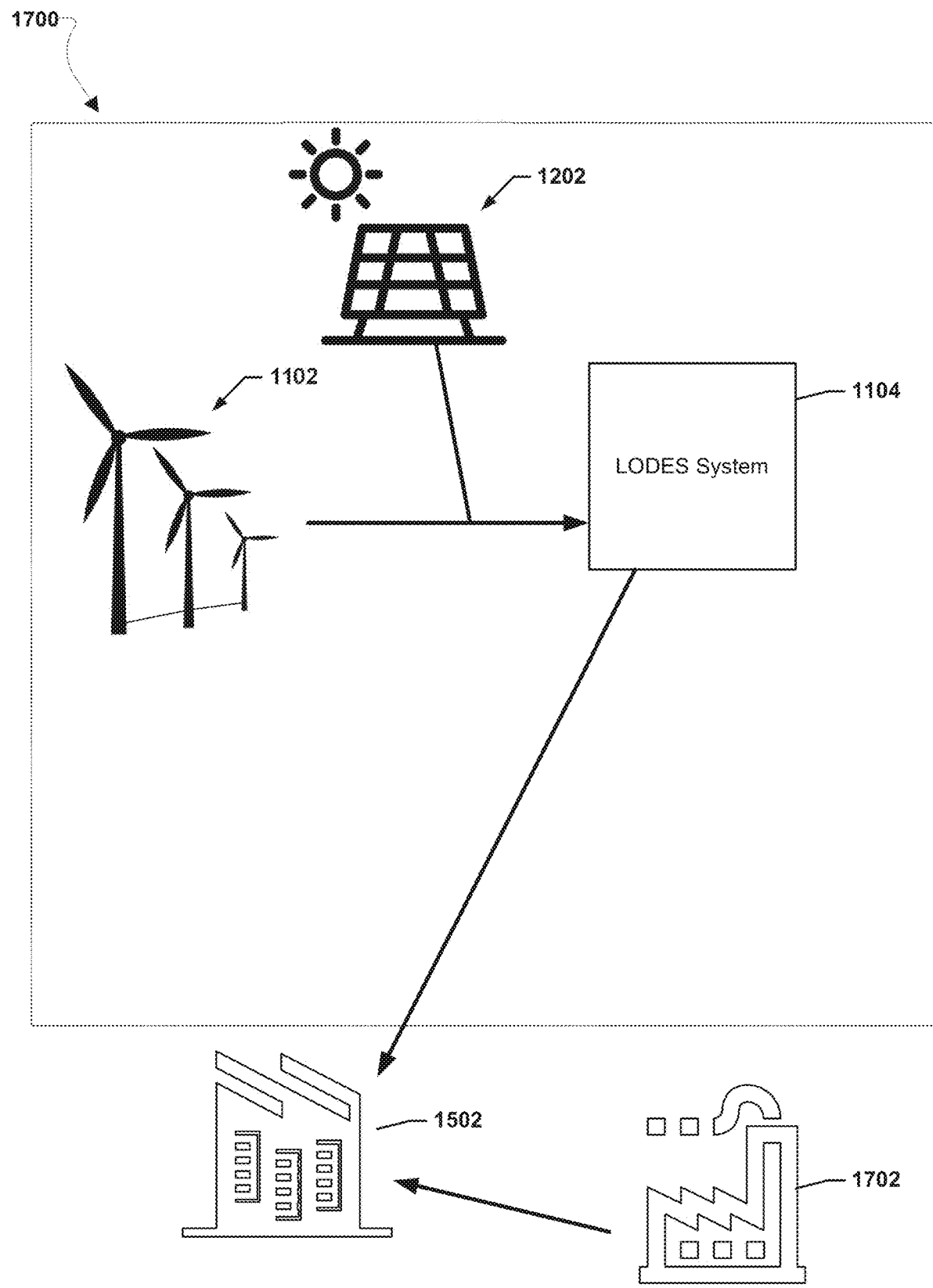

FIG. 17 illustrates an example system in which one or more aspects of the various embodiments may be used as part of bulk energy storage system. As a specific example, the bulk energy storage system incorporating one or more aspects of the various embodiments may be a LODES system 1104. As an example, the LODES system 1104 may include various embodiment batteries described herein (e.g., batteries 100, 200, 500, 600, 700, 800, 900, 1000, etc.) and/or various one or more battery components, singularly or in various combinations, such as electrodes, leads, pumps, mechanical barriers, current collectors, bladders, lifting systems, etc., as described herein. The LODES system 1104 may be part of a power plant 1700 that is used to integrate large amounts of renewable generation in microgrids and harmonize the output of renewable generation by, for example a PV farm 1202 and wind farm 1102, with existing thermal generation by, for example a thermal power plant 1702 (e.g., a gas plant, a coal plant, a diesel generator set, etc., or a combination of thermal generation methods), while renewable generation and thermal generation supply the C&I customer 1502 load at high availability. Microgrids, such as the microgrid constituted by the power plant 1700 and the thermal power plant 1702, may provide availability that is 90% or higher. The power generated by the PV farm 1202 and/or the wind farm 1102 may be directly fed to the C&I customer 1502, or may be first stored in the LODES system 1104. In certain cases the power supplied to the C&I customer 1502 may come entirely from the PV farm 1202, entirely from the wind farm 1102, entirely from the LODES system 1104, entirely from the thermal power plant 1702, or from any combination of the PV farm 1202, the wind farm 1102, the LODES system 1104, and/or the thermal power plant 1702. As examples, the LODES system 1104 of the power plant 1700 may have a duration of 24 h to 500 h. As a specific example, the C&I customer 1502 load may have a peak of 100 MW, the LODES system 1104 may have a power rating of 14 MW and duration of 150 h, natural gas may cost $6/million British thermal units (MMBTU), and the renewable penetration may be 58%. As another specific example, the C&I customer 1502 load may have a peak of 100 MW, the LODES system 1104 may have a power rating of 25 MW and duration of 150 h, natural gas may cost $8/MMBTU, and the renewable penetration may be 65%.

Figure 18:
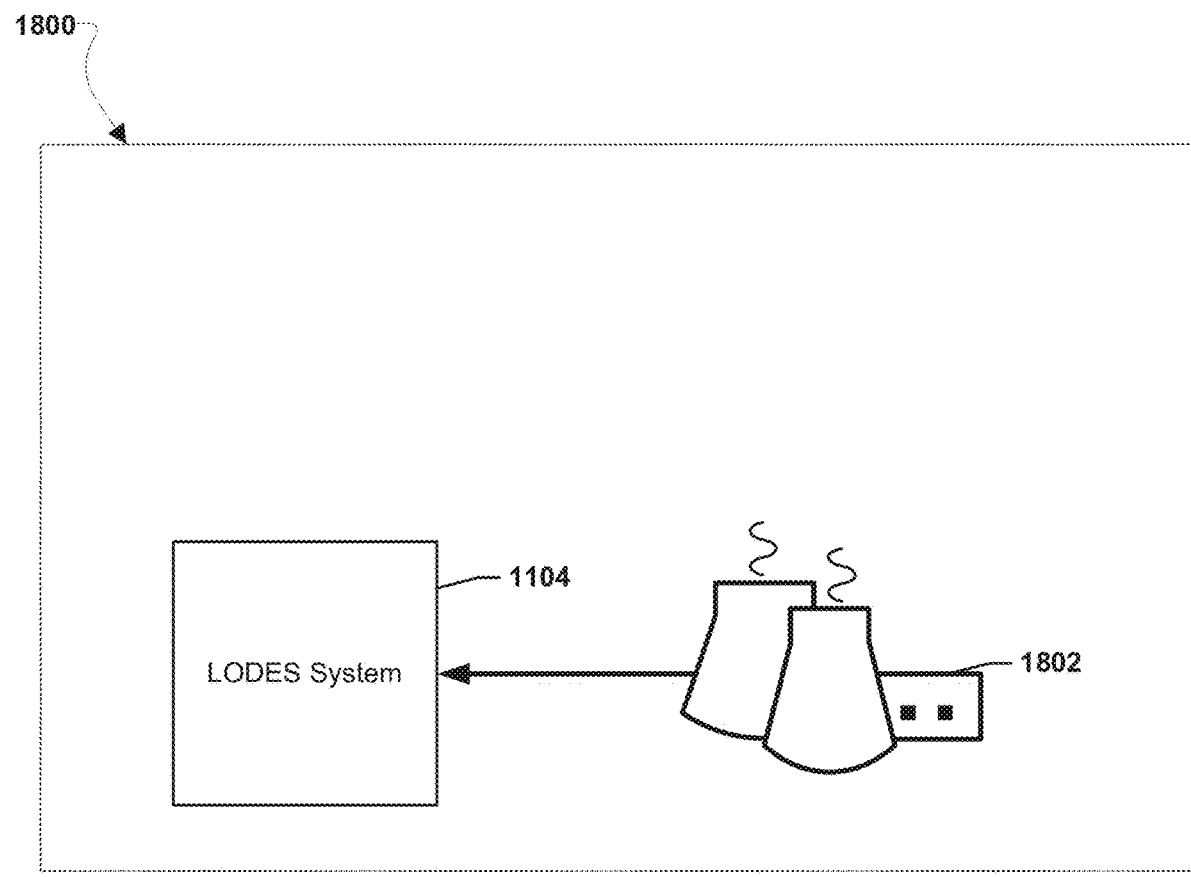

FIG. 18 illustrates an example system in which one or more aspects of the various embodiments may be used as part of bulk energy storage system. As a specific example, the bulk energy storage system incorporating one or more aspects of the various embodiments may be a LODES system 1104. As an example, the LODES system 1104 may include various embodiment batteries described herein (e.g., batteries 100, 200, 500, 600, 700, 800, 900, 1000, etc.) and/or various one or more battery components, singularly or in various combinations, such as electrodes, leads, pumps, mechanical barriers, current collectors, bladders, lifting systems, etc., as described herein. The LODES system 1104 may be used to augment a nuclear plant 1802 (or other inflexible generation facility, such as a thermal, a biomass, etc., and/or any other type plant having a ramp-rate lower than 50% of rated power in one hour and a high capacity factor of 80% or higher) to add flexibility to the combined output of the power plant 1800 constituted by the combined LODES system 1104 and nuclear plant 1802. The nuclear plant 1802 may operate at high capacity factor and at the highest efficiency point, while the LODES system 1104 may charge and discharge to effectively reshape the output of the nuclear plant 1802 to match a customer electrical consumption and/or a market price of electricity. As examples, the LODES system 1104 of the power plant 1800 may have a duration of 24 h to 500 h. In one specific example, the nuclear plant 1802 may have 1,000 MW of rated output and the nuclear plant 1802 may be forced into prolonged periods of minimum stable generation or even shutdowns because of depressed market pricing of electricity. The LODES system 1104 may avoid facility shutdowns and charge at times of depressed market pricing; and the LODES system 1104 may subsequently discharge and boost total output generation at times of inflated market pricing.

Figure 19:
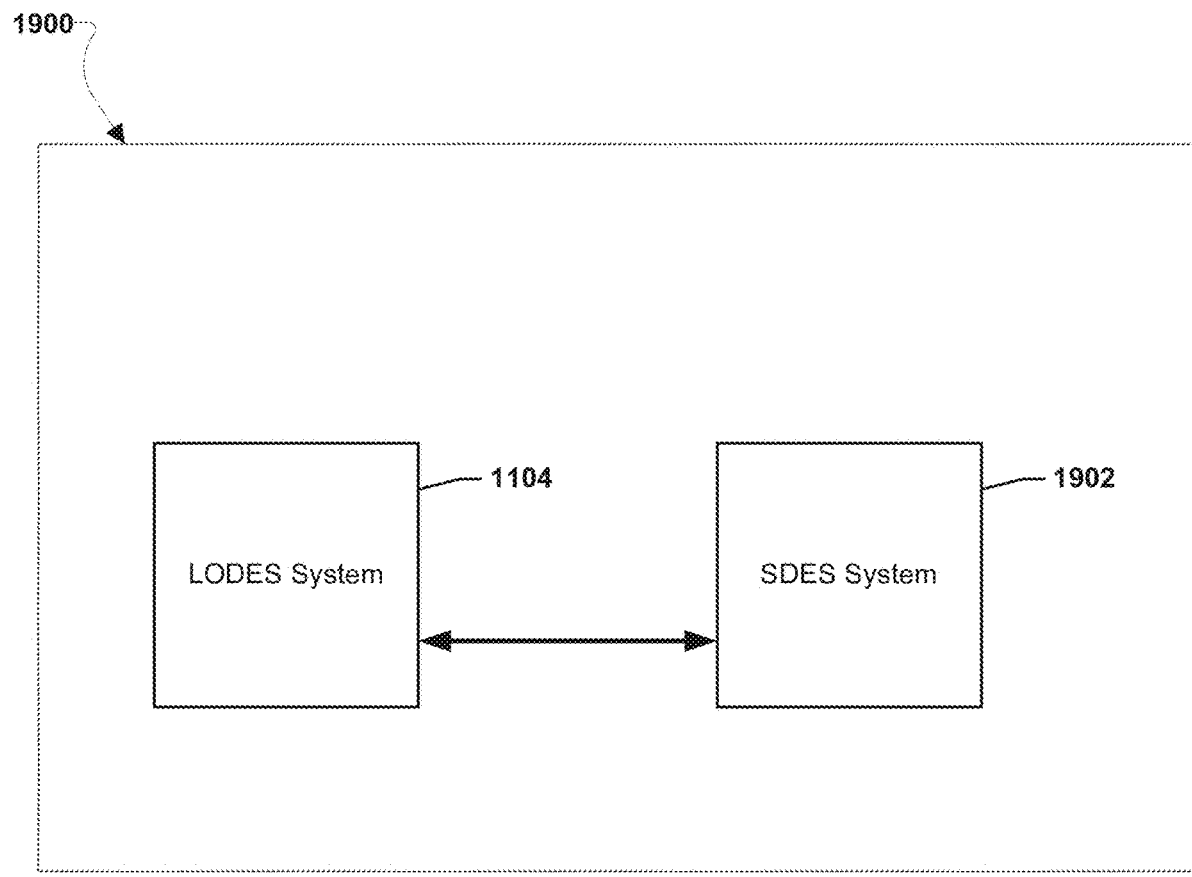

FIG. 19 illustrates an example system in which one or more aspects of the various embodiments may be used as part of bulk energy storage system. As a specific example, the bulk energy storage system incorporating one or more aspects of the various embodiments may be a LODES system 1104. As an example, the LODES system 1104 may include various embodiment batteries described herein (e.g., batteries 100, 200, 500, 600, 700, 800, 900, 1000, etc.) and/or various one or more battery components, singularly or in various combinations, such as electrodes, leads, pumps, mechanical barriers, current collectors, bladders, lifting systems, etc., as described herein. The LODES system 1104 may operate in tandem with a SDES system 1902. Together the LODES system 1104 and SDES system 1902 may constitute a power plant 1900. As an example, the LODES system 1104 and SDES system 1902 may be co-optimized whereby the LODES system 1104 may provide various services, including long-duration back-up and/or bridging through multi-day fluctuations (e.g., multi-day fluctuations in market pricing, renewable generation, electrical consumption, etc.), and the SDES system 1902 may provide various services, including fast ancillary services (e.g. voltage control, frequency regulation, etc.) and/or bridging through intra-day fluctuations (e.g., intra-day fluctuations in market pricing, renewable generation, electrical consumption, etc.). The SDES system 1902 may have durations of less than 10 hours and round-trip efficiencies of greater than 80%. The LODES system 1104 may have durations of 24 h to 500 h and round-trip efficiencies of greater than 40% In one such example, the LODES system 1104 may have a duration of 150 hours and support customer electrical consumption for up to a week of renewable under-generation. The LODES system 1104 may also support customer electrical consumption during intra-day under-generation events, augmenting the capabilities of the SDES system 1902. Further, the SDES system 1902 may supply customers during intra-day under-generation events and provide power conditioning and quality services such as voltage control and frequency regulation.

In applying performance metrics, such as round-trip efficiency, etc., to a LODES or an SDES, the values for the metrics are based upon the average values of the stacks, cells or components making up the LODES or SDES, unless such values can be directly calculated.

The foregoing method descriptions are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not necessarily intended to limit the order of the steps; these words may be used to guide the reader through the description of the methods. Further, any reference to claim elements in the singular, for example, using the articles "a," "an" or "the" is not to be construed as limiting the element to the singular.

Further, any step of any embodiment described herein can be used in any other embodiment. The preceding description of the disclosed aspects is provided to enable any person skilled in the art to make or use the present invention. Various modifications to these aspects will be readily apparent to those skilled in the art, and the generic principles defined herein may be applied to other aspects without departing from the scope of the invention. Thus, the present invention is not intended to be limited to the aspects shown herein but is to be accorded the widest scope consistent with the principles and novel features disclosed herein.

What is claimed is:
1. A battery, comprising:
a first vessel, the first vessel at least partially including an air environment therein, wherein the first vessel is sealed and air from an ambient environment is pumped into the air environment;

a first air electrode, comprising:
  a first oxygen evolution reaction electrode; and
  a first oxygen reduction reaction electrode;
a first metal electrode, the first metal electrode comprising a porous bed of metal particles;
a second metal electrode;
a first volume of liquid electrolyte contained within the first vessel, wherein the first volume of liquid electrolyte is disposed between and directly contacts each of the first air electrode, the first metal electrode, and the second metal electrode such that the first air electrode, the first metal electrode, and the second metal electrode are electrically isolated while remaining in ionic contact via the first volume of liquid electrolyte, the liquid electrolyte having an oxygen solubility preventing oxygen from reaching the first metal electrode; and
a first filter disposed in the first volume of the liquid electrolyte within the first vessel, the first filter configured to remove carbon dioxide from the liquid electrolyte, and the first filter venting the carbon dioxide to the air environment.

2. The battery of claim 1, wherein the first filter defines a tortuous flow path.

3. The battery of claim 1, wherein the first filter is operable at intervals matched to carbon dioxide diffusion rate into the first volume of the liquid electrolyte.

4. The battery of claim 1, wherein the first volume of liquid electrolyte is circulatable through the first filter.

5. The battery of claim 1, further comprising:
one or more additional vessels;
one or more additional air electrodes;
one or more additional metal electrodes, each additional metal electrode comprising a respective porous bed of metal particles; and
one or more additional volumes of liquid electrolyte, each additional volume of liquid electrolyte contained within its own respective one of the additional vessels, wherein each additional volume of liquid electrolyte separates a respective one of the additional air electrodes from a respective one of the additional metal electrodes and each additional volume of liquid electrolyte contacts its respective one of the additional air electrodes and its respective one of the additional metal electrodes.

6. The battery of claim 5, wherein:
the air electrodes are connected together electrically in series and the metal electrodes are connected together electrically in series; or
the air electrodes are connected together electrically in parallel and the metal electrodes are connected together electrically in parallel.

7. The battery of claim 1, further comprising:
a mechanical barrier configured to block oxygen bubbles from the first metal electrode when the battery is operating in a charging mode.

8. The battery of claim 7, wherein the mechanical barrier comprises polybenzimidazole (PBI), polyethylene (PE), polypropylene (PP), polyvinylidene fluoride (PVDF), polytetrafluoroethylene (PTFE), cotton, rayon, or cellulose acetate.

9. The battery of claim 8, wherein the mechanical barrier is woven, non-woven, or felted.

* * * * *